United States Patent
Chang et al.

(10) Patent No.: US 10,491,325 B1
(45) Date of Patent: Nov. 26, 2019

(54) COMPOSITE DATA TRANSPORT AND STORAGE VIA WAVEFRONT MULTIPLEXING

(71) Applicant: SPATIAL DIGITAL SYSTEMS, INC., Agoura Hills, CA (US)

(72) Inventors: Donald C. D. Chang, Thousand Oaks, CA (US); Juo-Yu Lee, Westlake Village, CA (US); Tzer-Hso Lin, Chatsworth, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 0 days.

(21) Appl. No.: 15/933,322

(22) Filed: Mar. 22, 2018

Related U.S. Application Data

(60) Provisional application No. 62/475,026, filed on Mar. 22, 2017.

(51) Int. Cl.
| | | |
|---|---|---|
| H04K 1/10 | (2006.01) | |
| H04B 7/06 | (2006.01) | |
| H04J 99/00 | (2009.01) | |
| G06F 3/06 | (2006.01) | |
| H04L 29/08 | (2006.01) | |

(52) U.S. Cl.
CPC ............... *H04K 1/10* (2013.01); *G06F 3/067* (2013.01); *G06F 3/0623* (2013.01); *G06F 3/0659* (2013.01); *H04B 7/0617* (2013.01); *H04J 15/00* (2013.01); *H04L 67/1097* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0235529 | A1* | 11/2004 | Tarokh | H01Q 1/246 455/562.1 |
| 2010/0117903 | A1* | 5/2010 | Zheng | H01Q 3/2605 342/373 |
| 2017/0085315 | A1* | 3/2017 | Atkinson | H04B 7/18515 |

* cited by examiner

*Primary Examiner* — Vineeta S Panwalkar
(74) *Attorney, Agent, or Firm* — Phuong-Quan Hoang

(57) ABSTRACT

For signal transmission, a pre-processing device performs a wavefront multiplexing (WVM) transform on M input streams corresponding to M orthogonal beams to generate N output streams using a weight matrix having M beam weight vectors (BWVs) associated with the M orthogonal beams. An antenna array having N elements transmits the N output streams to a plurality of receivers. For signal reception, an antenna array having N elements receives N input streams from a plurality of transmitters. A post-processing device performs a wavefront de-multiplexing (WVD) transform on the N input streams corresponding to M orthogonal beams to generate M output streams using a weight matrix having M beam weight vectors (BWVs) associated with the M orthogonal beams. M and N are positive integers and $1 < M \leq N$. The M BWVs are calculated using an optimization procedure based on performance constraints.

18 Claims, 38 Drawing Sheets

$$\begin{bmatrix} y1(t) \\ y2(t) \\ y3(t) \\ y4(t) \end{bmatrix} = [BWVs]* \begin{bmatrix} A1(t) \\ A2(t) \\ A3(t) \\ A4(t) \end{bmatrix}$$

$Ai(t)$: signals for $i^{th}$ beam $yj(t)$: signals for $j^{th}$ element $$[BWVs] = \begin{bmatrix} -0.2310 - 0.0958i & 0.0957 + 0.2309i & 0.0957 - 0.2309i & -0.2310 + 0.0956i \\ 0.0955 + 0.2309i & 0.2310 + 0.0957i & 0.2311 - 0.0956i & 0.0956 - 0.2310i \\ 0.0955 - 0.2309i & 0.2310 - 0.0957i & 0.2311 + 0.0956i & 0.0956 + 0.2310i \\ -0.2300 + 0.0958i & 0.0957 - 0.2309i & 0.0957 + 0.2309i & -0.2310 - 0.0956i \end{bmatrix}$$

| BWV1 | BWV2 | BWV3 | BWV4 |
| Beam 1 | Beam 2 | Beam 3 | Beam 4 |
| 4 elements | 4 elements | 4 elements | 4 elements |

FIG. 23

1. 4 to 4 K-muxing; [K-muxing] = [BWVs]

$$[yj(t)] = [\text{K-muxing}]*[Ai(t)], \text{ or } \begin{bmatrix} y1(t) \\ y2(t) \\ y3(t) \\ y4(t) \end{bmatrix} = [BWVs]* \begin{bmatrix} A1(t) \\ A2(t) \\ A3(t) \\ A4(t) \end{bmatrix}$$

— $Ai(t)$ = ith input data; i = 1 to 4 and $yj(t)$ = jth output data; j = 1 to 4

2. 4 to 4 K-demuxing; [K-demuxing] = [P]

— $yj(t)$ = jth input data; j = 1 to 4 *propagating to 4 different directions for recovering* $A1(t), A2(t), A3(t)$ and $A4(t)$ — $Ai(t)$ = ith output data; i = 1 to 4

- $A1(t)$ will be delivered by the 4 element array to a 1$^{st}$ direction at angle [θ1,φ1]
     — $A1(t) = w11* y1(t) + w12* y2(t) + w13* y3(t) + w14* y4(t)$
   - $A2(t)$ will be delivered by the 4 element array to a 2$^{nd}$ direction at angle [θ2,φ2]
     — $A2(t) = w21* y1(t) + w22* y2(t) + w23* y3(t) + w24* y4(t)$
   - $A3(t)$ will be delivered by the 4 element array to a 3$^{rd}$ direction at angle [θ3,φ3]
     — $A3(t) = w31* y1(t) + w32* y2(t) + w33* y3(t) + w34* y4(t)$
   - $A4(t)$ will be delivered by the 4 element array to a 4$^{th}$ direction at angle [θ2,φ2]
     — $A4(t) = w41* y1(t) + w42* y2(t) + w43* y3(t) + w44* y4(t)$

$$\begin{bmatrix} y1(t) \\ y2(t) \\ y3(t) \\ y4(t) \\ y5(t) \end{bmatrix} = [BWVs]^* \begin{bmatrix} A1(t) \\ A2(t) \\ A3(t) \\ A4(t) \end{bmatrix}$$

$A_i(t)$: signals for $i^{th}$ beam $y_j(t)$: signals for $j^{th}$ element $$[BWVs] = \begin{bmatrix} -0.2309 - 0.0957i & 0.0956 + 0.2310i & 0.0957 - 0.2310i & -0.2310 + 0.0957i \\ 0.0956 + 0.2309i & 0.2309 + 0.0957i & 0.2310 - 0.0957i & 0.0957 - 0.2310i \\ 0.0956 - 0.2310i & 0.2310 - 0.0956i & 0.2310 + 0.0956i & 0.0957 + 0.2310i \\ -0.1100 + 0.0499i & 0.0288 - 0.1406i & 0.0394 + 0.1057i & -0.1143 - 0.0521i \\ 0.1210 - 0.0458i & -0.0669 + 0.0903i & -0.0563 - 0.1252i & 0.1167 + 0.0435i \end{bmatrix}$$

| BWV1 | BWV2 | BWV3 | BWV4 |
| Beam 1 | Beam 2 | Beam 3 | Beam 4 |
| 5 elements | 5 elements | 5 elements | 5 elements |

FIG. 28

1. 4 to 4 K-muxing; [K-muxing] = [BWVs]

$$\begin{bmatrix} y1(t) \\ y2(t) \\ y3(t) \\ y4(t) \\ y5(t) \end{bmatrix} = [BWVs] * \begin{bmatrix} A1(t) \\ A2(t) \\ A3(t) \\ A4(t) \end{bmatrix}$$

$[yj(t)] = [K\text{-muxing}]*[Ai(t)]$, or $[yj(t)] = [K\text{-muxing}] = [BWVs]$

- $Ai(t)$ = ith input data; i = 1 to 4 and $yj(t)$ = jth output data; j = 1 to 5

2. 4 to 4 K-demuxing; [K-demuxing] = [P]

- $yj(t)$ = jth input data; j = 1 to 5 *propagating to 4 different directions for recovering* $A1(t), A2(t), A3(t)$ and $A4(t)$
- $Ai(t)$ = ith output data; i = 1 to 4
  • $A1(t)$ will be delivered by the 4 element array to a 1st direction at angle [θ1,φ1]
    – $A1(t) = w11* y1(t) + w12* y2(t) + w13* y3(t) + w14* y4(t) + w15* y5(t)$
  • $A2(t)$ will be delivered by the 4 element array to a 2nd direction at angle [θ2,φ2]
    – $A2(t) = w21* y1(t) + w22* y2(t) + w23* y3(t) + w24* y4(t) + w25* y5(t)$
  • $A3(t)$ will be delivered by the 4 element array to a 3rd direction at angle [θ3,φ3]
    – $A3(t) = w31* y1(t) + w32* y2(t) + w33* y3(t) + w34* y4(t) + w35* y5(t)$
  • $A4(t)$ will be delivered by the 4 element array to a 4th direction at angle [θ2,φ2]
    – $A4(t) = w41* y1(t) + w42* y2(t) + w43* y3(t) + w44* y4(t) + w45* y5(t)$

FIG. 29

$$\underbrace{\begin{bmatrix} y1(t) \\ y2(t) \\ y3(t) \\ y4(t) \\ y5(t) \\ y6(t) \end{bmatrix}}_{2060} = \underbrace{[BWVs]}_{2310} * \underbrace{\begin{bmatrix} A1(t) \\ A2(t) \\ A3(t) \\ A4(t) \end{bmatrix}}_{2050}$$

$Ai(t)$: signal for $i^{th}$ beam $yj(t)$: signals for $j^{th}$ element $$\underbrace{[BWVs]}_{2310} = \begin{bmatrix} -0.1191 - 0.0530i & 0.0391 + 0.1027i & 0.0392 - 0.1284i & -0.1184 + 0.0429i \\ 0.0957 + 0.2310i & 0.2310 + 0.09571i & 0.2310 - 0.09571i & 0.0957 - 0.2309i \\ 0.0957 - 0.2310i & 0.2310 - 0.09571i & 0.2310 + 0.09571i & 0.0957 + 0.2309i \\ -0.1191 + 0.0423i & 0.0390 - 0.1285i & 0.0392 + 0.1026i & -0.1197 - 0.0537i \\ 0.1119 - 0.0534i & -0.0566 + 0.1025i & -0.0565 - 0.1284i & 0.1112 + 0.0421i \\ 0.1119 + 0.0427i & -0.0566 - 0.1283i & -0.0565 + 0.1026i & 0.1126 - 0.0528i \end{bmatrix}$$

| BWV1 | BWV2 | BWV3 | BWV4 |
|---|---|---|---|
| 1st beam | 2nd beam | 3rd beam | 4th beam |
| 6 elements | 6 elements | 6 elements | 6 elements |

FIG. 33

1. 4 to 4 K-muxing; [K-muxing] = [BWVs]

$$\begin{bmatrix} y1(t) \\ y2(t) \\ y3(t) \\ y4(t) \\ y5(t) \\ y6(t) \end{bmatrix} = [BWVs] * \begin{bmatrix} A1(t) \\ A2(t) \\ A3(t) \\ A4(t) \end{bmatrix}$$

[yj(t)] = [K-muxing]*[Ai(t)], or

— Ai(t) = ith input data; i = 1 to 4  and yj(t) = jth output data; j = 1 to 6

2. 4 to 4 K-demuxing: [K-demuxing] = [P]

— yj(t) = jth input data; j = 1 to 6 *propagating to 4 different directions for recovering A1(t), A2(t), A3(t) and A4(t)*

— Ai(t) = ith output data;  i = 1 to 4

- A1(t) will be delivered by the 4 element array to a 1$^{st}$ direction at angle [θ1,φ1]
  - A1(t)= w11*y1(t)+w12*y2(t)+w13*y3(t)+w14*y4(t)+w15*y5(t)+w16*y6(t)
- A2(t) will be delivered by the 4 element array to a 2$^{nd}$ direction at angle [θ2,φ2]
  - A2(t)= w21*y1(t)+w22*y2(t)+w23*y3(t)+w24*y4(t)+w25*y5(t)+w26*y6(t)
- A3(t) will be delivered by the 4 element array to a 3$^{rd}$ direction at angle [θ3,φ3]
  - A3(t)=w31*y1(t) +w32*y2(t)+w33*y3(t)+w34*y4(t)+w35*y5(t)+w36*y6(t)
- A4(t) will be delivered by the 4 element array to a 4$^{th}$ direction at angle [θ2,φ2]
  - A4(t)= w41*y1(t)+w42*y2(t)+w43*y3(t) +w44*y4(t)+w45*y5(t)+w46*y6(t)

COMPOSITE DATA TRANSPORT AND STORAGE VIA WAVEFRONT MULTIPLEXING

RELATED APPLICATIONS

This application claims the benefit of Provisional Patent Application No. 62/475,026, filed on Mar. 22, 2017. This application is related to U.S. Pat. No. 8,098,612 issued on Jan. 17, 2012, entitled "APPARATUS AND METHOD FOR REMOTE BEAM FORMING FOR SATELLITE BROADCASTING SYSTEMS"; U.S. Pat. No. 8,111,646 issued on Feb. 7, 2012, entitled "COMMUNICATION SYSTEM FOR DYNAMICALLY COMBINING POWER FROM A PLURALITY OF PROPAGATION CHANNELS IN ORDER TO IMPROVE POWER LEVELS OF TRANSMITTED SIGNALS WITHOUT AFFECTING RECEIVER AND PROPAGATION SEGMENTS"; U.S. patent application Ser. No. 14/712,145, filed on May 14, 2015, entitled "SURVIVABLE CLOUD DATA STORAGE AND TRANSPORT"; and U.S. patent application Ser. No. 14/512,959, filed on Oct. 13, 2014, entitled "Enveloping for Cloud Computing via Wavefront Muxing", all of which are expressly incorporated by reference herein in their entireties.

TECHNICAL FIELD

One disclosed aspect of the embodiments is directed to the field of data communication. In particular, the embodiment is directed to data transport and communication using wavefront multiplexing (WFM) technology.

BACKGROUND

Long before the beginning or digital age, people had manually stored data while the 'data storage' from time to time might suffer loss due to lack of availability and privacy protection. With the advancement of digital technology, data storage has been an indispensable function in many aspects of modern era. The need for availability and privacy protection remains central to evolving data storage design.

Data not only resides in storage but also appears in transition among communication terminals and users. To provide quality of service and quality of experience, it is also of significant value to transport data that is highly available and securely protected. The service of data transport should meet requirements of availability and privacy protection to satisfy user's demand for quality and experience.

Repetition coding is one approach to providing availability against the event of data loss. One application of repetition code is RAID (redundant array of independent disks). Among variations of RAID, RAID 1 creates one redundant piece of a data stream. For one data stream, RAID thus creates two identical copies to be stored. The space overhead of RAID 1 is 50%, which is high in state-of-the-art storage, and it bears low level privacy protection if no encoding or other measure is further applied to the stored copy.

SUMMARY

One disclosed aspect of the embodiments is a method and apparatus to provide data transport and communication using wavefront multiplexing (WFM) technique. For signal transmission, a pre-processing device performs a wavefront multiplexing (WVM) transform on M input streams corresponding to M orthogonal beams to generate N output streams using a weight matrix having M beam weight vectors (BWVs) associated with the M orthogonal beams. An antenna array having N elements transmits the N output streams to a plurality of receivers. For signal reception, an antenna array having N elements receives N input streams from a plurality of transmitters. A post-processing device performs a wavefront de-multiplexing (WVD) transform on the N input streams corresponding to M orthogonal beams to generate M output streams using a weight matrix having M beam weight vectors (BWVs) associated with the M orthogonal beams. M and N are positive integers and $1 < M \leq N$. The M BWVs are calculated using an optimization procedure based on performance constraints.

BRIEF DESCRIPTION OF THE DRAWINGS

Embodiments may best be understood by referring to the following description and accompanying drawings that are used to illustrate embodiments. In the drawings:

FIG. 23 is a diagram illustrating 4 optimized Beam Weight Vectors (BWVs) according to one embodiment.

FIG. 24 is a diagram illustrating K-muxing and K-demuxing transforms for BWVs from a 4-element linear array according to one embodiment.

FIG. 28 is a diagram illustrating the BWVs generated by an optimizing processing for a 5-element array according to one embodiment.

FIG. 29 is a diagram illustrating K-muxing and K-demuxing transforms for BWVs from a 5-element linear array according to one embodiment.

FIG. 33 is a diagram illustrating the BWVs generated by an optimizing processing for a 6-element array according to one embodiment.

FIG. 34 is a diagram illustrating K-muxing and K-demuxing transforms for BWVs from a 6-element linear array according to one embodiment.

DETAILED DESCRIPTION

Figure 1:
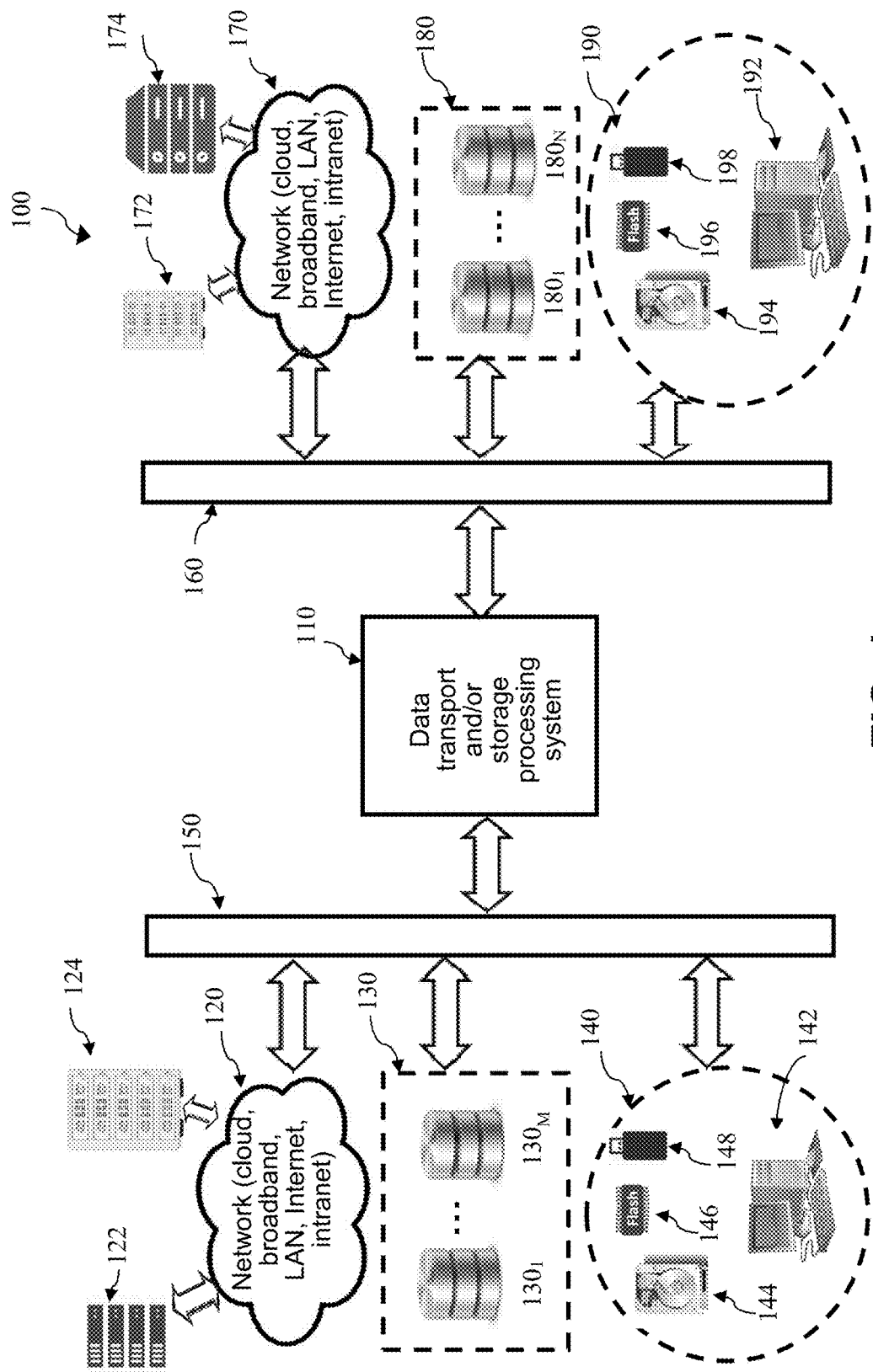
FIG. 1 is a diagram illustrating a system using a data transport and/or storage processing system according to one embodiment.

One disclosed aspect of the embodiments is a method and apparatus to provide data communication using wavefront multiplexing (WFM) technique. The technique allows signal transmission and reception via orthogonal beams.

For signal transmission, a pre-processing device performs a wavefront multiplexing (WVM) transform on M input streams corresponding to M orthogonal beams to generate N output streams using a weight matrix having M beam weight vectors (BWVs) associated with the M orthogonal beams. An antenna array having N elements transmits the N output streams to a plurality of receivers. For signal reception, an antenna array having N elements receives N input streams from a plurality of transmitters. A post-processing device performs a wavefront de-multiplexing (WVD) transform on the N input streams corresponding to M orthogonal beams to generate M output streams using a weight matrix having M beam weight vectors (BWVs) associated with the M orthogonal beams. M and N are positive integers and $1<M\leq N$. The M BWVs are calculated using an optimization procedure based on performance constraints.

Wavefront multiplexing (WF muxing, or K-muxing) and wavefront demultiplexing (WF demuxing or K-demuxing) are multi-dimension data processing methods. Both K-muxing and K-demuxing define transformation of multi-dimensional signals or data streams that feature particular distribution patterns (or 'wavefronts') in K-space. K-muxing and K-demuxing enable redundancy to enhance availability and provide scrambled signals or data streams designed toward privacy protection. The data transport and communication may store data in storage sites. The storage sites may include at least one of a network attached storage (NAS) device, a direct access storage (DAS) device, a storage area network (SAN) device, redundant array of independent disks (RAIDs), a cloud storage, a hard disk, a solid-state memory device, and a device capable of storing data.

In the following description, numerous specific details are set forth. However, it is understood that embodiments may be practiced without these specific details. In other instances, well-known circuits, structures, and techniques have not been shown to avoid obscuring the understanding of this description. One disclosed feature of the embodiments may be described as a process which is usually depicted as a flowchart, a flow diagram, a structure diagram, or a block diagram. One embodiment may be described by a schematic drawing depicting a physical structure. It is understood that the schematic drawing illustrates the basic concept and may not be scaled or depict the structure in exact proportions.

The term "writing" refers to the act of storing data on or transmitting or sending data through multiple physical and logical dimensions. The term "reading" refers to the act of retrieving data from or receiving data through multiple physical and logical dimensions. Physical dimensions may refer to computers, mobile devices, data centers and so on. Logical dimensions may refer to allocated or virtualized resources for data storage or data transport. Both physical and logical dimensions may also refer to communication channels in general.

One aspect of the embodiments relates to distributed data storages with built-in redundancy for a single stream data subdivided into multiple (M) data substreams or M independent data streams, converted into K-muxed domain with M+N output wavefront components (WFCs), and stored these M+N WFC output data as M+N separated data storage sets, where N, and M are non-negative integers. As a result, the stored data sets are WFCs in the format of linear combinations of the data sets, instead of the data sets themselves. The coefficients involved in K-muxing and K-demuxing may take complex values. Hence the vector of coefficients involved in K-muxing and K-demuxing may include, but not limited to, column vectors in Hadamard transformation, Fourier transformation, etc. The matrix comprising coefficients involved in K-muxing and K-demuxing features subsets of M rows that have full rank in order to satisfy the redundancy requirements.

In general, the input ports of a K-muxing transform are referred to as "slices" and the output ports are referred to as "WFCs". For instance, the first and the third input ports to a 16-to-16 K-muxing transform are referred as the slice 1 and the slice 3, respectively. Similarly the $13^{th}$ and the $16^{th}$ output ports are called the WFC 13 and the WFC16, respectively. Collectively, the output data from a K-muxing transform also referred as the K-muxed data are outputted from all the WFC ports. A first input stream connected to slice 1 of the 16-to-16 K muxing transform shall appear in all the WFC ports with a unique wavefront called wavefront 1 indicated as wavefront vector 1 or WFV1 over a 16-dimensional space; each dimension representing an output from a unique WFC port. Similarly, a second input stream connected to slice 16 of the 16-to-16 K muxing transform shall also appear in all the WFC ports with another unique wavefront called wavefront 16 indicated as wavefront vector 16 or WFV16.

Existing redundancy-generation coding such as erasure code often appears as systematic code, which preserves original data streams in addition to computed parity data streams. The preserved original data streams should be protected, unless otherwise further processed by measures such as encryption. On the other hand, K-muxing renders each WFC unintelligible to protect every data stream to be stored or transported.

Assume, in a writing process, a data stream's M substreams $(S_1, S_2, \ldots, S_M)$ are transformed to M+N WFCs $(D_1, D_2, \ldots, D_{M+N})$ via K-muxing. Each WFC $D_i$ can be further coded by a coding function that generates coded components (CCs). $R_{i,1}, R_{i,2}, \ldots, R_{i,L}$ to be stored in or transported through multiple physical and logical dimensions. To 'read' the substreams $(S_1, S_2, \ldots, S_M)$, the set of CCs $\{R_{i,1}, R_{i,2}, \ldots, R_{i,L}\}$ (or its subset) associated with $D_i$ can be used to first decode $D_i$ via a decoding function; and then a subset (with size no less than M) of the WFCs $\{D_1, D_2, \ldots, D_{M+N}\}$ can be used to reconstitute $S_1, S_2, \ldots, S_M$ via K-demuxing followed by the recovery of the original data stream. Hence, in the writing process, K-muxing can be performed, proceeding the execution of the coding function. In the corresponding reading process, decoding takes place first, followed by K-demuxing.

Assume, in a writing process, a data stream is transformed by a K-muxer, generating WFCs $D_1, D_2, \ldots, D_{M+N}$. A coding function can be enabled to take all WFCs $(D_1, D_2, \ldots, D_{M+N})$ as input, generating CCs $(R_1, R_2, \ldots, R_L)$, where L is an integer, as output to be stored in or transported through multiple physical and logical dimensions. In the corresponding reading process, a decoding function can be enabled to take the set of CCs $\{R_1, R_2, \ldots, R_L\}$ or its subset as input, recovering the set of WFCs $\{D_1, D_2, \ldots, D_{M+N}\}$ or its subset as output. A K-demuxer can then be enabled to take the set of WFCs $\{D_1, D_2, \ldots, D_{M+N}\}$ or its subset as input and then reconstitute the original data stream.

One can also arrange the K-muxer and coding function as follows. Assume, in a writing process, a data stream is transformed by a K-muxer, generating WFCs $D_1, D_2, \ldots, D_{M+N}$. Several coding functions can be enabled in parallel, each of which takes one subset of the set $\{D_1, D_2, \ldots, D_{M+N}\}$ as input denoted by $\{D_{i,1}, D_{i,2}, \ldots, D_{i,Q}\}$, where Q is an integer, and generates a set of CCs $\{R_{i,1}, R_{i,2}, \ldots, R_{i,L}\}$ to be stored in and transported through multiple physical and logical dimensions. In the corresponding reading process, all or some decoding functions can be enabled, each of which can take one subset of some CC set $\{R_{i,1}, R_{i,2}, \ldots, R_{i,L}\}$ as input and generate a set of WFCs $\{D_{i,1}, D_{i,2}, \ldots, D_{i,Q}\}$ or its subset as output. A K-demuxer can then be enabled to take the set of WFCs $\{D_1, D_2, \ldots, D_{M+N}\}$ or its subset (with size no less than M) as input and then reconstitute the original data stream.

The K-muxer and coding function can also be arranged in different orders. Assume, in a writing process, a data stream is encoded by a coding function, generating CCs $R_1, R_2, \ldots, R_M$. A K-muxer can be enabled to take all CCs $(R_1, R_2, \ldots, R_M)$ as input, generating M+N WFCs $(D_1, D_2, \ldots, D_{M+N})$ as output to be stored in or transported through multiple physical and logical dimensions. In the corresponding reading process, a K-demuxer can be enabled to take a subset (with size no less than M) of the WFCs $(D_1, D_2, \ldots, D_{M+N})$ as input, generating the set of CCs $\{R_1, R_2, \ldots, R_M\}$ or its subset as output. A decoding function can then be enabled to take the set of CCs $\{R_1, R_2, \ldots, R_M\}$ or its subset as input and then reconstitute the original data stream.

One can also arrange the K-muxer and coding function as follows. Assume, in a writing process, a data stream is encoded by a coding function, generating CCs $R_1, R_2, \ldots, R_L$. Several K-muxers can be enabled in parallel, each of which takes one subset of the set $\{R_1, R_2, \ldots, R_L\}$ as input denoted by $\{R_{i,1}, R_{i,2}, \ldots, R_{i,M}\}$ and generates a set of WFCs $\{D_{i,1}, D_{i,2}, \ldots, D_{i,(M+N)}\}$ to be stored in and transported through multiple physical and logical dimensions. In the corresponding reading process, all or some K-demuxers can be enabled, each of which can take one subset (with size no less than M) of some WFC set $\{D_{i,1}, D_{i,2}, \ldots, D_{i,(M+N)}\}$ as input and generate a set of CCs $\{R_{i,1}, R_{i,2}, \ldots, R_{i,M}\}$ or its subset as output. A decoding function can then be enabled to take the set of CCs $\{R_1, R_2, \ldots, R_M\}$ or its subset as input and then reconstitute the original data stream.

K-muxers and K-demuxers can also be cascaded in designated order according to the requirements of resource allocation, as disclosed in this disclosure.

FIG. 1 is a diagram illustrating a system 100 using a data transport and/or storage processing system according to one embodiment. The system 100 includes a data transport and/or storage processing system 110, a source network 120, a source storage system 130, a source computer system 140, a destination network 170, a destination storage system 180, and a destination computer system 190. Note that the source device may be the same as the destination device. For example, the source network 120 may be the same as the destination network 170. The system 100 may contain more or less than the above components. The system 100 may function to transport data and write or transmit data to a storage system, such as the destination storage system 180. The system 100 may also function to transport data and read or receive data from a storage system, such as the source storage system 130. In addition, the system 100 may function to read or receive data from one end and to write or transmit data to another end, including both source devices and destination devices.

The data transport and/or storage processing system may receive or read a stream of data from the source network 120, the source storage system 130, or the source computer system 140. The data or stream of data may be an original stream of data or content that has not been processed by the processing system 110, or it may have already been processed by the processing system 110 and is now ready to be reconstituted to produce the original data or stream of data.

The source network 120 may be any type of network, wired or wireless, including broadband, local area network (LAN), the Internet, intranet, or cloud. The network 120 may connect to any device that have storage capability or produce content that may be transmitted. In one embodiment, the network 120 may be connected to storage devices 122 and 124. The storage devices 122 and 124 may be any one of a network attached storage (NAS) device, a direct access storage (DAS) device, or a storage area network (SAN) device. The NAS device may use any suitable data transmission methods, such as Transmission Control Protocol/Internet Protocol (TCP/IP), Ethernet. The DAS device may employ any of the interfaces such as small computer system interface (SCSI), serial attached SCSI (SAS), Advanced Technology Attachment (ATA), etc. The SAN device may use any suitable interface for data transmission such as Fiber Channel, IP.

The source storage system 130 may be a highly reliable storage system such as a group of redundant array of independent disks (RAIDs) $130_1, \ldots, 130_M$. The RAIDs 130 may be any type of RAIDs that provide data redundancy, fault tolerance, or performance improvement. Any suitable level may be configured. For example, RAID 0 provides striping that distributes contents of files among the disks, RAID 1 provides data mirroring in which data is written identically to two drives, thereby producing a "mirrored set" of drives.

The source computer system 140 may be any suitable computer system having storage capability, including a server, a desktop computer 142, a laptop computer, a mobile device such as panel computer or telephone, video or image capture device, etc. It may include storage devices such as hard disk 144, solid-state drive 146, or thumb drive 148.

The data from the source network 120, the source RAIDs 130, or the source computer system 140 are transferred to the processing system 110 via a bus or channel 150.

The processing system 110 processes the data and transmits, sends, writes, or stores the processed data to a destination device, including the destination network 170, the destination storage device 180, and the destination computer system 190. Similar to their source counterparts, the destination network 170 may connect to storage devices 172 and 174. The storage devices 172 and 174 may be any one of a NAS device, a DAS device, or a SAN device. The destination storage device 180 may have RAIDs $180_1, \ldots, 180_N$; and the destination computer system 190 may have a desktop computer 192, a hard drive 194, a solid-state drive (flash devices) 196, and a thumb drive 198. The writing or storing data into these destination devices may be performed in a distributed manner. In other words, output data streams from the processing system 110 may be distributed over any combination of these destination devices. For example, if there are 4 output streams from the processing system 110, three may be stored in the RAIDs 180, and one may be stored in a cloud storage device.

The system 100 may operate in a writing mode or a reading mode. In the writing mode, a source stream S is available to be processed and written or stored in any of the destination devices 170/180/190. There are a number of embodiments in the writing mode, shown in FIGS. 2, 4-10. In the reading mode, a number of storage streams are available from a least a storage device 120/130/140 to be processed to recover or reconstitute the source stream S. There are a number of embodiments in the reading mode, shown in FIGS. 11-16. In essence, the process in the reading mode of the data streams $D_i$'s operates in reverse of the process that writes the data streams $D_i$'s to the storage device(s).

Figure 2:
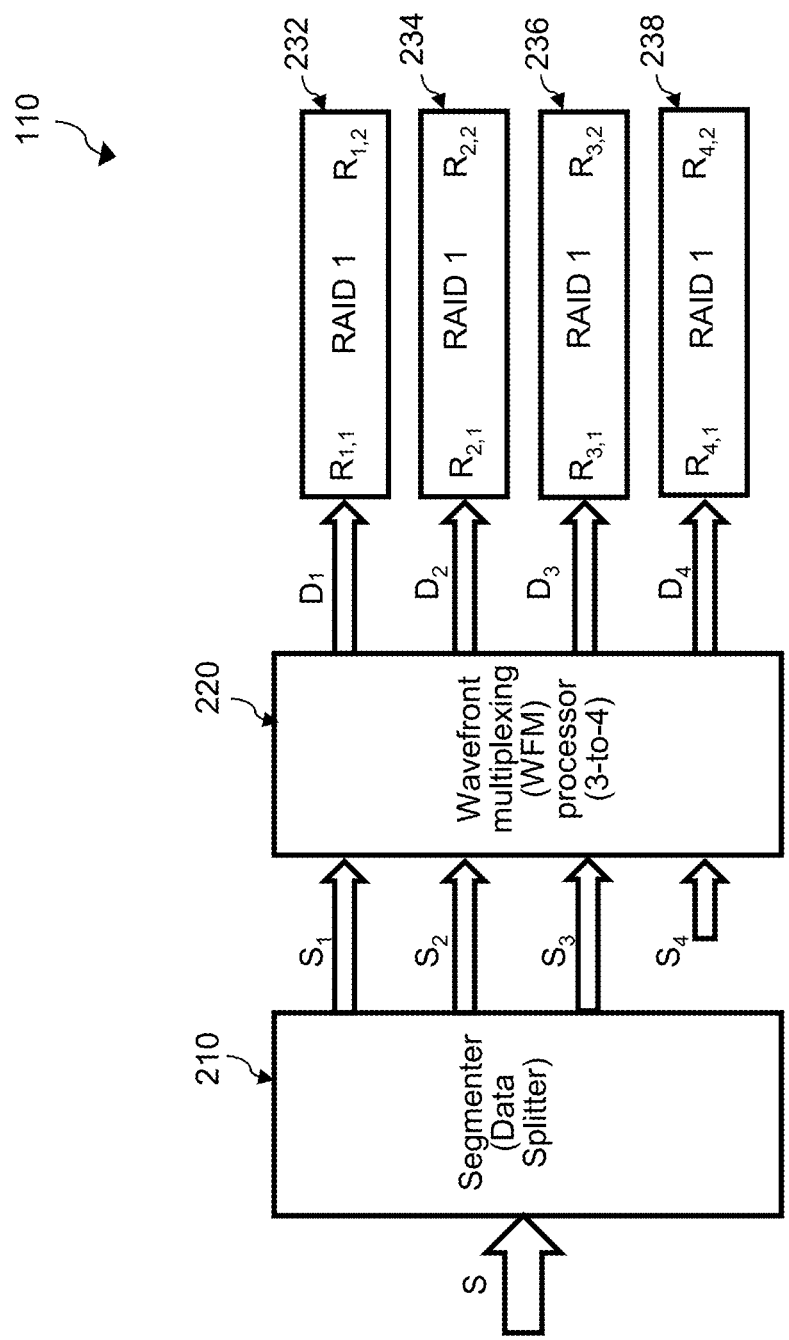
FIG. 2 is a diagram illustrating a data transport and/or storage processing system for transmitting or writing data to a storage system according to one embodiment.

FIG. 2 is a diagram illustrating the data transport and/or storage processing system 110 for transmitting or writing data to a storage system according to one embodiment. The processing system 110 may include a segmenter 210 and a WFM processor 220. The processing system 110 may include more or less than the above components. For clarity, components of the storage system 170/180/190 are shown in FIG. 2 as RAID 1 232, 234, 236, and 238. In other embodiments, any of the storage devices 170/180/190 may be used.

The segmenter 210 is a pre-processor that pre-processes the source stream S, which comes from a source device (e.g., the source network 120, the source storage system 130, or the source computer system 140) to produce the M input streams. In the illustrative example shown in FIG. 2, M=3. In other words, the segmenter 210 splits the source stream S into 3 data streams or segments $S_1$, $S_2$, and $S_3$. The splitting may be performed using a pre-determined method such as permutation.

The WFM processor 220 performs WFM on the M input streams to generate N output streams as the WF components (WFC). In the illustrative example in FIG. 2, M=3 and N=4. So, the WFM processor 220 performs the WFM on the 3 input streams or segments $S_1$, $S_2$, and $S_3$ to generate 4 output streams $D_1$, $D_2$, $D_3$, and $D_4$. The WFM is essentially a matrix multiplication of the input vector $S=(S_1, S_2, S_3)^T$ (T indicates a transpose vector) and the coefficient matrix $[w_{ij}]$ as follows:

$$\begin{bmatrix} D_1 \\ D_2 \\ D_3 \\ D_4 \end{bmatrix} = \begin{bmatrix} w_{11} & w_{12} & w_{13} \\ w_{21} & w_{22} & w_{23} \\ w_{31} & w_{32} & w_{33} \\ w_{41} & w_{42} & w_{43} \end{bmatrix} \begin{bmatrix} S_1 \\ S_2 \\ S_3 \end{bmatrix}. \quad (1)$$

Equation (1) gives rise to the following:

$$D_1 = w_{11}S_1 + w_{12}S_2 + w_{13}S_3 \quad (2a)$$

$$D_2 = w_{21}S_1 + w_{22}S_2 + w_{23}S_3 \quad (2b)$$

$$D_3 = w_{31}S_1 + w_{32}S_2 + w_{33}S_3 \quad (2c)$$

$$D_4 = w_{41}S_1 + w_{42}S_2 + w_{43}S_3 \quad (2d)$$

As seen from the above equations, each of the output streams $D_i$'s (i=1, 2, 3, 4), may be considered as a linear combination of the coefficients $w_{ij}$'s (i=1, 2, 3, 4; j=1, 2, 3), and the input streams $S_j$' (j=1, 2, 3). To solve for $S_j$'s (j=1, 2, 3), we need only three independent equations. Since there are 4 equations, one is extraneous and may be ignored. For example, the output $D_4$ may not be used. Alternatively, all 4 may be used with one is redundant, used for increasing fault tolerance in case one of the three outputs is in error or lost. Suppose $D_4$ is not used, the above set of equations reduces to (2a), (2b) and (2c) which can be solved by a number of methods such as substitution, elimination, or Kramer's rule, as are well known by one skilled in the art.

The three column vectors of the matrix in (1) represent three 'wavefronts' that feature three distribution patterns of segments $S_1$, $S_2$ and $S_3$ respectively. Each coefficient $w_{ij}$ can take real or complex value. As discussed above, any submatrix comprising three rows of the matrix in (1) has full rank in order to fulfill the redundancy requirements: any three wavefront components (WFCs) of $D_1$, $D_2$, $D_3$ and $D_4$ are sufficient to recover three segments $S_1$, $S_2$ and $S_3$.

Another way to envision this transformation is to assume there are 4 input streams $S_1$, $S_2$, $S_3$, and $S_4$, and the input vector [S] is a column vector with 4 components where $S_4$ is set to zero. The coefficient matrix therefore may be organized as a 4×4 matrix. The matrix multiplication may be performed as follows:

$$\begin{bmatrix} D_1 \\ D_2 \\ D_3 \\ D_4 \end{bmatrix} = \begin{bmatrix} w_{11} & w_{12} & w_{13} & w_{14} \\ w_{21} & w_{22} & w_{23} & w_{24} \\ w_{31} & w_{32} & w_{33} & w_{34} \\ w_{41} & w_{42} & w_{43} & w_{44} \end{bmatrix} \begin{bmatrix} S_1 \\ S_2 \\ S_3 \\ 0 \end{bmatrix}. \quad (3)$$

The output from each WFC is processed by RAID 1 that performs mirroring, namely replication. Data storage sites or devices 232, 234, 236, and 238 perform 'mirroring' functions such that $D_i = R_{i,1}$, $R_{i,2}$, i=1, 2, 3, 4. Four sets $\{R_{i,1}, R_{i,2}\}$, i=1, 2, 3, 4, may be stored in four physical and logical dimensions such as four separate network-attached storage (NAS) sites or devices. These NAS sites may be local NAS sites, on private cloud or on public cloud. One such distribution may feature three local NAS sites and the remaining one in a storage site on public cloud. The local distribution of three WFM data sites will be sufficient for reconstituting the stored data, while the one on cloud provides additional redundancy.

The WFM processor 220 may also be re-configured to take a known data stream as a $4^{th}$ input (not shown). This 'injected' data stream may appear as a dominating 'envelope' over the four WFCs $D_1$, $D_2$, $D_3$ and $D_4$. Systems, methods and apparatus for digital enveloping have been discussed extensively in the U.S. patent application Ser. No. 14/512,959, filed on Oct. 13, 2014. The WFM processor 220 may perform WFM on the M input streams including an envelope to generate the N output streams including an enveloped output stream which is substantially identical to the envelope.

Figure 3:
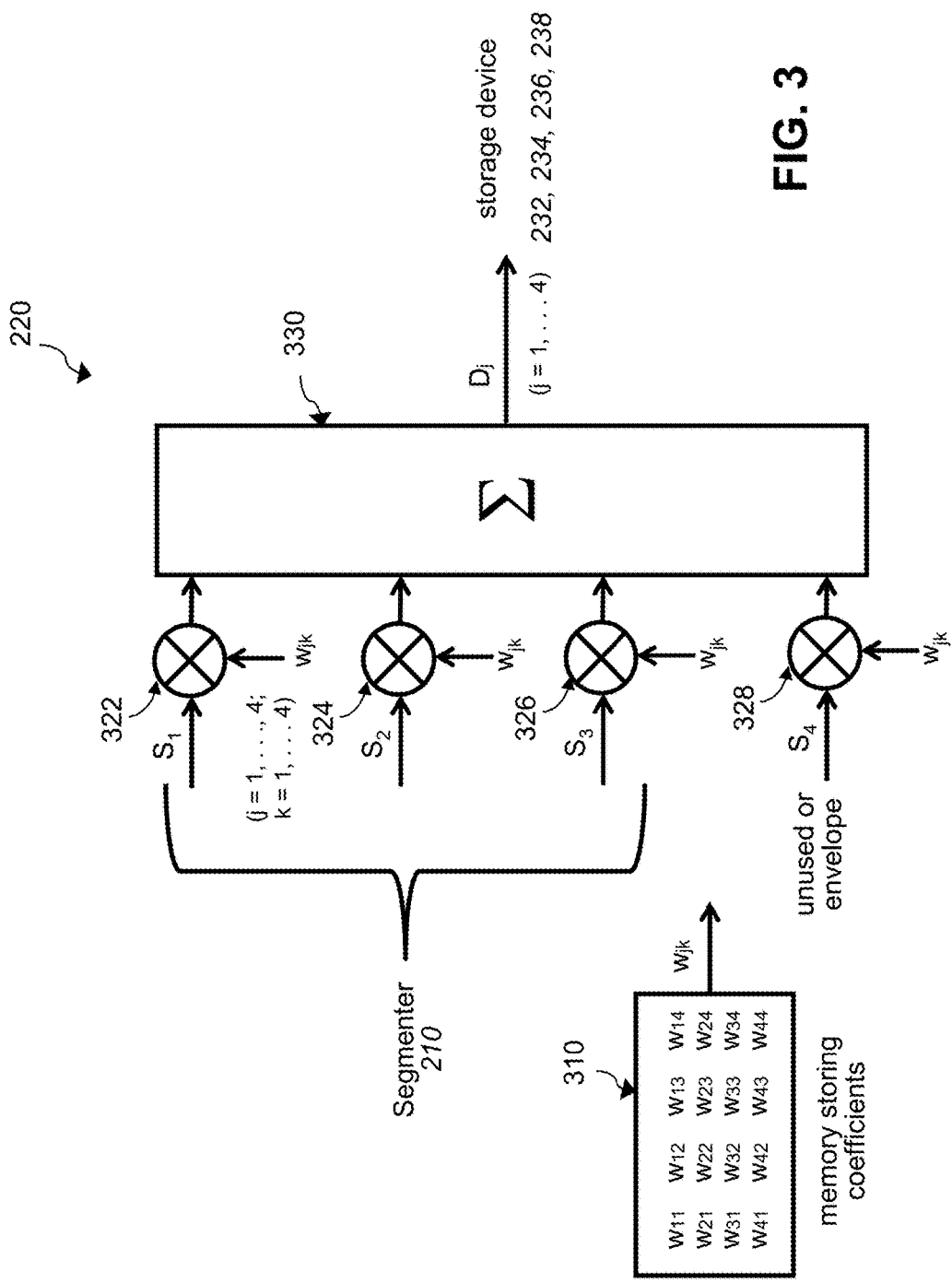
FIG. 3 is a diagram illustrating an architecture for the data transport and/or storage processing system according to one embodiment.

FIG. 3 is a diagram illustrating an architecture for the data transport and/or storage processing system 220 according to one embodiment. The architecture correspond to the 4×4 matrix shown in Equation (2) above. The processing system 220 includes a storage device 310 such as a memory that stores the coefficients $w_{jk}$'s (j,k=1, . . . , 4), multipliers 322, 324, 326, and 328 and an adder 330. For fully parallel operations, four sets of the 4 multipliers and one adder will be needed. Any combination of devices may be employed. For example, a single multiplier and a 2-input adder may be used where the multiplier performs multiplication sequentially and the adder acts like an accumulator to accumulate the partial products. The input $S_4$ may be unused or us an envelope for envelope processing as discussed above. The four multipliers 322, 324, 326, and 328 and the adder 330 may form a linear combiner that perform a linear combination of the coefficients $w_{jk}$'s and the input streams $S_k$'s as discussed above.

It should also be noted that while the architecture 220 is shown for the WFM processor, it is also applicable for the WFD processor because both types of processor involve a matrix multiplication. The differences are the types of inputs and outputs and the matrix coefficients in the memory 310.

Figure 4:
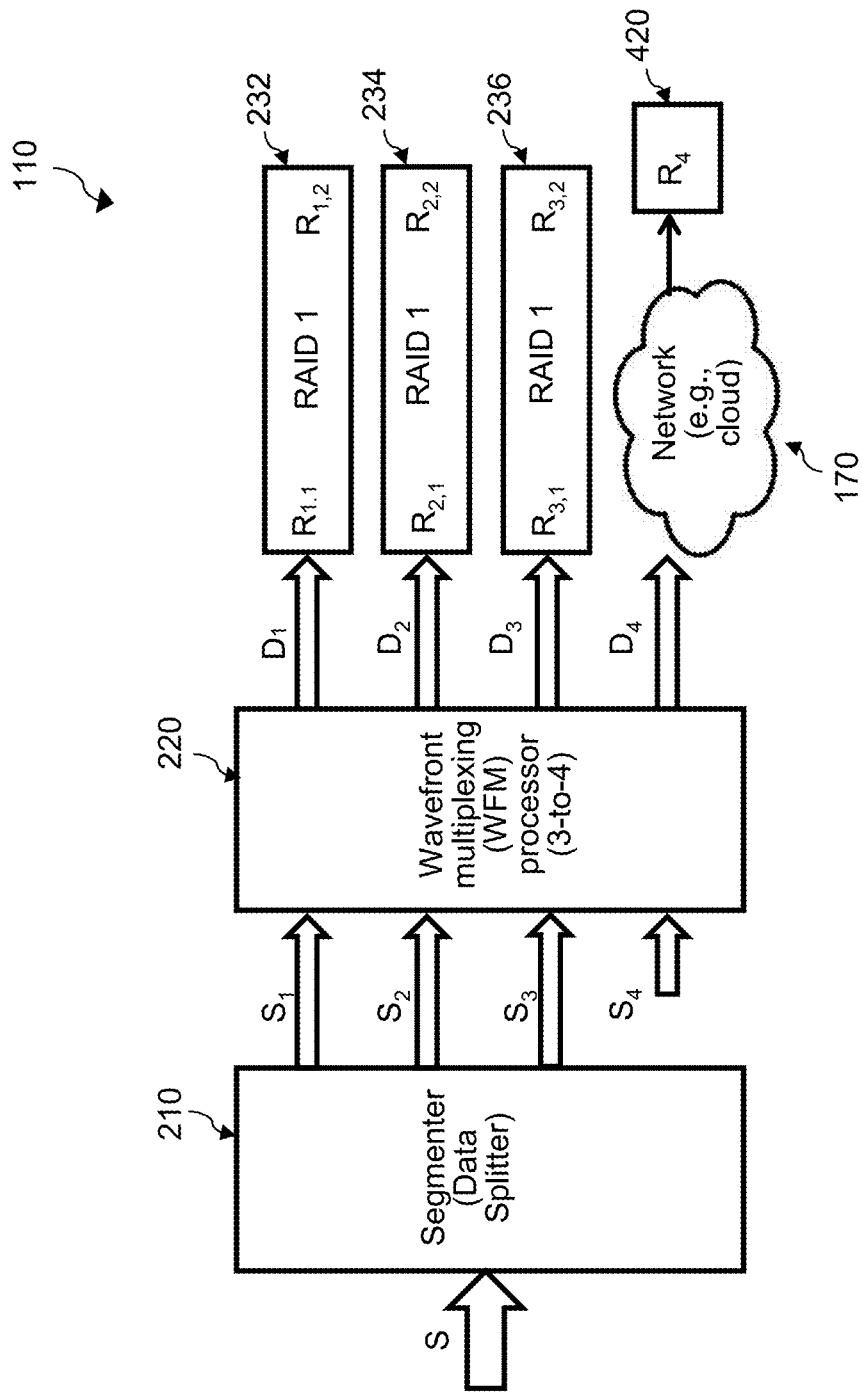
FIG. 4 is a diagram illustrating a data transport and/or storage processing system for transmitting or writing data to three local storage systems and one cloud storage device according to one embodiment.

FIG. 4 is a diagram illustrating the data transport and/or storage processing system 110 for transmitting or writing data to three local storage systems and one cloud storage device according to one embodiment. The processing system 110 in FIG. 4 is similar to the system 110 in FIG. 2 except that the RAID 1 device 238 is replaced by the network cloud 170 and a storage device $R_4$ 420.

The WFM processor 220 performs WFM on the three input streams $S_1$, $S_2$ and $S_3$ and generates the four output streams WFCs $D_1$, $D_2$, $D_3$ and $D_4$ as given in equation (1) above. The three output streams $D_1$, $D_2$, $D_3$ are written or stored in three local storage devices 232, 234, and 236, respectively (e.g., local NAS sites). The output stream $D_4$ may be stored in a public storage $R_4$ 420 via cloud 170. As discussed above, the data stored locally are sufficient to recover the segmented streams $S_1$, $S_2$, and $S_3$. In case one is lost or the corresponding NAS site fails, the data $D_4$ may be retrieved from the cloud storage 420. It then can be used together with the remaining two data streams to recover the segmented streams $S_1$, $S_2$, and $S_3$.

Figure 5:
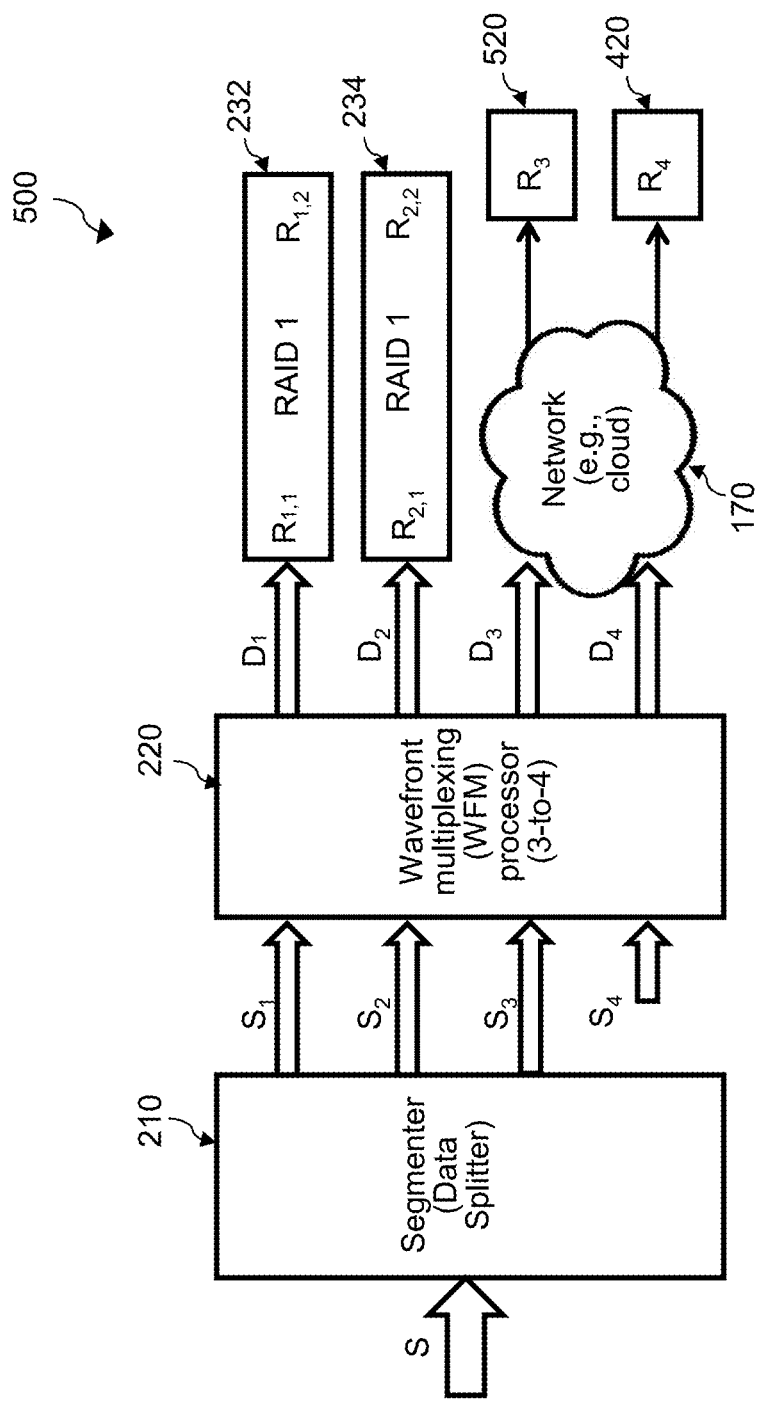
FIG. 5 is a diagram illustrating a data transport and/or storage processing system for transmitting or writing data to two local storage systems and two cloud storage devices according to one embodiment.

FIG. 5 is a diagram illustrating the data transport and/or storage processing system 110 for transmitting or writing data to two local storage systems and two cloud storage devices according to one embodiment. The processing system 110 in FIG. 5 is similar to the system 110 in FIG. 2 except that the RAID 1 device 238 and RAID 1 device 236 are replaced by the network cloud 170 and two storage devices $R_3$ 520 and $R_4$ 420.

As discussed above, the two data streams $D_1$ and $D_2$ stored in the local NAS devices 232 and 234 are not sufficient to recover the segmented streams $S_1$, $S_2$, and $S_3$. One data stream stored on the cloud devices $R_3$ 520 and $R_4$ 420 may be retrieved to be used together with the two data streams $D_1$ and $D_2$ to recover the segmented streams $S_1$, $S_2$, and $S_3$.

Figure 6:
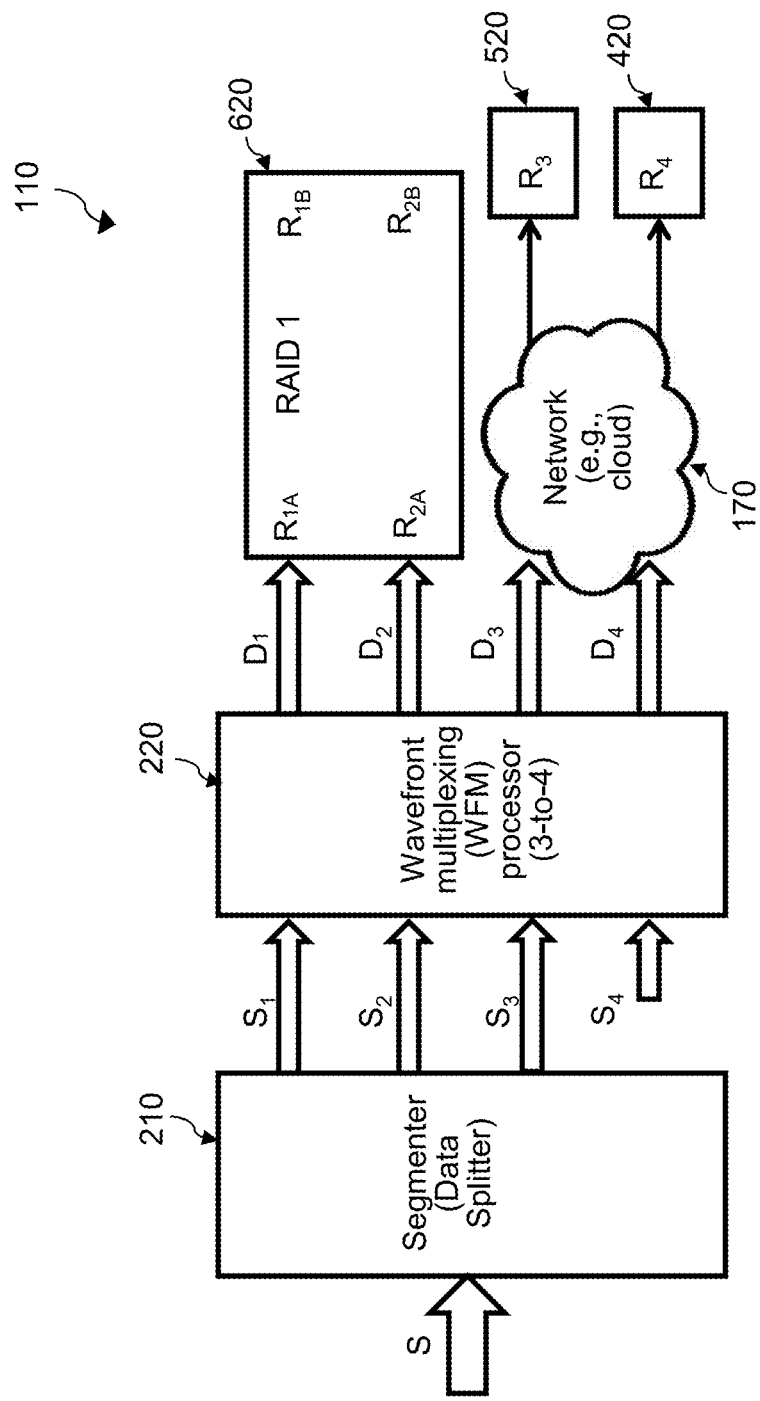
FIG. 6 is a diagram illustrating a data transport and/or storage processing system for transmitting or writing data to a storage system having two devices and two cloud storage devices according to one embodiment.

FIG. 6 is a diagram illustrating a data transport and/or storage processing system for transmitting or writing data to a storage system having two devices and two cloud storage devices according to one embodiment. The processing system 110 in FIG. 6 is similar to the processing system 110 in FIG. 5 except that the two NAS sites RAID 1 device 232 and RAID 1 device 234 are replaced by a local NAS site 620 that stores $D_1$ and $D_2$ in a RAID 1 manner (i.e., mirroring).

As above, the two data streams $D_1$ and $D_2$ stored in the local NAS device 620 are not sufficient to recover the segmented streams $S_1$, $S_2$, and $S_3$. One data stream stored on the cloud devices $R_3$ 520 and $R_4$ 420 may be retrieved to be used together with the two data streams $D_1$ and $D_2$ to recover the segmented streams $S_1$, $S_2$, and $S_3$.

Figure 7:
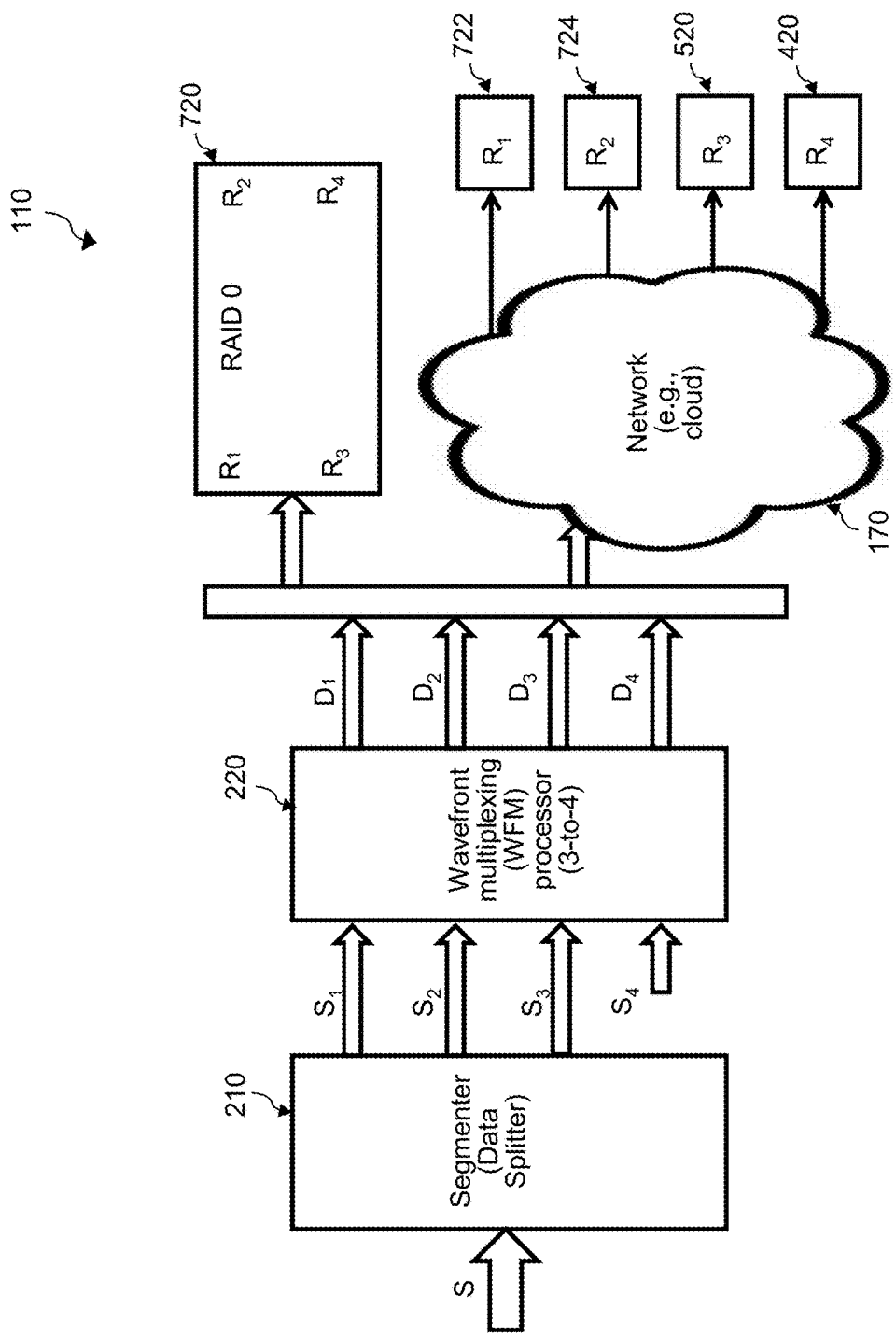
FIG. 7 is a diagram illustrating a data transport and/or storage processing system for transmitting or writing data to a storage system and four cloud storage devices according to one embodiment.

FIG. 7 is a diagram illustrating the data transport and/or storage processing system 110 for transmitting or writing data to a storage system and four cloud storage devices according to one embodiment. The processing system 110 is similar to the processing system 110 in FIGS. 2, 4-6 except in the destination storage devices. In FIG. 7, the 4 output streams $D_1$, $D_2$, $D_3$, and $D_4$ are stored in local NAS site 720 in a RAID 0 configuration and are also stored in four storage devices $R_1$ 722, $R_2$ 724, $R_3$ 520, and $R_4$ 420.

In the local NAS site 720, four storage devices store all four but not redundantly. Therefore, while there is no local redundancy, any three of the data streams may be retrieved to reconstitute the segmented streams $S_1$, $S_2$, and $S_3$. If one or two of the devices fail, the data streams may be retrieved from the corresponding cloud storage devices.

Figure 8:
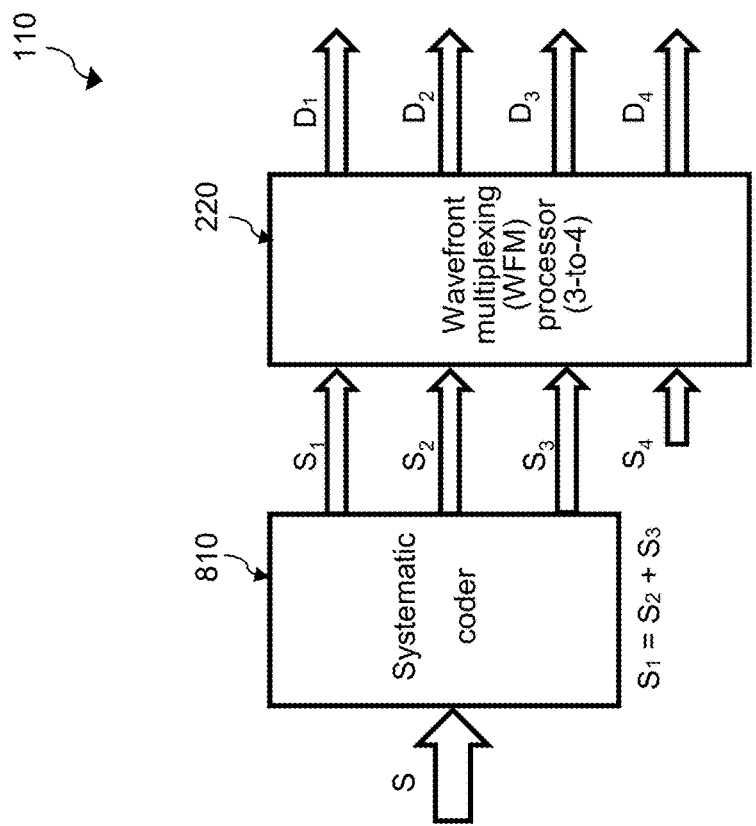
FIG. 8 is a diagram illustrating a data transport and/or storage processing system for transmitting or writing data using a systematic coder according to one embodiment.

FIG. 8 is a diagram illustrating the data transport and/or storage processing system 110 for transmitting or writing data using a systematic coder according to one embodiment. The processing system 110 includes a systematic code 810 and the WFM processor 220. The WFM processor 220 is similar to the WFM processor 220 in FIG. 2 and therefore does not need further description. Similarly, the writing or storing the four output streams $D_1$, $D_2$, $D_3$, and $D_4$ may be any one of the previously described schemes in FIGS. 2-7 and therefore is not described further.

The systematic coder 810 transforms or converts the source stream S into three input streams $S_1$, $S_2$, and $S_3$. The systematic coder 810 encodes the source stream S with a systematic code and then splits the encoded stream into three input streams $S_1$, $S_2$, and $S_3$. A systematic code may be any error-correcting code in which the data in the source stream is embedded in the encoded data. For example, checksums and hash functions may be combined with the source stream. As another example, $S_3$ may be the parity data stream as a numerical combination of $S_1$ and $S_2$. Any two of the three input streams $S_1$, $S_2$, and $S_3$ may be used to reconstitute the source stream S.

Figure 9:
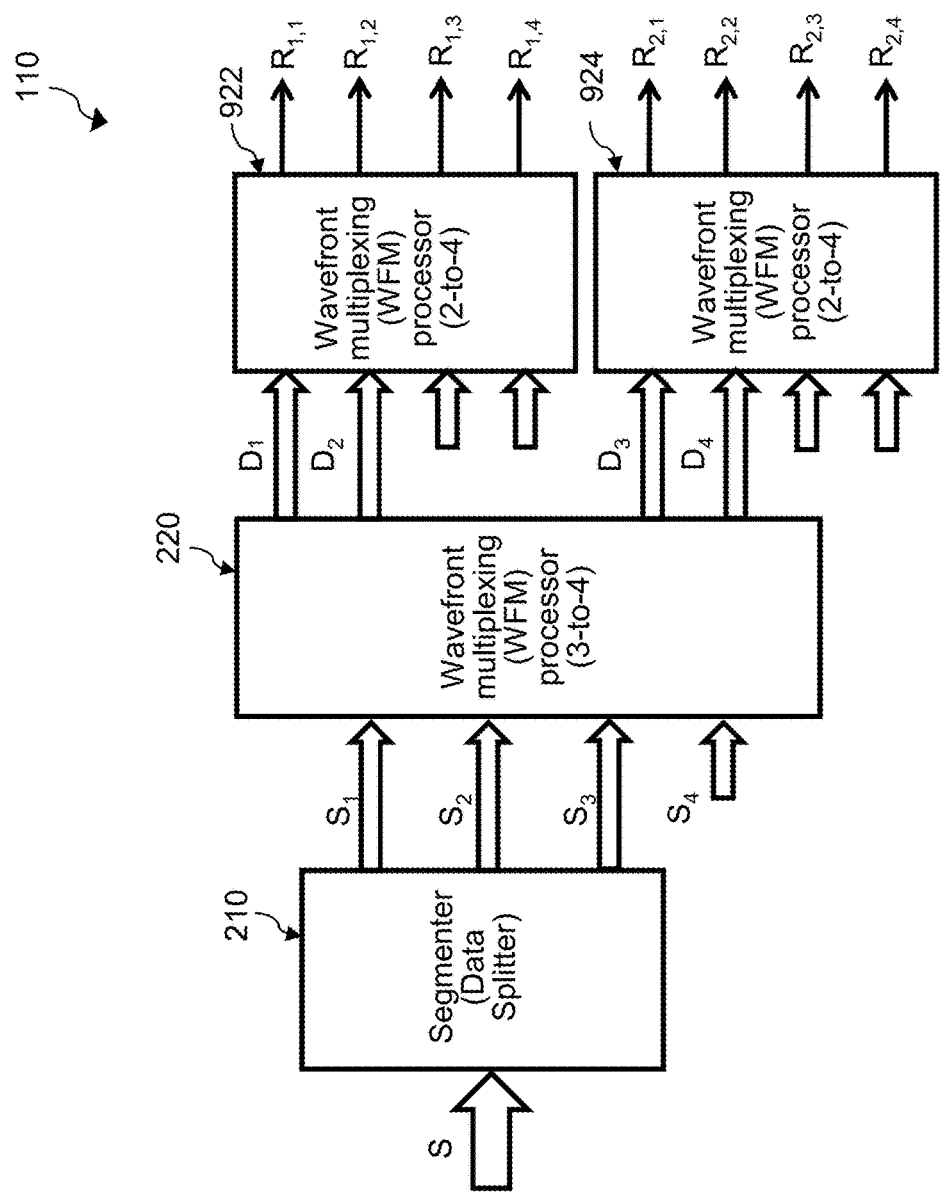
FIG. 9 is a diagram illustrating a data transport and/or storage processing system for transmitting or writing data using a cascaded structure for the WFM processor according to one embodiment.

FIG. 9 is a diagram illustrating the data transport and/or storage processing system 110 for transmitting or writing data using a cascaded structure for the WFM processor according to one embodiment. The processing system 110 in FIG. 9 is similar to the processing system 110 in FIG. 2 except that the WFM operation is performed by additional WFM processors arranged in a serially cascaded configuration.

The cascaded structure includes two levels of WFM processors. In the first level, a first WFM processor performs WFM on M input streams to generate N output streams. In the second level, a second WFM processor performs WFM on the N output streams to produce storage streams to be stored in a storage device. In the illustrative example in FIG. 9, the first level WFM processor is the WFM processor 220 and the second WFM processor includes two WFM processors 922 and 924 each operating on a subset of N data streams. Specifically, the WFM processor 220 performs WFM on the input streams $S_1$, $S_2$, and $S_3$ to produce the four output streams $D_1$, $D_2$, $D_3$, and $D_4$. The WFM processor 922 performs WFM on two streams $D_1$ and $D_2$, to generate four storage streams $R_{1,1}$, $R_{1,2}$, $R_{1,3}$, and $R_{1,4}$. The WFM processor 924 performs WFM on two streams $D_3$ and $D_4$, to generate four storage streams $R_{2,1}$, $R_{2,2}$, $R_{2,3}$, and $R_{2,4}$.

The WFM performed by the WFM processor 922 and 924 is similar to that performed by the WFM 220 except the number of inputs and the matrix coefficients are different. The WFM processor 922 performs the WFM as a matrix multiplication as follows:

$$\begin{bmatrix} R_{1,1} \\ R_{1,2} \\ R_{1,3} \\ R_{1,4} \end{bmatrix} = \begin{bmatrix} \rho_{11} & \rho_{12} \\ \rho_{21} & \rho_{22} \\ \rho_{31} & \rho_{32} \\ \rho_{41} & \rho_{42} \end{bmatrix} \begin{bmatrix} D_1 \\ D_2 \end{bmatrix}. \quad (4)$$

Similarly as in FIG. 2, the coefficient $\rho_{ij}$'s may take real or complex values. Any sub-matrix comprising two rows of the matrix in (4) has full rank in order to fulfill the redundancy requirements: any two WFCs of $R_{1,1}$, $R_{1,2}$, $R_{1,3}$ and $R_{1,4}$ are sufficient to recover two WFCs $D_1$ and $D_2$. The WFM processor 924 may follow a similar configuration: Any two WFCs of $R_{2,1}$, $R_{2,2}$, $R_{2,3}$ and $R_{2,4}$ are sufficient to recover two WFCs $D_3$ and $D_4$.

The writing or storing of the storage streams $R_{1,1}$, $R_{1,2}$, $R_{1,3}$ and $R_{1,4}$ and $R_{2,1}$, $R_{2,2}$, $R_{2,3}$ and $R_{2,4}$ is similar to the embodiments described earlier in FIGS. 2, 4-6.

Figure 10:
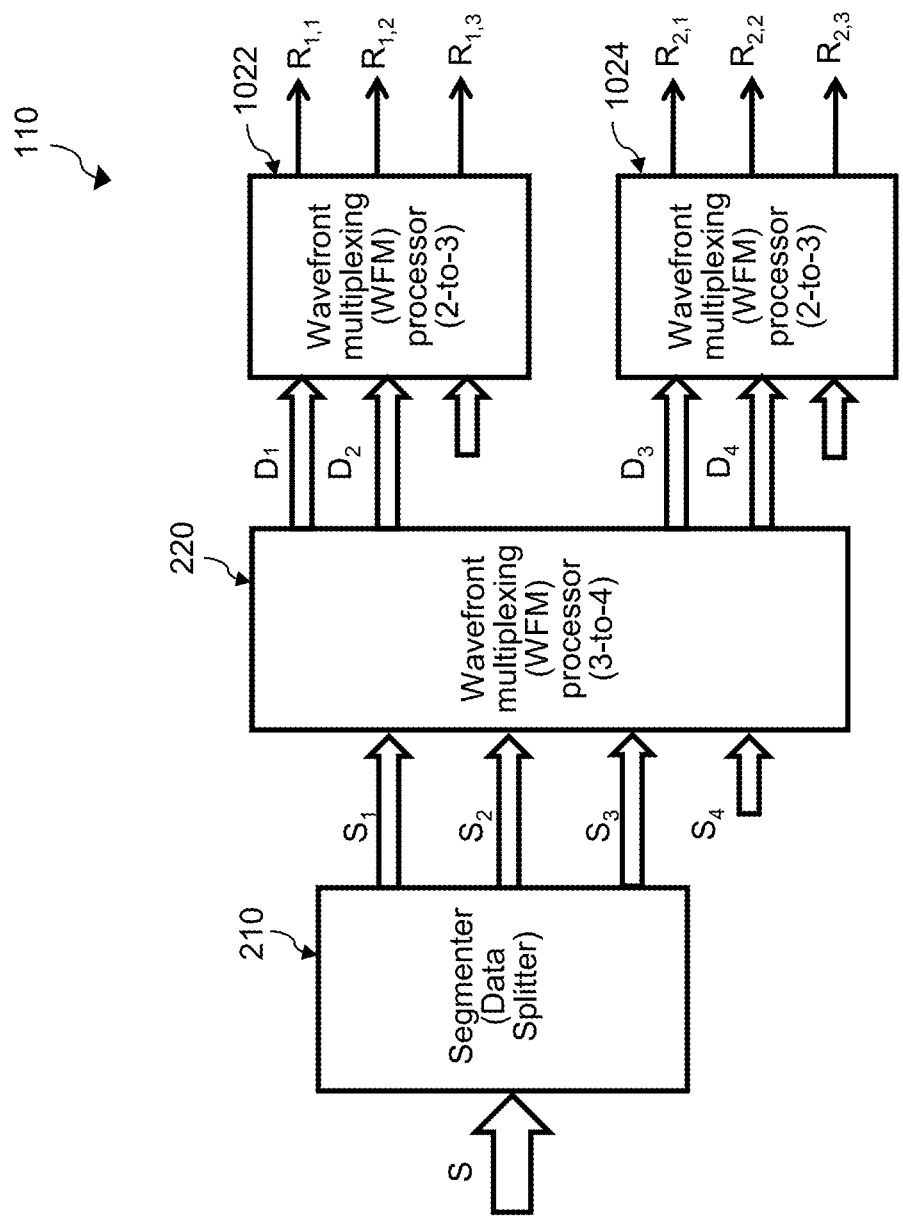
FIG. 10 is a diagram illustrating a data transport and/or storage processing system for transmitting or writing data using a cascaded structure for the WFM processor according to one embodiment.

FIG. 10 is a diagram illustrating the data transport and/or storage processing system 110 for transmitting or writing data using a cascaded structure for the WFM processor according to one embodiment. The processing system 110 in FIG. 10 is similar to the processing system 110 in FIG. 9 except that the WFM processors in the second level each generates three storage streams. The processing system 110 includes the segmenter 210, the WFM processor 220, and two WFM processors 1022 and 1034.

The WFM processor 1022 performs WFM on two streams $D_1$ and $D_2$, to generate three storage streams $R_{1,1}$, $R_{1,2}$, and $R_{1,3}$. The WFM processor 924 performs WFM on two streams $D_3$ and $D_4$, to generate three storage streams $R_{2,1}$, $R_{2,2}$, and $R_{2,3}$.

The WFM performed by the WFM processor 1022 and 1024 is similar to that performed by the WFM 220 except the number of inputs and the matrix coefficients are different. The WFM processor 1022 performs the WFM as a matrix multiplication as follows:

$$\begin{bmatrix} R_{1,1} \\ R_{1,2} \\ R_{1,3} \end{bmatrix} = \begin{bmatrix} \sigma_{11} & \sigma_{12} \\ \sigma_{21} & \sigma_{22} \\ \sigma_{31} & \sigma_{32} \end{bmatrix} \begin{bmatrix} D_1 \\ D_2 \end{bmatrix}. \quad (5)$$

Similarly as in FIG. 9, the coefficient $\rho_{ij}$'s may take real or complex values. Any sub-matrix comprising two rows of the matrix in (5) has full rank in order to fulfill the redundancy requirements: any two WFCs of $R_{1,1}$, $R_{1,2}$, and $R_{1,3}$ are sufficient to recover two WFCs $D_1$ and $D_2$. The WFM processor 1024 may follow a similar configuration: Any two WFCs of $R_{2,1}$, $R_{2,2}$, and $R_{2,3}$ are sufficient to recover two WFCs $D_3$ and $D_4$.

The writing or storing of the storage streams $R_{1,1}$, $R_{1,2}$, and $R_{1,3}$ and $R_{2,1}$, $R_{2,2}$, and $R_{2,3}$ is similar to the embodiments described earlier in FIGS. 2, 4-6.

Figure 11:
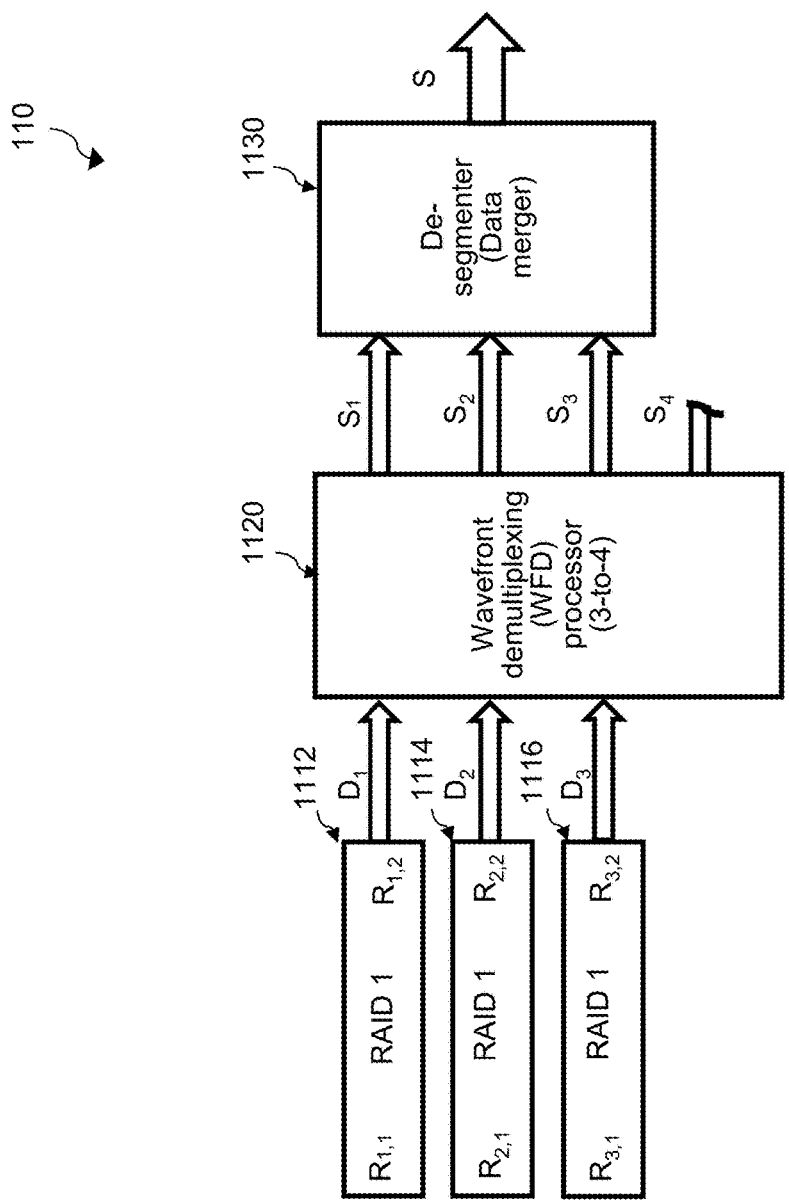
FIG. 11 is a diagram illustrating a data transport and/or storage processing system for receiving or reading data from a storage system according to one embodiment.

FIG. 11 is a diagram illustrating the data transport and/or storage processing system 110 for receiving or reading data from a storage system according to one embodiment. The processing system 110 includes storage devices 1112, 1114, and 1116, WF de-multiplexing (WFD) processor 1120, and a de-segmenter 1130. The processing system 110 may include more or less than the above components. For clarity, components of the storage system 120/130/140 are shown in FIG. 11 as RAID 1112, 1114, and 1116. In other embodiments, any of the storage devices 120/130/140 may be used.

The storage devices 1112, 1114, and 1116 represent any of the source storage devices 120, 130 and 140 shown in FIG. 1. In the illustrative example shown in FIG. 11, they are NAS storage devices configured as RAID 1. The storage device 1112 stores mirrored data in $R_{1,1}$ and $R_{1,2}$ which include the stream $D_1$. The storage device 1114 stores mirrored data in $R_{2,1}$ and $R_{2,2}$ which include the stream $D_2$. The storage device 1116 stores mirrored data in $R_{3,1}$ and $R_{3,2}$ which include the stream $D_3$.

The WFD processor 1120 performs WFD on M input streams to generate N output streams. In the illustrative example in FIG. 11, M=3 and N=4. The WFD processor 1120 performs WFD on the 3 input streams $D_1$, $D_2$, and $D_3$, and generates 4 output streams $S_1$, $S_2$, $S_3$, and $S_4$. The WFD essentially is the reverse operation of the WFM. To successfully recover the original source stream S, at least three NAS sites should be available. This operation is a matrix multiplication of the column vector $(D_1, D_2, D_3)^T$ using the following equations to recover the column vector $(S_1, S_2, S_3, S_4)^T$:

$$S_1 = w_{11} \cdot D_1 + w_{12} \cdot D_2 + w_{13} \cdot D_3 \quad (6a)$$

$$S_2 = w_{21} \cdot D_1 + w_{22} \cdot D_2 + w_{23} \cdot D_3 \quad (6b)$$

$$S_3 = w_{31} \cdot D_1 + w_{32} \cdot D_2 + w_{33} \cdot D_3 \quad (6c)$$

$$S_4 = w_{41} \cdot D_1 + w_{42} \cdot D_2 + w_{43} \cdot D_3 \quad (6d)$$

The WFD processor 1120 may generate one redundant data stream $S_4$. This data stream $S_4$ may be left unused or is used for integrity check against possible compromised stored/transported data streams.

When the M input streams are known to be generated using an envelope, the first WFD processor performs WFD on the M input streams including an envelope to generate the N output streams including a de-enveloped output stream.

The de-segmenter 1130 acts as a post-processor to de-segment or to merge the output streams $S_1$, $S_2$, $S_3$, and $S_4$ into the source stream S. The de-segmentation is the reverse of the known segmentation in the writing or storing process.

Figure 12:
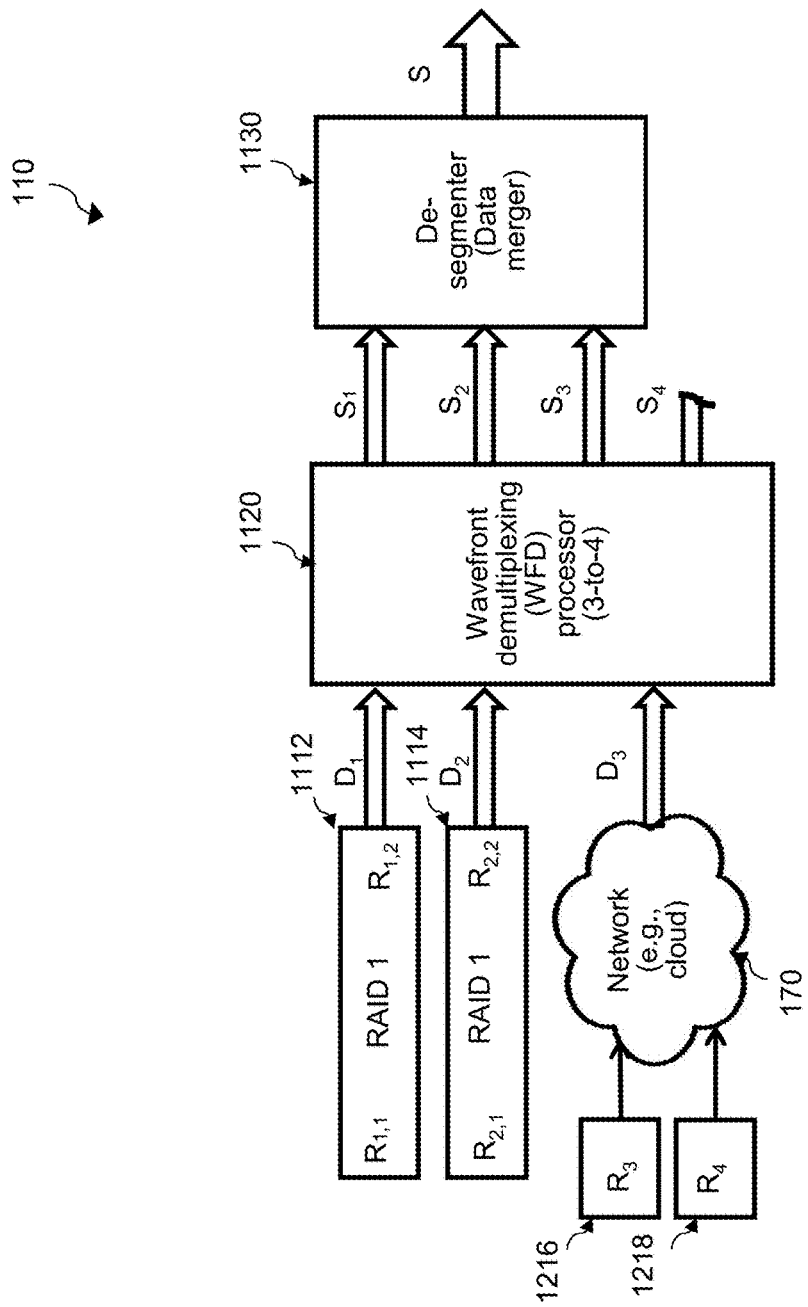
FIG. 12 is a diagram illustrating a data transport and/or storage processing system for receiving or reading data from a storage system and a cloud storage according to one embodiment.

FIG. 12 is a diagram illustrating the data transport and/or storage processing system 110 for receiving or reading data from two local storage systems and two cloud storage devices according to one embodiment. The processing system 110 is configured to correspond to the configuration shown in FIG. 5. The storage system 120/130/140 in FIG. 12 is similar to the storage system 170/180/190 shown in FIG. 5. This configuration includes two local storage systems such as NAS devices 1112 and 1114 and two cloud storage devices $R_3$ 1216 and $R_4$ 1218 via the cloud 120.

The WFD processor 1120 performs WFD on M input streams to generate N output streams. In the illustrative example in FIG. 12, M=3 and N=4. The WFD processor 1120 performs WFD on the 3 input streams $D_1$, $D_2$, and $D_3$, and generates 4 output streams $S_1$, $S_2$, $S_3$, and $S_4$. The WFD essentially is the reverse operation of the WFM. As in the configuration in FIG. 11, the WFD processor 1120 may generate one redundant data stream $S_4$. This data stream $S_4$ may be left unused or is used for integrity check against possible compromised stored/transported data streams. The de-segmenter 1130 acts as a post-processor to de-segment or to merge the output streams $S_1$, $S_2$, $S_3$, and $S_4$ into the source stream S. The de-segmentation is the reverse of the known segmentation in the writing or storing process.

Figure 13:
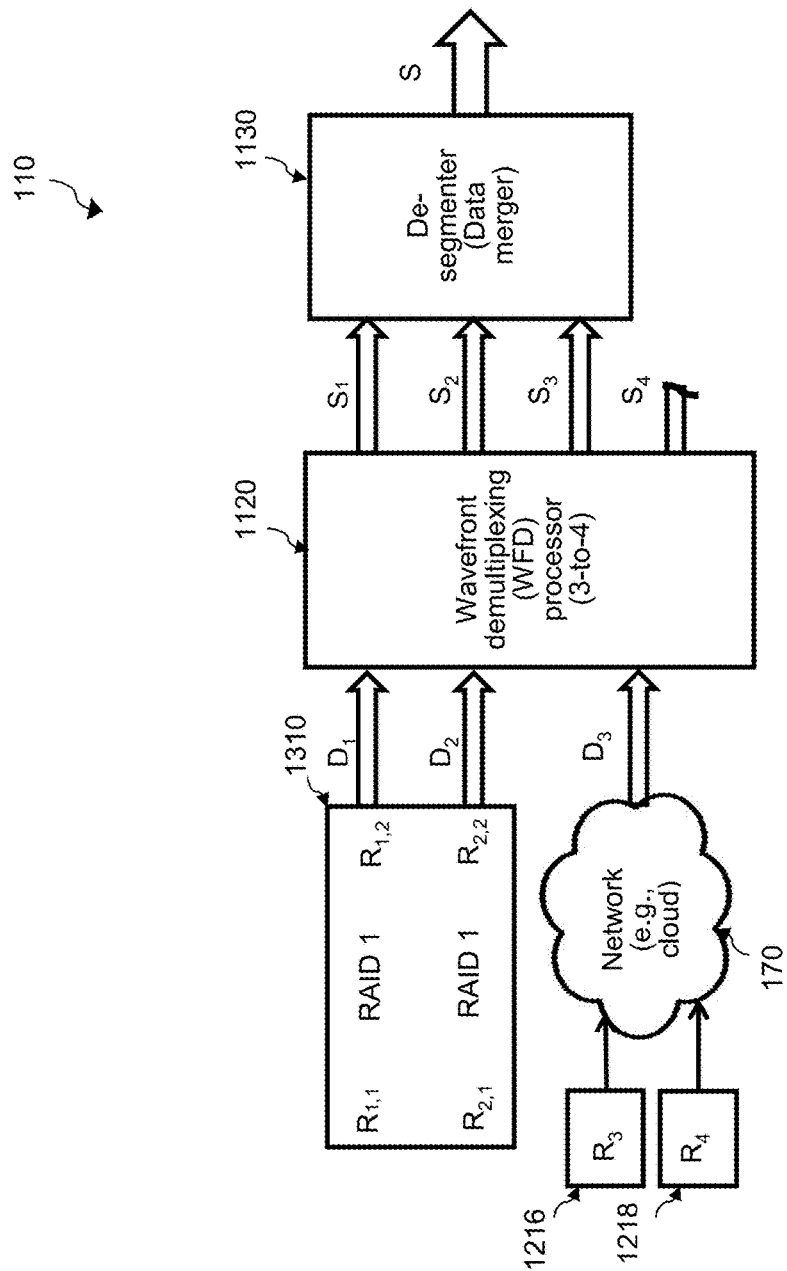
FIG. 13 is a diagram illustrating a data transport and/or storage processing system for receiving or reading data from a storage system and a cloud storage according to one embodiment.

FIG. 13 is a diagram illustrating the data transport and/or storage processing system 110 for receiving or reading data from a local storage system and two cloud storage devices according to one embodiment. The processing system 110 is configured to correspond to the configuration shown in FIG. 6. The storage system 120/130/140 in FIG. 12 is similar to the storage system 170/180/190 shown in FIG. 6. This configuration includes a local storage site 1310 having two storage systems such as NAS devices as RAID 1 to store data streams $R_1$ and $R_2$ in mirrored format and two cloud storage devices $R_3$ 1216 and $R_4$ 1218 via the cloud 120.

The WFD processor 1120 performs WFD on M input streams to generate N output streams. In the illustrative example in FIG. 12, M=3 and N=4. The WFD processor 1120 performs WFD on the 3 input streams $D_1$, $D_2$, and $D_3$, and generates 4 output streams $S_1$, $S_2$, $S_3$, and $S_4$. The WFD essentially is the reverse operation of the WFM. As in the configuration in FIG. 11, the WFD processor 1120 may generate one redundant data stream $S_4$. This data stream $S_4$ may be left unused or is used for integrity check against possible compromised stored/transported data streams. The de-segmenter 1130 acts as a post-processor to de-segment or to merge the output streams $S_1$, $S_2$, $S_3$, and $S_4$ into the source stream S. The de-segmentation is the reverse of the known segmentation in the writing or storing process.

Figure 14:
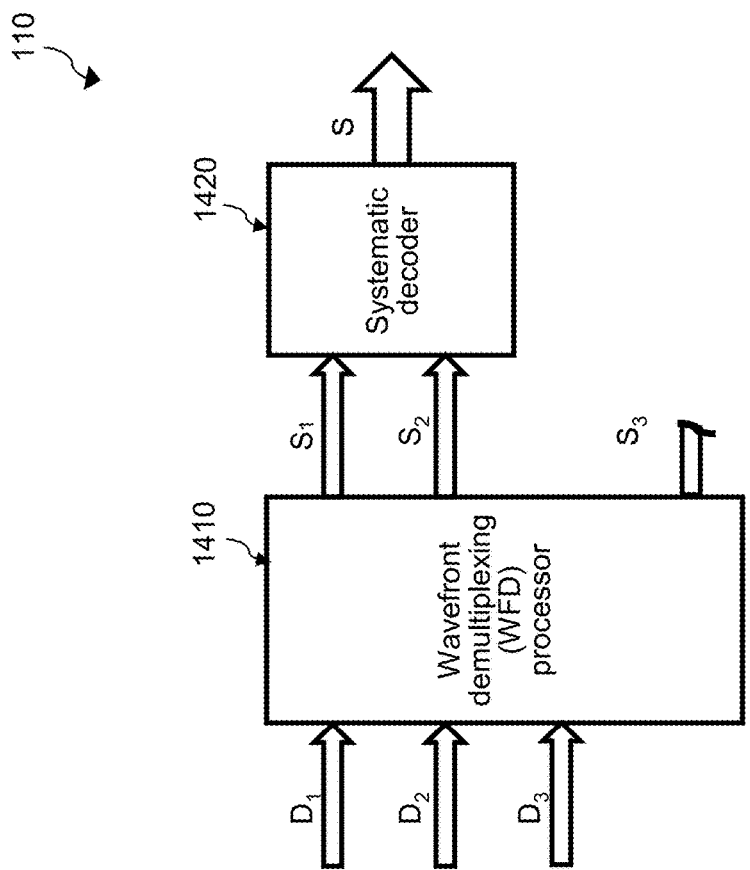
FIG. 14 is a diagram illustrating a data transport and/or storage processing system for receiving or reading data using a systematic decoder according to one embodiment.

FIG. 14 is a diagram illustrating the data transport and/or storage processing system 110 for receiving or reading data using a systematic decoder according to one embodiment. The processing system 110 includes a WFD processor 1410 and a systematic decoder 1420. The configuration in FIG. 14 corresponds to the reverse process of the configuration in FIG. 8.

The WFD processor 1120 performs WFD on M input streams to generate N output streams. In the illustrative example in FIG. 11, M=3 and N=2. The WFD processor 1410 performs WFD on the 3 input streams $D_1$, $D_2$, and $D_3$, and generates 3 output streams $S_1$, $S_2$, and $S_3$. The WFD essentially is the reverse operation of the WFM. To successfully recover the original source stream S, at least three NAS sites should be available. This operation is a matrix multiplication of the column vector $(D_1, D_2, D_3)^T$ using the following equations to recover the column vector $(S_1, S_2, S_3)^T$:

$$S_1 = w_{11} \cdot D_1 + w_{12} \cdot D_2 + w_{13} \cdot D_3 \quad (7a)$$

$$S_2 = w_{21} \cdot D_1 + w_{22} \cdot D_2 + w_{23} \cdot D_3 \quad (7b)$$

$$S_3 = w_{31} \cdot D_1 + w_{32} \cdot D_2 + w_{33} \cdot D_3 \quad (7c)$$

Figure 15:
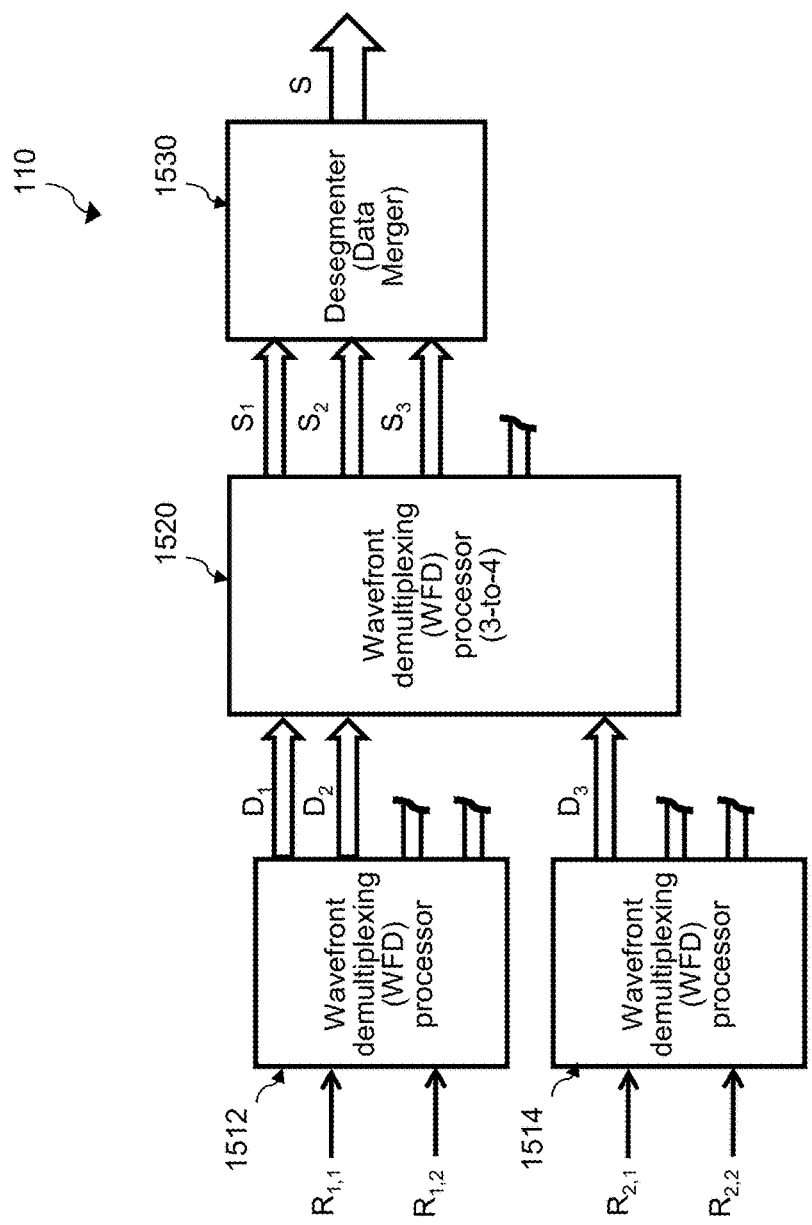
FIG. 15 is a diagram illustrating a data transport and/or storage processing system for receiving or reading data using a cascaded structure for the WFD processor according to one embodiment.

FIG. 15 is a diagram illustrating the data transport and/or storage processing system 110 for receiving or reading data using a cascaded structure for the WFD processor according to one embodiment. The processing system 110 includes a WFD processor 1520, two WFD processors 1512 and 1514, and a de-segmenter 1530. The processing system 110 may include more or less than the above components.

The cascade structure includes two levels. In the first level, the two WFD processors 1512 and 1514 perform WFD on the retrieved data streams $R_{1,1}$, $R_{1,2}$, $R_{2,1}$, and $R_{2,2}$ to generate the input streams $D_1$, $D_2$, and $D_3$. The WFD processor 1512 operates on the two storage streams $R_{1,1}$ and $R_{1,2}$ and generates 4 outputs, two of which are $D_1$ and $D_2$; the other two outputs may be unused or may be used for integrity check against possible compromised stored/transported data streams. As discussed above, the WFD may be performed by a matrix multiplication using the inverse matrix of:

$$\begin{bmatrix} \rho_{11} & \rho_{12} \\ \rho_{21} & \rho_{22} \end{bmatrix}$$

The WFD processor 1514 operates on the two storage streams $R_{2,1}$ and $R_{2,2}$ and generates 3 outputs, one of which is $D_3$; the other two outputs may be unused or may be used for integrity check against possible compromised stored/transported data streams.

In the second level, the WFD processor 1520 perform WFD on the three input streams $D_1$, $D_2$, and $D_3$ to generate 3 output streams $S_1$, $S_2$, and $S_3$. As discussed above, the WFD may be performed as a matrix multiplication using the inverse matrix of the matrix used to generate $D_1$, $D_2$, and $D_3$ in the writing or storing process.

The de-segmenter 1530 acts as a post-processor to de-segment or to merge the output streams $S_1$, $S_2$, and $S_3$ into the source stream S. The de-segmentation is the reverse of the known segmentation in the writing or storing process.

Figure 16:
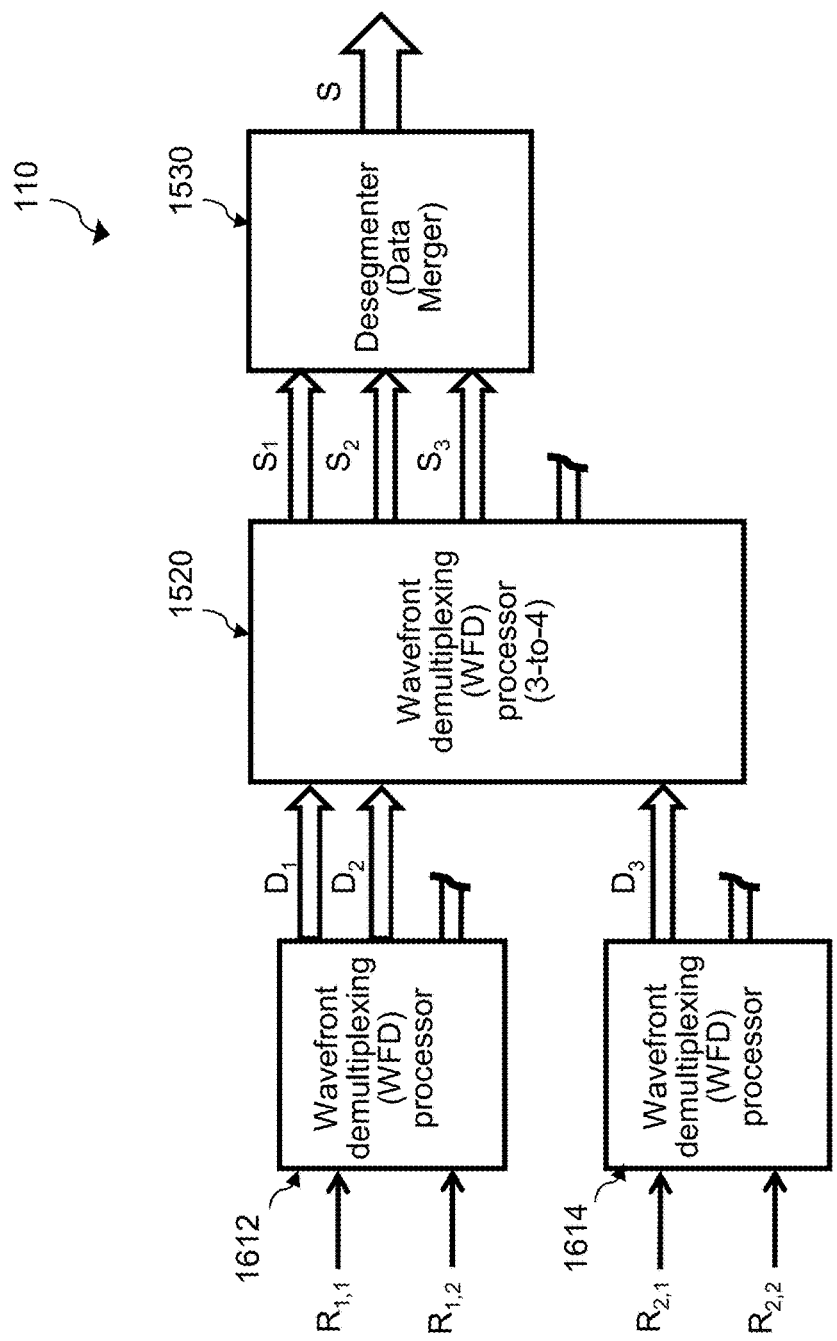
FIG. 16 is a diagram illustrating a data transport and/or storage processing system for receiving or reading data using a cascaded structure for the WFD processor according to one embodiment.

FIG. 16 is a diagram illustrating the data transport and/or storage processing system 110 for receiving or reading data using a cascaded structure for the WFD processor according to one embodiment. The processing system 110 in FIG. 16 is similar to the processing system 110 in FIG. 15 except the number of output streams in the first level WFD processors. The processing system 110 includes WFD processors 1612 and 1614 in the first level, the WFD processor 1520 in the second level, and the de-segmenter 1530. The WFD processor 1612 operates on the two streams $R_{1,1}$ and $R_{1,2}$ and generates 3 outputs, two of which are $D_1$ and $D_2$; the other output may be unused or may be used for integrity check against possible compromised stored/transported data streams. The WFD processor 1614 operates on the two storage streams $R_{2,1}$ and $R_{2,2}$ and generates 2 outputs, one of which is $D_3$; the other output may be unused or may be used for integrity check against possible compromised stored/transported data streams.

Figure 17:
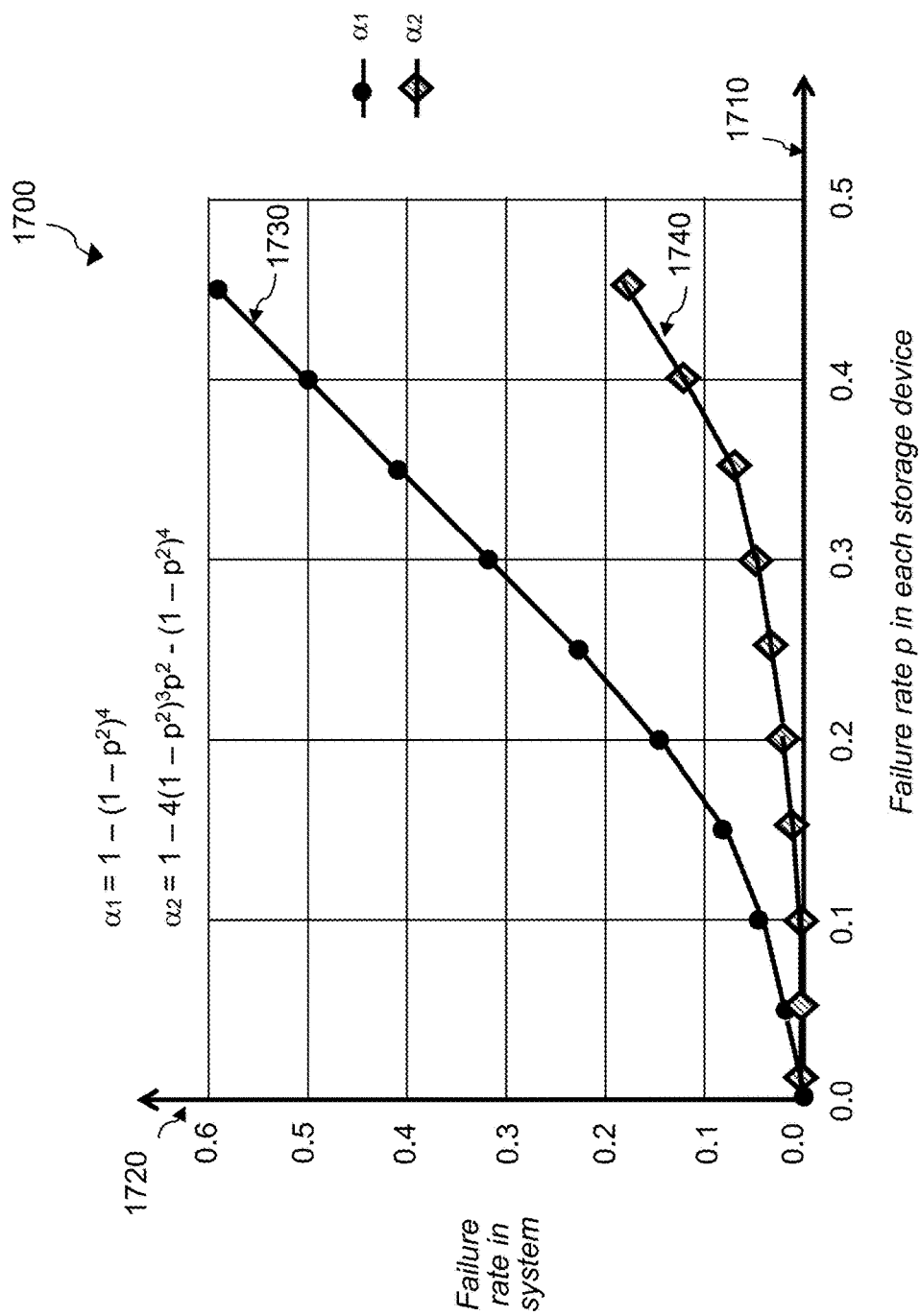
FIG. 17 is a diagram illustrating a data writing system using cascaded K-muxing according to one embodiment.

FIG. 17 is a diagram illustrating curves 1700 representing failure rate of a distribute storage system according to one embodiment. The curves 1700 include two curves 1730 and 1740 plotted on a coordinate system having a horizontal axis 1710 and a vertical axis 1720. The horizontal axis 1710 represents the failure rate p in each storage device. The vertical axis 1720 represents the failure rate in the system One can compare the storage scheme with RAID 10 in terms of the array failure rate. Suppose each of the four NAS sites has a failure rate p over the next three years. If these sites are arranged in RAID 10 configuration, the corresponding array failure rate over the next three years is $\alpha_1=1-(1-p^2)^4$. If these sites are arranged in the configuration disclosed in FIG. 2 and FIG. 11, the corresponding array failure rate over the next three years is $\alpha_2=1-4(1-p^2)^3p^2-(1-p^2)^4$. The disclosed configuration thus has better availability as $\alpha_1 > \alpha_2$ given typical p values (p<½), and has better privacy protection as every NAS stores data sub-streams is identical to WFCs.

The failure rate $\alpha_1$ 1730 for conventional RAID 10 configuration is higher than the failure rate $\alpha_2$ 1740 for WFMed RAID 11 configurations. At a case where individual device failure rate p at 0.4 for next 3 years, the calculated failure rate $\alpha_1$ for a conventional RAID 10 configuration will be at 0.5 or 50% probability while the calculated failure rate $\alpha_2$ for a WFMed RAID 11 configuration will be at 0.13 or 13% probability.

Figure 18:
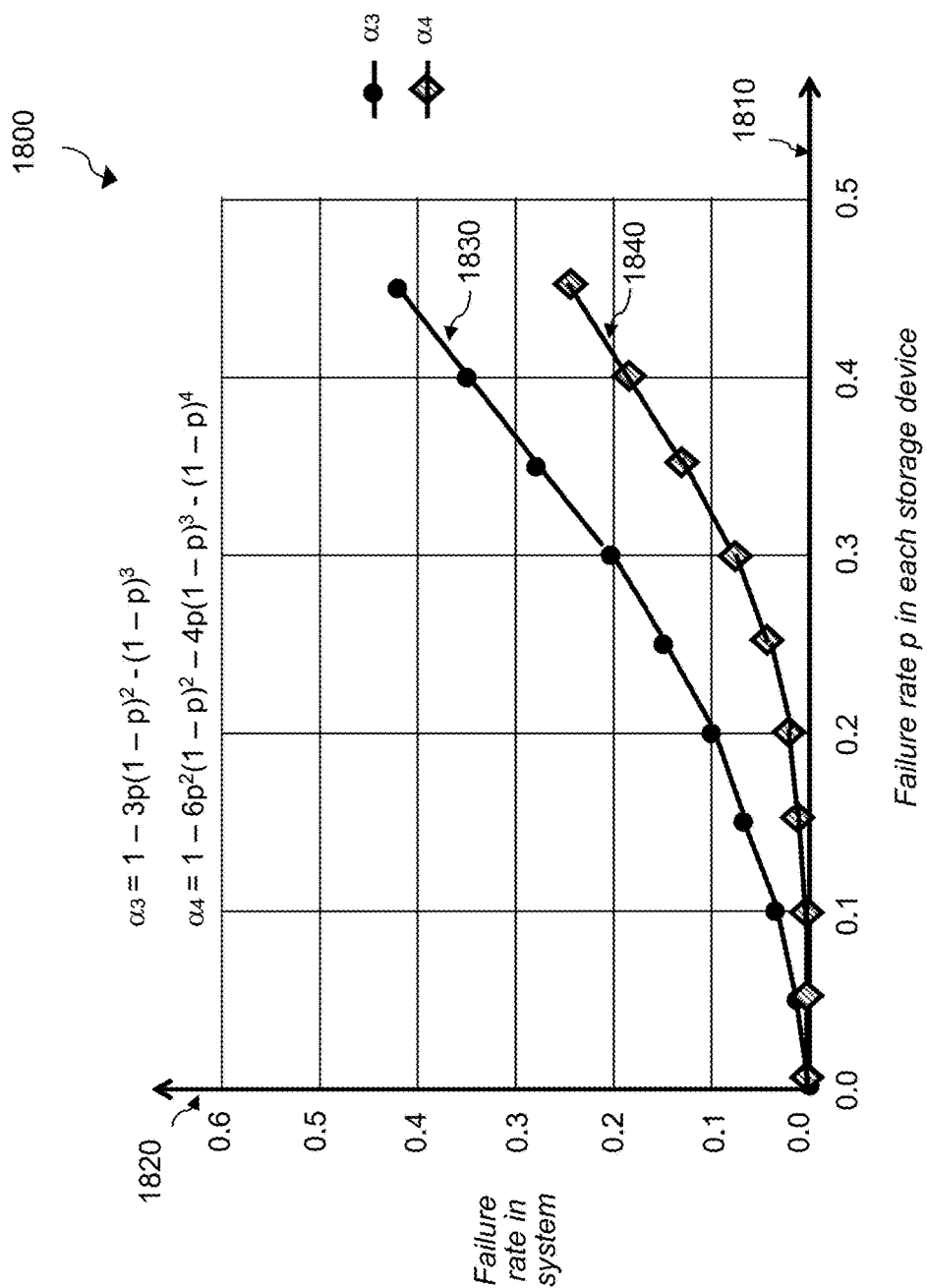
FIG. 18 is a diagram illustrating a data reading system using cascaded K-de-muxing according to one embodiment.

FIG. 18 is a diagram illustrating curves representing failure rate of a distribute storage system according to one embodiment.

One can compare the storage scheme with systematic code governed solely by coder 810 (in FIG. 8) in terms of the array failure rate shown in FIG. 14. Suppose each of the four NAS sites has a failure rate p over the next three years. If these sites are arranged in 2-plus-1 systematic coding configuration, the corresponding array failure rate over the next three years is $\alpha_3=1-3p(1-p)^2-(1-p)^3$. If these sites are arranged in the configuration disclosed in FIG. 8 and FIG. 14, the corresponding array failure rate over the next three years is $\alpha_4=1-6p^2(1-p)^2-{}^{4p}(1-p)^3-(1-p)^4$. The disclosed configuration thus has better availability as $\alpha_3 > \alpha_4$ given typical p values, and has better privacy protection as every NAS stores data sub-stream is identical to WFCs.

The curves represent failure rates 1800 of distributed storage systems $\alpha_3$ and $\alpha_4$ as functions of the failure rate of individual storage devices or storage disks, p. The vertical axis 1820 is the failure rate in a system, while the horizontal axis 1810 is the failure rate p in each storage devices. The failure rate $\alpha_3$ 1830 for a systematic coder 810 (in FIG. 8) configuration for a redundancy is higher than the failure rate 1840 for WFMed systematic coder configuration for 2 redundancies. At a case where individual device failure rate p at 0.4 for next 3 years, the calculated failure rate $\alpha_3$ for a conventional systematic coder 810 configuration will be at 0.35 or 35% probability while the calculated failure rate $\alpha_4$ for a WFM systematic coder configuration will be at 0.18 or 18% probability.

Figure 19:
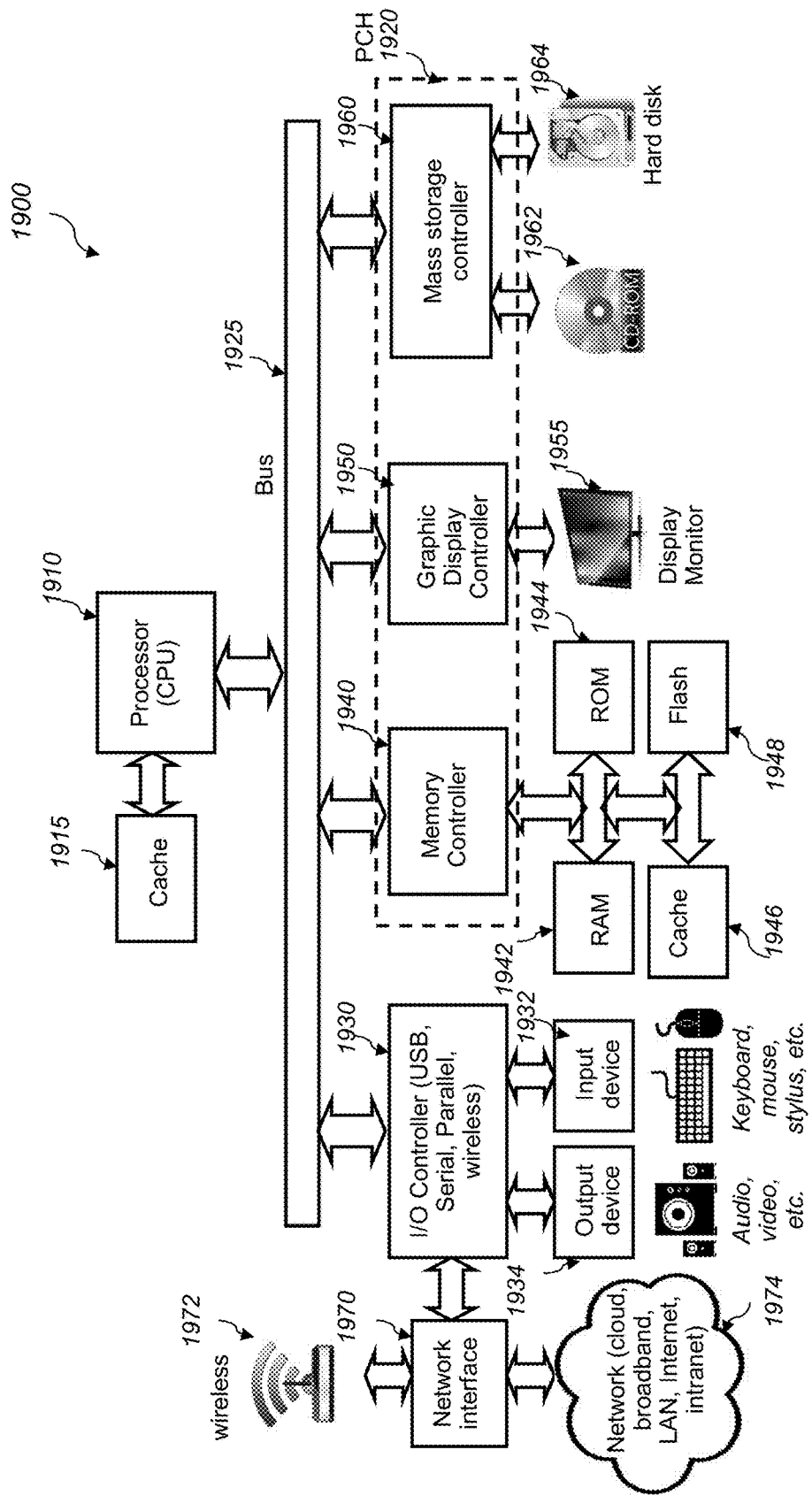
FIG. 19 is a diagram illustrating a WF processor according to one embodiment.

FIG. 19 is a diagram illustrating a WF processor 1900 according to one embodiment. The processing system 1900 shown in FIG. 19 may represent the processing system 110, or the individual processors within the processing system 110, the system 1700 or its individual processors (e.g., 1710, 1720, or 1760), or the system 1800 or its individual processors (e.g., 1810, 1820, or 1860). Not all of the components in FIG. 19 are present for a particular processor. For brevity, the following refers to the processing system 1900, but it is noted that the architecture of the processing system 1900 may change depending on the particular function.

The processing system 1900 includes a central processing unit (CPU) or a processor 1910, a cache 1915, a platform controller hub (PCH) 1920, a bus 1925. The PCH 1920 may include an input/output (I/O) controller 1930, a memory controller 1940, a graphic display controller (GDC) 1950, and a mass storage controller 1960. The system 1900 may include more or less than the above components. In addition, a component may be integrated into another component. As shown in FIG. 19, all the controllers 1930, 1940, 1950, and 1960 are integrated in the PCH 1920. The integration may be partial and/or overlapped. For example, the GDC 1950 may be integrated into the CPU 1910, the I/O controller 1930 and the memory controller 1940 may be integrated into one single controller, etc.

The CPU or processor 1910 is a programmable device that may execute a program or a collection of instructions to carry out a task. It may be a general-purpose processor, a digital signal processor, a microcontroller, or a specially designed processor such as one design from Applications Specific Integrated Circuit (ASIC). It may include a single core or multiple cores. Each core may have multi-way multi-threading. The CPU 1910 may have simultaneous multithreading feature to further exploit the parallelism due to multiple threads across the multiple cores. In addition, the CPU 1910 may have internal caches at multiple levels.

The cache 1915 is a first level (L1) external cache memory. It is typically implemented by fast static random access memory (RAM). Other cache levels may appear externally, such as the cache 1946. Some or all cache levels (L1, L2, and L3) may all be integrated inside the CPU 1910.

The bus 1925 may be any suitable bus connecting the CPU 1910 to other devices, including the PCH 1920. For example, the bus 1925 may be a Direct Media Interface (DMI).

The PCH 1920 in a highly integrated chipset that includes many functionalities to provide interface to several devices such as memory devices, input/output devices, storage devices, network devices, etc.

The I/O controller 1930 controls input devices (e.g., stylus, keyboard, and mouse, microphone, image sensor)

and output devices (e.g., audio devices, speaker, scanner, printer). It also has interface to a network interface card 1970 which provides interface to a network 1974 and wireless controller 1972. The network interface card (NIC) 1970 transmits and receives the data packets to and from a wired, wireless network 1972 or 1974. The NIC 1970 may have one or more sockets for network cables and the type of socket depends on the type of network it will be used in. The network 1974 may be a LAN, a MAN, a WAN, an intranet, an extranet, or the Internet.

The memory controller 1940 controls memory devices such as the random access memory (RAM) 1942, the read-only memory (ROM) 1944, the cache memory 1946, and the flash memory 1948. The RAM 1942 may store instructions or programs, loaded from a mass storage device, that, when executed by the CPU 1910, cause the CPU 1910 to perform operations as described above, such as WFM operations. It may also store data used in the operations, including the input data stream or the output data stream. The ROM 1944 may include instructions, programs, constants, or data that are maintained whether it is powered or not. This may include the matrix coefficients used in the envelope or de-envelope process, a catalog of the envelopes, boot program, self-test programs, etc. The cache memory 1946 may store cache data at level L2 or L3. The cache memory 1946 is typically implemented by fast static RAM to allow fast access from the CPU 1910. The flash memory 1948 may store programs, instructions, constants, tables, coefficients, envelopes as in the ROM 1944. It may be erased and programmed as necessary.

The GDC 1950 controls the display monitor 1955 and provides graphical operations. It may be integrated inside the CPU 1910. It typically has a graphical user interface (GUI) to allow interactions with a user who may send a command or activate a function.

The mass storage controller 1960 controls the mass storage devices such as CD-ROM 1962 and hard disk 1964.

Additional devices or bus interfaces may be available for interconnections and/or expansion. Some examples may include the Peripheral Component Interconnect Express (PCIe) bus, the Universal Serial Bus (USB), etc.

Relationship of a K-Muxing Transform and a Multibeam Array Digital Beam Forming (DBF) Matrix:

A multibeam array can form orthogonal beams (OB) through a transmit (Tx) digital beam forming (DBF) which is characterized by a M-to-N transform; where M is the number of beams with OB patterns and N is number of array elements. In general, both N and M are positive integers and N≥M>1. When N=M, there are adequate resources (i.e., array elements) to form N orthogonal beams. When N>M, there are N-M redundant elements in forming N orthogonal beams. The redundancy degree is N-M. In other words, when N>M, the signal reconstitution for signal reception is possible even when N-M elements are non-functional.

The set of the N beams with OB patterns, or simply N OB beams, is to communication to N different targets in N discrete directions with the following features: (1) the peak of a first OB beam is always at nulls of all other N-1 beams, and (2) the peaks of all other OB beams are at nulls of the first OB beam. The two features above for the first OB beam are true for all other n-1 OB beams. The performance constraints for optimization in generating the Tx digital beam forming (DBF) include N target directions.

K-muxing may use the same mathematical transformation which are used as the beam weighting vectors (BWV) for generating concurrent beams with OB radiation patterns from a multibeam array.

Embodiments of the disclosure include procedures of generating sets of K-muxing and K-demuxing transforms for distributed data storage and transport via shape beam optimization in a Tx DBF for a multibeam array discretely communicating to multiple satellites, multiple basestations, or multiple distributed receivers using shaped beam with OB radiation patterns. When all N array elements are functional in transmit; an optimized Tx DBF matrix from beam ports to element ports may be utilized numerically as a M-to-N K-muxing transform. Similarly, a propagation matrix from the N array elements to various target directions from the Tx OB DBF array elements will become a N-to-M K-demuxing transform.

On the other hand, when not all N array elements are functional; the K-demuxing transform matrix will be optimized using a Rx DBF matrix re-configured using remaining N-nx functional elements only; where nx is an integer and is the number of unavailable elements. Three examples for the following relationships may be provided: (a) K-muxing transforms and multibeam array DBF matrices, (b) K-demuxing transforms and propagation matrices from multibeam arrays, (c) redundancy of incoherent K-demuxing transforms and reconfigured multibeam array Rx DBF matrices for data storage and transport, and (d) coherent K-muxing/K-demuxing transforms and reconfigured multibeam array Tx/Rx DBF matrices for private signal transmission.

In the following examples, linear arrays with equally spaced elements are used to exemplify the relationships. The elements are Omni directional, and performance constraints are specified in one-dimensional directions. However, the relationships are applicable to any array geometries including non-planar arrays with discrete elements with various directional gains and the performance constraints can be specified in any directions in a [u, v], [θ, φ], or other coordinates; where u=sin θ×cos φ, and v=sin θ×sin φ.

It will be given scenarios of a ground terminal with a multi-beam array antenna communicating to multiple satellites concurrently exemplifying what impacts on data streams from beam-forming-network as preprocessing and those from free space propagation as post-processing. It will be shown how to derive K-muxing and K-demuxing transforms. Many other scenarios will work equally for generating K-muxing and K-demuxing matrices. One such a scenario includes mobile terminals with multiple-beam antennas connecting to multiple base stations concurrently.

Example 1

Figure 20:
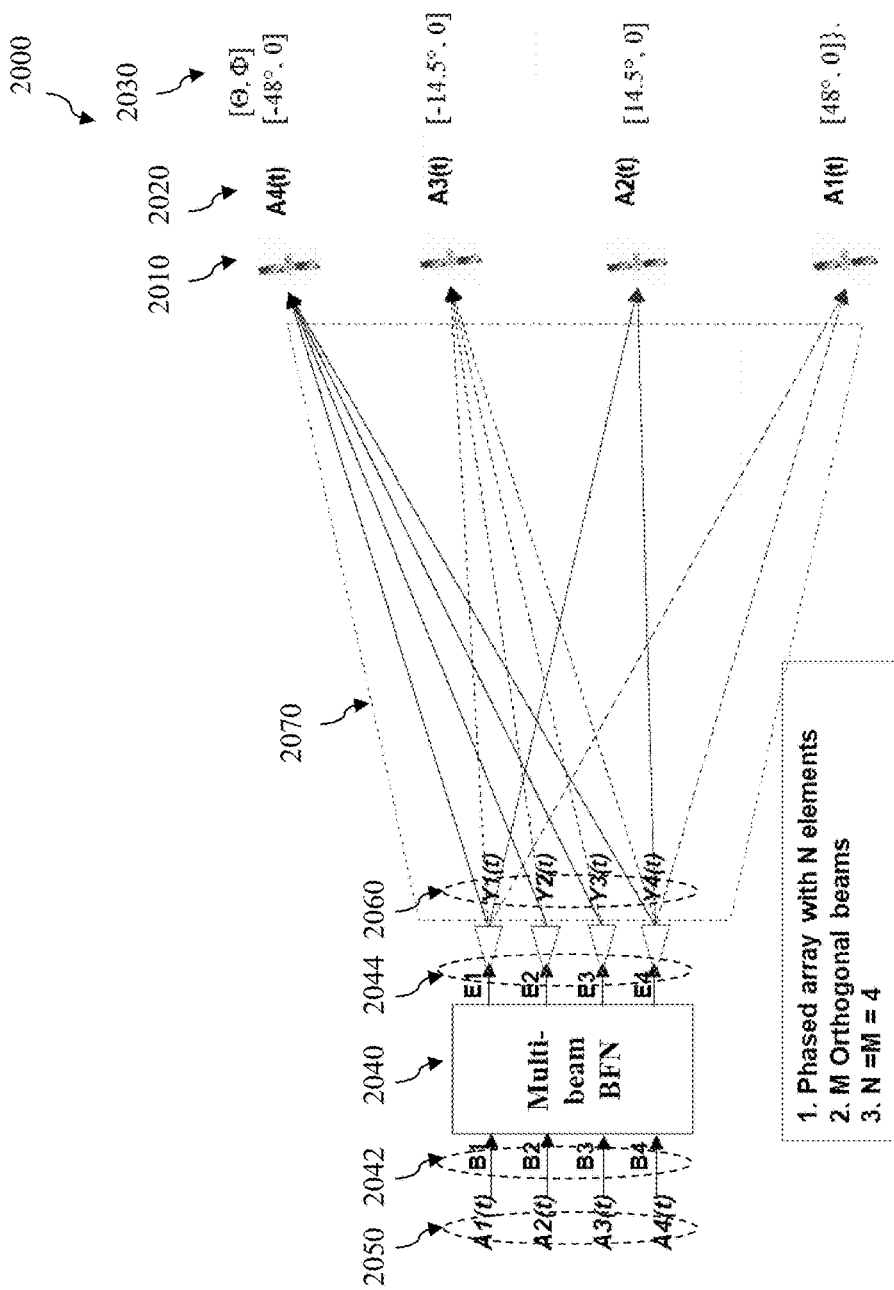
FIG. 20 is a diagram illustrating a 4-element array forming 4 concurrent beams with OB radiation patterns according to one embodiment.

A 4-element array forms 4 concurrent beams with OB radiation patterns in FIG. 20. The peaks of the OB beam are at [u, v]={[−¾, 0], [−¼, 0], [¼, 0], [¾, 0]}, or [Θ, Φ]={[−48°, 0] [−14.5°, 0] [14.5°, 0] [48°, 0]}.

It depicts a scenario of communicating to 4 satellites 2010 concurrently from a multibeam transmitting array antenna, which features 4 array elements 2044 and a Tx multibeam beam-forming-network (BFN) 2040. The multibeam antenna sends 4 beam signal streams 2050 concurrently to the 4 satellites 2010. The 4 elements 2044 are aligned in a linear format with contiguous elements equally spaced at 0.5 wavelengths. The digital beam-forming-network (BFN) 2040 can be implemented as mechanisms for 4 Tx orthogonal beams. The target satellite directions 2020 are at u=±¼ and ±¾ (or Θ=±14.5° and ±48°).

It is well known that a 4-to-4 Butler matrix comprising 4 analogue hybrids can be used as a beam-forming network (BFN) for a Tx array with 4 contiguous elements. When the equally spaced elements are at 0.5 wavelength apart, the resulting 4 concurrently shaped beams usually feature 4 OB beams 2110, 2120, 2130, 2140 as shown on FIG. 21. The beam peak directions are at u=±¼ and ±¾ (or Θ=±14.5° and ±48°) 2030 sending, a first signal stream A1($t$) of the four beam signals 2050 to a first satellite at Θ=48°, a second signal stream A2($t$) of the four beam signals 2050 to a second satellite at Θ=14.5°, a third signal stream A3($t$) to a third satellite at Θ=−14.5°, and a fourth signal stream A4($t$) to a $4^{th}$ satellite at Θ=−48°, with low mutual interferences (usually better than −30 dB isolations).

A shaped beam is optimized as a weighted sum of individual element radiation patterns in digital beam forming networks (BFN). The weighting parameters are optimized to meet the performance constraints for the shaped beam. The weighting parameters for a 4-element array are in a weighting vector, referred to as the beam weight vector (BWV) for the shaped beam.

Figure 21:
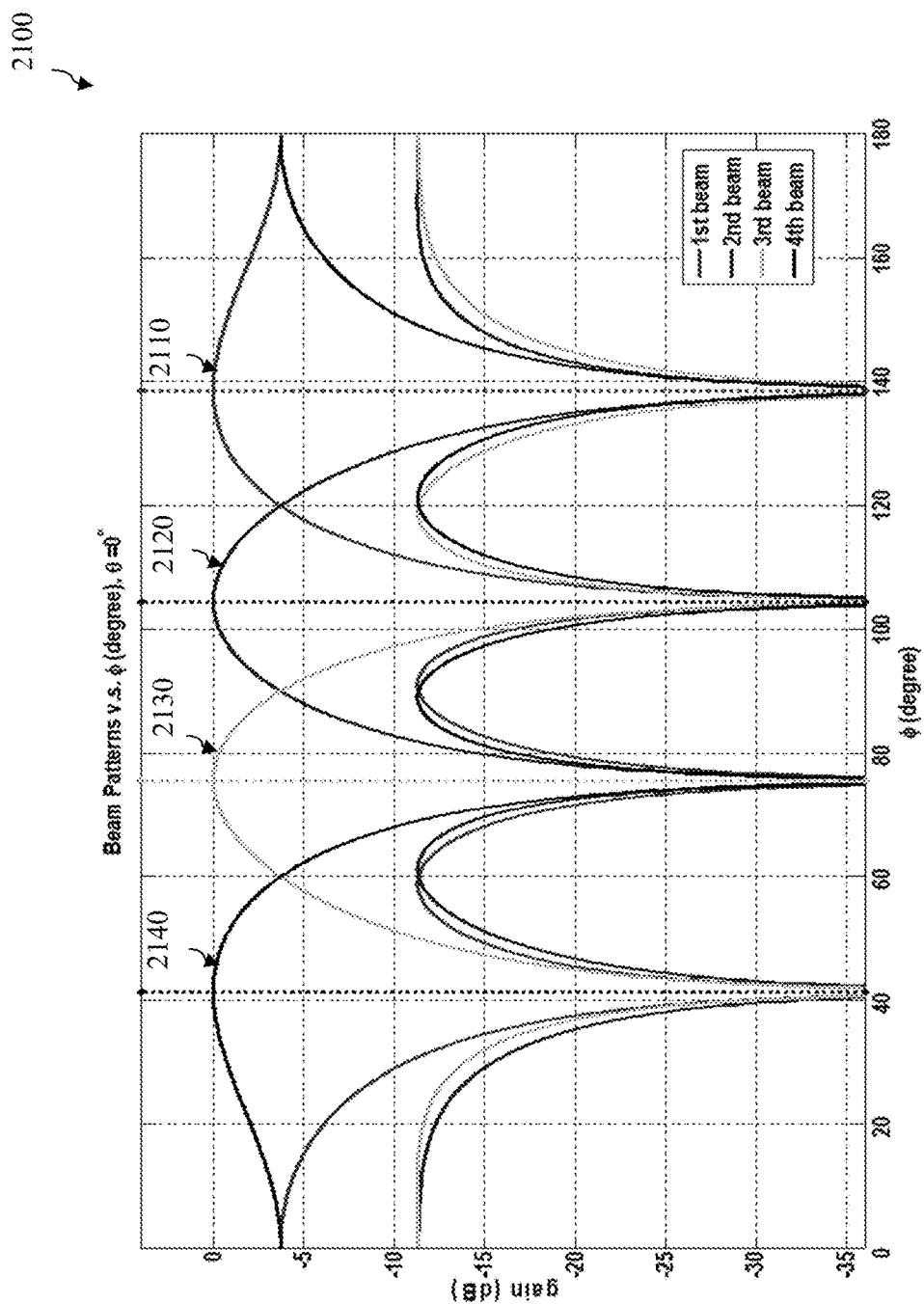
FIG. 21 is a diagram illustrating simulated radiation patterns of 4 shaped beams according to one embodiment.

FIG. 21 shows simulated radiation patterns 2100 using beam-shaping algorithms and the performance constraints of the directions of 4 shaped beams at Θ=±14.5° and ±48°. The algorithms are to optimize 4 concurrent orthogonal beams 2110, 2120, 2130, 2140 with minimized mutual interference.

Normalized radiation patterns of 4 shaped beams shown in FIG. 21 for the 4-element linear DBF array are dictated by the corresponding BWVs. They are shaped under OB performance constraints. The normalized beam peaks at 0 dB are indeed located at Θ=±14.5° and ±48°, respectively. The peak of any one of the 4 OB beams is located at a null of all other OB beams, and the peaks of all other OB beams are at nulls of the OB beam 2110, 2120, 2130, 2140. The depicted peak to null ratios shown are better than 35 dB; nearly the entire displayed range of the vertical axis. In fact, the real peak to null ratios shown are better than 60 dB (not shown).

Quantitatively, the Tx DBF matrix transforms 4 independent beam signals (A1($t$), A2($t$), A3($t$), A4($t$)) 2050 connected to 4 input ports 912, to 4 element signals (y1($t$), y2($t$), y3($t$), y4($t$)) 2060 from the 4 output ports. The element signals are then connected to 4 radiating elements of the Tx array as shown in FIG. 20.

$$y1(t)=w11*A1(t)+w12*A2(t)+w13*A3(t)+w14*A4(t) \quad (8a)$$

$$y2(t)=w21*A1(t)+w22*A2(t)+w23*A3(t)+w24*A4(t) \quad (8b)$$

$$y3(t)=w31*A1(t)+w32*A2(t)+w33*A3(t)+w34*A4(t) \quad (8c)$$

$$y4(t)=w41*A1(t)+w42*A2(t)+w43*A3(t)+w44*A4(t) \quad (8d)$$

where A1($t$) is weighted by a first beam weight vector (BWV1) 2210, A2($t$) is weighted by a second beam weight vector (BWV2) 2220, A3($t$) is weighted by a third beam weight vector (BWV3) 2230, A4($t$) is weighted by a fourth beam weight vector (BWV4) 2240.

$$BWV1=[w11\,w21\,w31\,w41]^T \quad (9a)$$

$$BWV2=[w12\,w22\,w32\,w42]^T \quad (9b)$$

$$BWV3=[w13\,w23\,w33\,w43]^T \quad (9c)$$

$$BWV4=[w14\,w24\,w34\,w44]^T \quad (9d)$$

Figure 22:
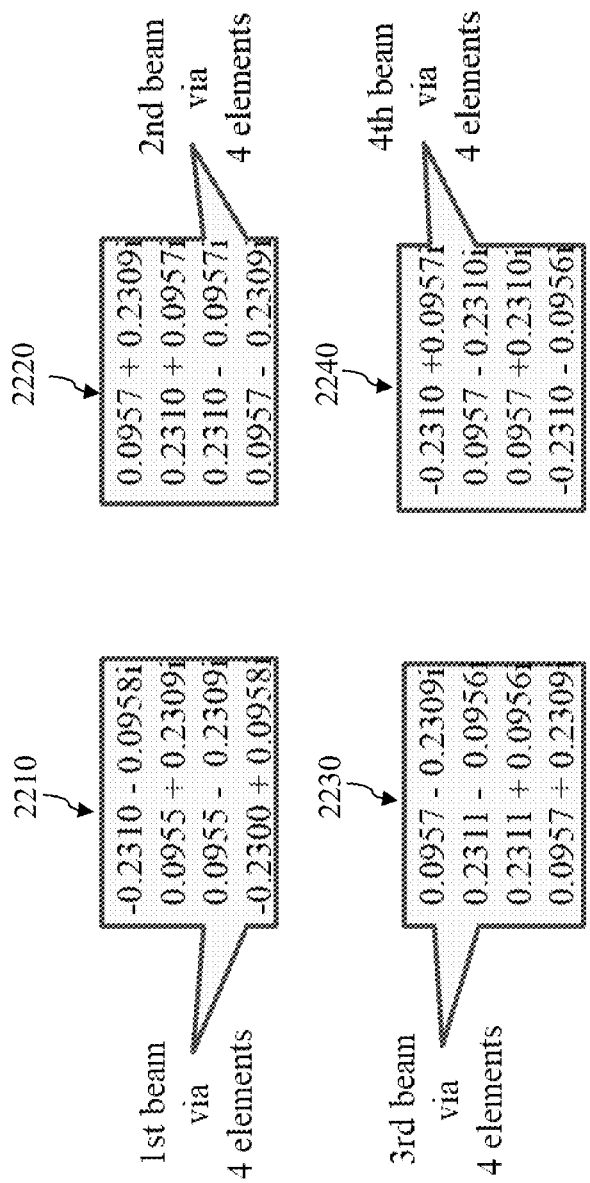
FIG. 22 is a diagram illustrating 4×4 matrices corresponding to 4 optimized Beam Weight Vectors (BWVs) according to one embodiment.

The DBF matrix, [BWVs] 2310, generated via an optimization processing for a 4-element linear array is a 4×4 matrix with complex parameters. The optimized 4 BWVs and a corresponding 4×4 matrix under the OB performance constraints are depicted in FIG. 22 and FIG. 23. The matrix [BWVs] 2310 is repeated in the following:

$$[BWVs] = \begin{bmatrix} -0.231-0.096i & 0.096+0.231i & 0.096-0.231i & -0.231+0.096i \\ 0.096+0.231i & 0.23l+0.096i & 0.231-0.096i & 0.096-0.231i \\ 0.096-0.231i & 0.23l-0.096i & 0.23l+0.096i & 0.096+0.231i \\ -0.230+0.096i & 0.096-0.231i & 0.096+0.231i & -0.231-0.096i \end{bmatrix} \quad (10)$$

And it can be rewritten as a row vector (a 1×4 matrix):

$$[BWVs]=[BWV1\,BWV2\,BWV3\,BWV4] \quad (11)$$

where each matrix element is a column vector (a 4×1 matrix)

$$BWV1=0.25[\exp(j157.5°)\exp(j67.5°)\exp(j-67.5°)\exp(j-157.5°)]^T \quad (12a)$$

$$BWV2=0.25[\exp(j67.5°)\exp(j22.5°)\exp(-j22.5°)\exp(-j67.5°)]^T \quad (12b)$$

$$BWV3=0.25[\exp(-j67.5°)\exp(-j22.5°)\exp(j22.5°)\exp(j67.5°)]^T \quad (12c)$$

$$BWV4=0.25[\exp(-j157.5°)\exp(-j67.5°)\exp(j67.5°)\exp(j157.5°)]^T \quad (12d)$$

Let us use the convention that an M×N matrix has M rows and N columns. BWV1 2210 is a 4×1 matrix, and features a constant phase gradient of 135° (or)−225° among the adjacent components. Similarly, BWV2 2220, BWV3 2230 and BWV4 2240 show features of different constant phase gradients of 45°, −45° and −135° (or 225°) among adjacent components, respectively.

FIG. 24 illustrates 2400 which shows that a K-muxing transform can be derived from the DBF matrix for a set of 4 orthogonal beams, while the corresponding K-demuxing transform can be derived from M propagation vectors from the 4 elements in a linear Tx array for M various directions (M=4). The first direction at [Θ, Φ]=[48°, 0] is to recover A1($t$). Similarly, the directions at [Θ, Φ]=[14.5°, 0], [−14.5°, 0], and [−48°, 0] are for A2($t$), A3($t$), and A4($t$), respectively.

Assuming aligned along an x-axis direction, the N elements of the linear array are located, respectively, at $X_1=(x_1, 0, 0)$, $X_2=(x_2, 0, 0)$, . . . , $X_N=(x_N, 0, 0)$. A wave number, k, is defined as $2\pi/\lambda$, where λ is the wavelength of a transmitted RF carrier. An $i^{th}$ propagation vector to an $i^{th}$ direction at [Θ$_1$, 0] from a 4-element linear array is written as $$Pi=[\exp(jk*x_1 \sin \Theta_i)\exp(jk*x_2 \sin \Theta_i)\exp(jk*x_3 \sin \Theta_i)\exp(jk*x_4 \sin \Theta_i)] \quad (13)$$

where i=1, 2, 3, and 4.

The performance constraints do not have to be set at the [Θ$_i$, ϕ] directions where ϕ=0. For a more general N-element array geometry, and a propagation vector to an $i^{th}$ direction at [Θ$_i$, ϕ$_i$] can be expressed as:

$$Pi(\Theta_i,\phi_i)=[ph(X_1,\Theta_i,\phi_i),ph(X_2,\Theta_i,\phi_i), \ldots ph(X_N,\Theta_i,\phi_i)] \quad (14)$$

Referring to FIG. 21, it is very clear when a first direction were not set at [Θ, Φ]=[48°, 0], but say at [50°, 0], a recovered data or signal stream for A1($t$) would be "contaminated" by leakages from other 3 beams. As a result, the recovered data streams can be expressed as:

$$A1'(t)=A1(t)+\delta2A2(t)+\delta3A3(t)+\delta4A4(t) \quad (15)$$

The recovered data stream is contaminated by interferences. Additional post processing in a receiver is needed to estimate A1($t$) from A1'($t$), when A2($t$), A3($t$) and A4($t$) become known to the receiver.

We summarize the above procedures in a more general formulation as follows mathematically.

$$Y=[BWVs]*A \qquad (16a)$$

$$A'=[P]*Y \qquad (16b)$$

$$A'=[P]*[BWVs]*A \qquad (16c)$$

where: Y is a N×1 matrix, a vector representing a set of N element signals,

A is a M×1 matrix, representing a vector for a set of M beam signals,

A' a set of beam signals at receivers in M various directions

[BWVs] is a N×M matrix, representing a Tx beam forming function converting a set of M beam signals to a set of N element signals, $P_i$ is a 1×N matrix, a propagation vector from array elements to ith direction in a far field.

$[P]=[P_1\ P_2\ P_3, \ldots P_M]^T$ and is a M×N matrix, representing a set of propagation vectors converting a set of N element signals to a set of Tx beam signals at M various directions.

According to Equation (16c) under the following condition, A' will become A, $$[P]*[BWVs]=I \qquad (16d)$$

where I is an N×N identity matrix.

The [BWVs] 2310 for this example features a [N×M] matrix and can be used for a K-muxing operation. The number of elements, N, is set to 4, the number of shaped beams, M, is also set to 4. Similarly, the [P] is a [N×M] matrix and can be used for a K-demuxing operation.

Example 2

Figure 25:
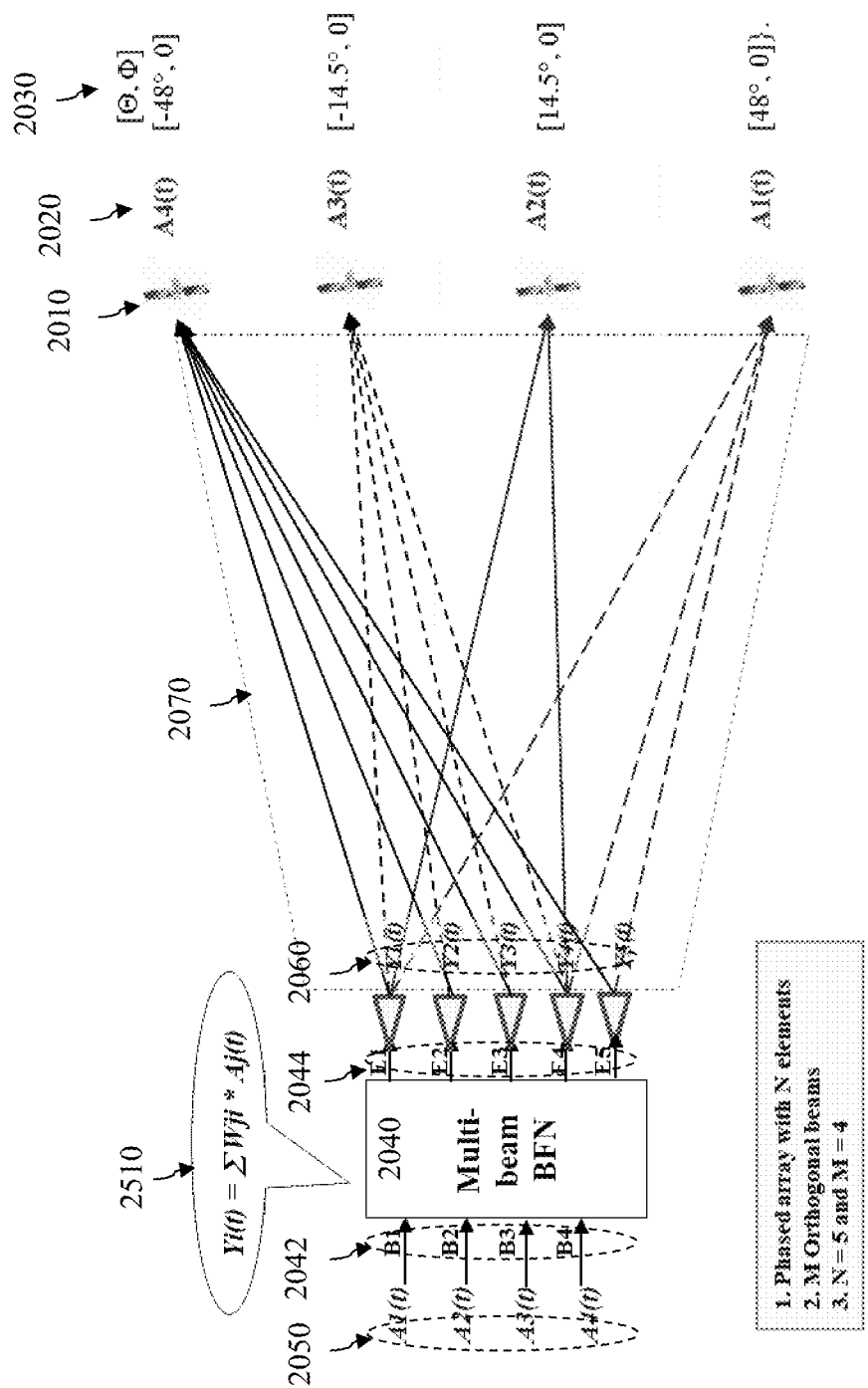
FIG. 25 is a diagram illustrating OB radiation patterns from 4 concurrent beams generated by a 5-element array according to one embodiment.

An example of OB radiation patterns 2600 from 4 concurrent beams generated by an array with 5 elements 2044 are depicted in FIG. 25. The peaks of the OB beam are at [u, v]={[−¾, 0], [−¼, 0], [¼, 0], [¾, 0]}, or at [Θ,Φ]={[−48°, 0], [−14.5°, 0], [14.5°, 0], [48°, 0]} 2020.

It depicts the same scenario of communicating to 4 satellites 2020 concurrently from a multibeam transmitting array antenna, which features 5 instead of 4 array elements as that in example 1 and a Tx multibeam beam-forming-network (BFN) 910. The 5 elements 2044 are aligned in a linear format with contiguous elements equally spaced at 0.5 wavelengths. The Tx multibeam BFN 2040 features 4 input ports (or 4 beam ports 2042), B1, B2, B3, and B4, and 5 output ports 2044 (or 5 element ports), E1, E2, E3, E4, and E5. The functions of the multibeam BFN 2040 include formulation of 5 element signals 2060 at the 5 output ports; each element signal as a weighted sum of 4 beam signals 2050 connected to 4 input ports 2042.

The 4 beam signals 2050 A1(t), A2(t), A3(t), and A4(t) are connected to the 4 beam ports 2042 of the multibeam beam-forming-network (BFN). The 5 output signals from the 5 element ports 2044 of the multibeam BFN are 5 element signals 2060; y1(t), y2(t), y3(t), y4(t), and y5(t). The radiated element signals will propagate in free space, and spatially combined in a far field. As a result of the free-space propagations 2070, the radiated 4 beam signals 2050 by the 5 elements will be "untangled" and delivered individually and independently to 4 specified directions 2020. The recovered signals 2020 at various directions 2030 shall be nearly identical to the beam signals 2050.

The beam-forming-network (BFN) 2040 can be configured and implemented as mechanisms for 4 Tx orthogonal beams. The target satellite directions 2030 are at u=¼ and ±¾ (or Θ=±14.5° and ±48°).

Figure 26:
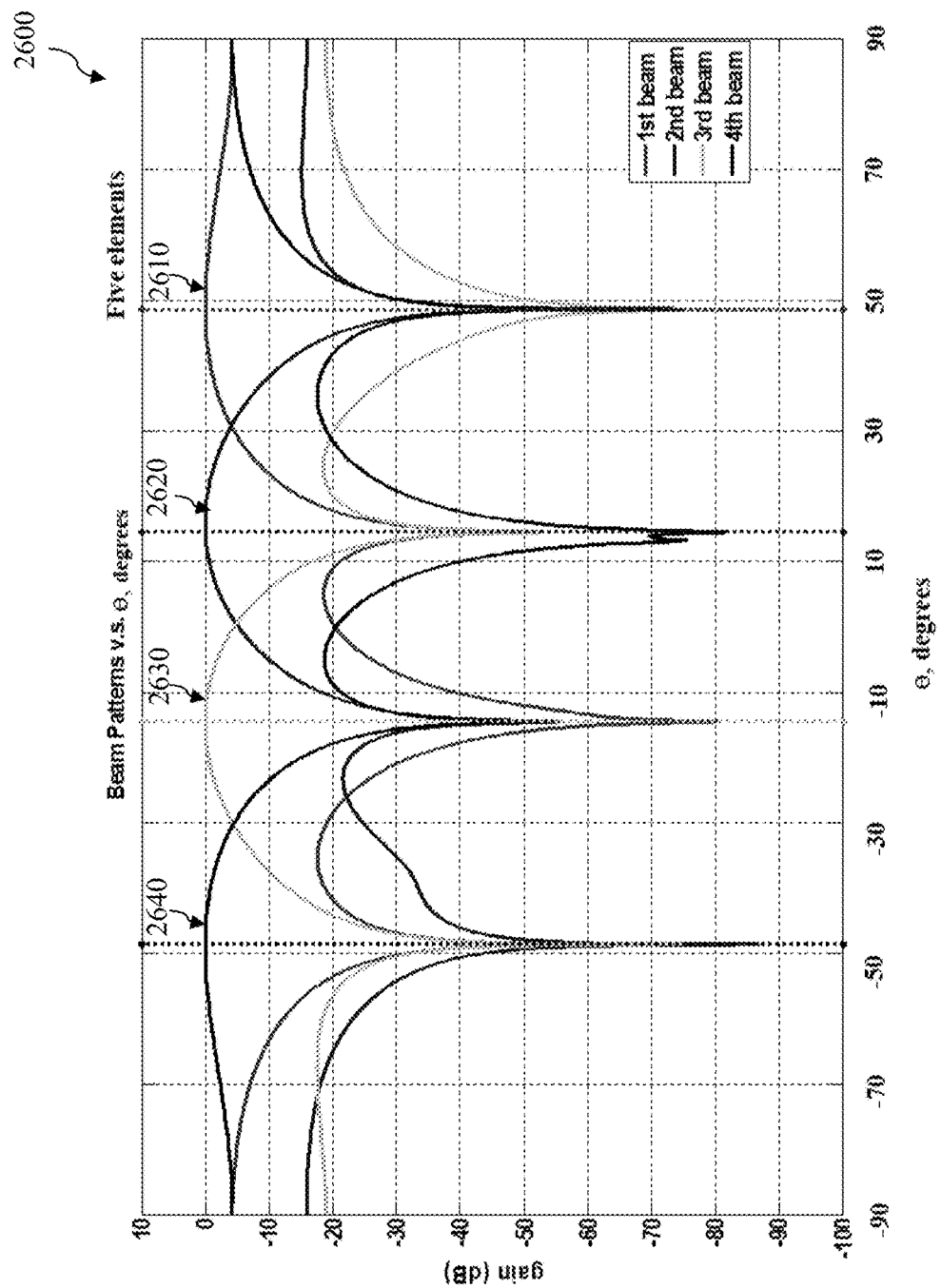
FIG. 26 is a diagram illustrating simulated radiation patterns using beam-shaping algorithms and performance constraints of the directions of 4 shaped beams according to one embodiment.

A $1^{st}$ shaped beam can be optimized as a weighted sum of individual element radiation patterns in digital beam forming networks. The weighting parameters are optimized to meet the performance constraints for the shaped beam. The weighting parameters for the 5-element array are in a weighting vector, referred to as the beam weight vector (BWV) for the shaped beam. FIG. 26 shows simulated radiation patterns using beam-shaping algorithms and the performance constraints of the directions of 4 shaped beams at Θ=±14.5° and ±48°. The algorithms are to optimize 4 concurrent orthogonal beams minimizing mutual interference. It is noticed that the vertical axis ranges from −100 to 10 dB depicting the radiation intensity variation over all coverage directions.

Figure 27:
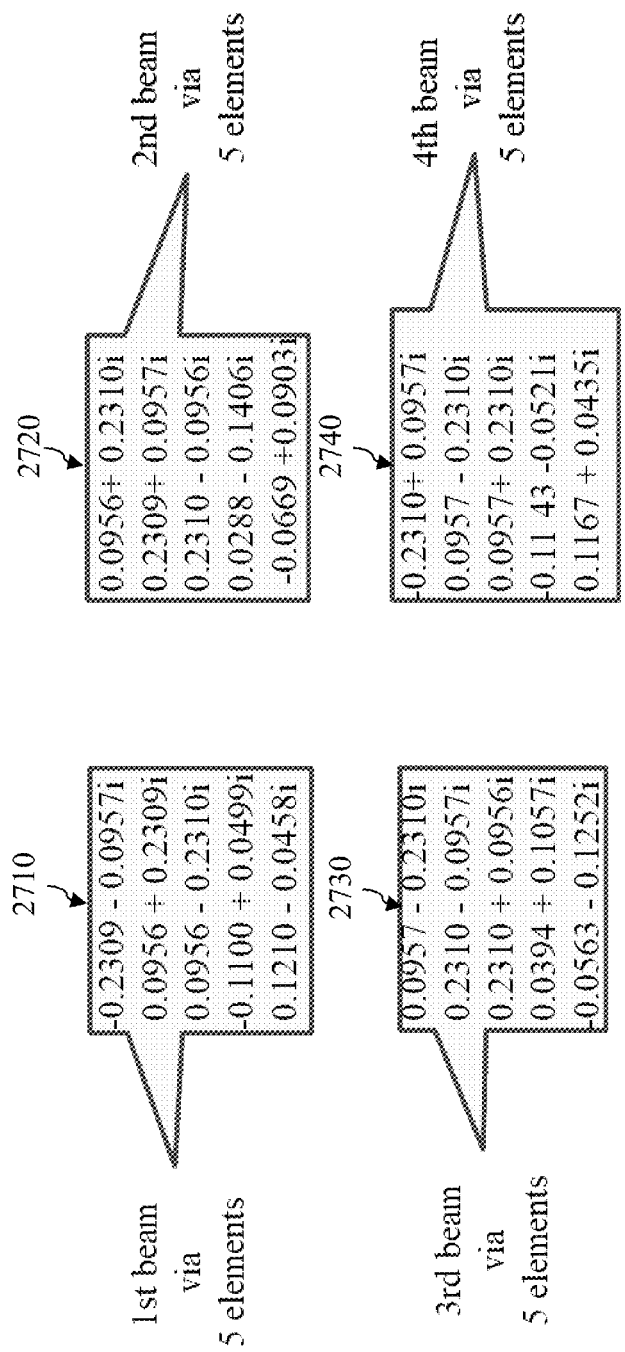
FIG. 27 is a diagram illustrating the BWVs for 4 OB beams from a 5-element array according to one embodiment.

Normalized radiation patterns of 4 shaped beams 2600 shown in FIG. 27 for the 5-element linear DBF array are dictated by the corresponding BWVs. They are shaped under OB performance constraints. The normalized beam peaks at 0 dB are indeed located at Θ=±14.5° and ±48°, respectively. The peak of any one OB beam (2610, 2620, 2630, or 2640) is located at a null of all other OB beams (2610, 2620, 2630, 2640), and the peaks of all other OB beams (2610, 2620, 2630, 2640) are at nulls of the OB beam (2610, 2620, 2630, or 2640). The peak to null ratios shown are better than 80 dB.

Quantitatively, the Tx DBF matrix transforms 4 input signals or 4 beam signals 916, (A1(t), A2(t), A3(t), A4(t)), to the 5 output signals or 5 element signals, [y1(t), y2(t), y3(t), y4(t), y5(t)], which are connected to 5 radiating elements of the Tx array as shown in FIG. 25.

$$y1(t)=w11*A1(t)+w12*A2(t)+w13*A3(t)+w14*A4(t) \qquad (17a)$$

$$y2(t)=w21*A1(t)+w22*A2(t)+w23*A3(t)+w24*A4(t) \qquad (17b)$$

$$y3(t)=w31*A1(t)+w32*A2(t)+w33*A3(t)+w34*A4(t) \qquad (17c)$$

$$y4(t)=w41*A1(t)+w42*A2(t)+w43*A3(t)+w44*A4(t) \qquad (17d)$$

$$y5(t)=w51*A1(t)+w52*A2(t)+w53*A3(t)+w54*A4(t) \qquad (17e)$$

where A1(t) is weighted by a first beam weight vector (BWV1) 2710, A2(t) is weighted by a second beam weight vector (BWV2) 2720, A3(t) is weighted by a third beam weight vector (BWV3) 2730, A4(t) is weighted by a fourth beam weight vector (BWV4) 2740.

$$BWV1=[w11\,w21\,w31\,w41\,w51]^T \qquad (18a)$$

$$BWV2=[w12\,w22\,w32\,w42\,w52]^T \qquad (18b)$$

$$BWV3=[w13\,w23\,w33\,w43\,w53]^T \qquad (18c)$$

$$BWV4=[w14\,w24\,w34\,w44\,w54]^T \qquad (18d)$$

Depicted in FIG. 28, the DBF matrix, [BWVs] 2310, generated via an optimization processing for a 5-element linear array is a 5×4 matrix with complex parameters. The optimized 4 BWVs and a corresponding 5×4 matrix under the OB performance constraints are depicted in FIG. 27 and FIG. 28. The matrix [BWVs] 2310 is repeated in the following:

$$[BWVs] = \begin{bmatrix} -0.231-0.096i & 0.096+0.231i & 0.096-0.231i & -0.23l+0.096i \\ 0.096+0.231i & 0.231+0.096i & 0.231-0.096i & 0.096-0.231i \\ 0.096-0.231i & 0.231-0.096i & 0.231+0.096i & 0.097-0.231i \\ -0.110+0.050i & 0.029-0.141i & 0.039+0.106i & -0.114-0.052i \\ 0.121-0.046i & -0.067+0.090i & -0.056-0.125i & 0.117+0.044i \end{bmatrix} \quad (19)$$

And it can be rewritten as a row vector (a 1×4 matrix):

[BWVs]=[BWV1 BWV2 BWV3 BWV4]   (20)

where each complex matrix element is a column vector (a 5×1 matrix). The complex elements can be either in an I/Q format or a format with amplitude and phase.

$$BWV1 = \begin{pmatrix} -0.231-0.096i \\ 0.096-0.231i \\ 0.096-0.231i \\ '-0.110-0.050i \\ 0.121-0.046i \end{pmatrix} = \begin{pmatrix} 0.25\exp(-j157.5°) \\ 0.25\exp(j67.5°) \\ 0.25\exp(-j67.5°) \\ 0.12\exp(j155.6°) \\ 0.13\exp(-j20.7°) \end{pmatrix} \quad (21a)$$

$$BWV2 = \begin{pmatrix} 0.096-0.231i \\ '0.231-0.096i \\ '0.231-0.096i \\ '0.029-0.141i \\ '-0.067-0.090i \end{pmatrix} = \begin{pmatrix} 0.25\exp(j67.5°) \\ 0.25\exp(j22.5°) \\ 0.25\exp(-j22.5°) \\ 0.14\exp(-j78.4°) \\ 0.11\exp(j126.5°) \end{pmatrix} \quad (21b)$$

$$BWV3 = \begin{pmatrix} 0.096-0.231i \\ '0.231-0.096i \\ '0.231-0.096i \\ '0.039-0.106i \\ '-0.056-0.125i \end{pmatrix} = \begin{pmatrix} 0.25\exp(-j67.5°) \\ 0.25\exp(-j22.5°) \\ 0.25\exp(j22.5°) \\ 0.11\exp(j69.6°) \\ 0.14\exp(-j114.2°) \end{pmatrix} \quad (21c)$$

$$BWV4 = \begin{pmatrix} -0.231-0.096i \\ '0.096-0.231i \\ '0.096-0.231i \\ -0.114-0.052i \\ '0.117-0.044i \end{pmatrix} = \begin{pmatrix} 0.25\exp(j157.5°) \\ 0.25\exp(-j67.5°) \\ 0.25\exp(j67.5°) \\ 0.13\exp-(j155.5°) \\ 0.12\exp(j20.4°) \end{pmatrix} \quad (21d)$$

Let us use the convention that an M×N matrix has M rows and N columns. BWV1 2710 is a 5×1 matrix, and features a set of complex numbers which represent a unique amplitude and phase distribution among the adjacent components. Similarly, BWV2 2720, BWV3 2730, and BWV4 2740 show features of different amplitude and phase distributions.

FIG. 29 illustrates a panel 2900 which shows that a K-muxing transform can be derived from the DBF matrix for a set of 4 orthogonal beams, while the corresponding K-demuxing transform can be derived from the propagation vectors from the 5 elements in a linear Tx array for 4 various directions. The first direction at [Θ,Φ]=[48°, 0] is to recover A1(t). Similarly, the directions at [Θ,Φ]=[14.5°, 0], [−14.5°, 0], and [−48°, 0] are for A2(t), A3(t), and A4(t), respectively. These constrained directions are identical to the 4 beam pointing directions in Example 1.

It is very clear that, when a first direction were not set at [Θ,Φ]=[48°, 0], say at [50°, 0], a recovered data or signal stream for A1(t) would be contaminated by leakages from other 3 beams. As a result, the recovered data streams can be expressed as:

A1'(t)=A1(t)+δ2A2(t)+δ3A3(t)+δ4A4(t)   (22)

Additional post processing in a receiver is needed to estimate A1(t) from A1'(t), when A2(t), A3(t) and A4(t) become known to the receiver.

Example 2 is a special case for with N=5 and M=4; or 4 beams using an array with 5 elements. The [BWVs] 2310 for this example features a [N×M] matrix and can be used for a K-muxing operation. The number of elements, N, is set to 5, the number of shaped beams, M, is also set to 4. Similarly, the [P] is a [N×M] matrix and can be used for a K-demuxing operation as derived in FIG. 29, panel 2900.

It is also interesting to view the 5-element array in a receiving mode. The 5 array elements capture all 4 different signals originated from 4 satellites at the same RF frequency concurrently. The propagation from all 4 directions to the 5 elements of the array in an Rx mode can be characterized as the [P] matrix. The captured signals are amplified and filtered properly before converted to digital format. A beam forming network will perform a transformation converting the 5 received element signals to 4 received beam signals. The transformation is a [BWVs]. Thus a similar set of equations to Equations (16a), (16b), (16c), and (16d) can be derived as followed:

Y=[P]*A'   (23a)

A=[BWVs]*Y   (23b)

A=[BWVs]*[P]*A'   (23c)

where:

A' is a M×1 matrix, representing a vector for a set of M beam signals originated by the 4 sources from various directions, the 4 sources are 4 satellites at various directions;

$P_i$ is a 1*N matrix, a propagation vector from an ith direction in a far field to the N array elements;

$[P]=[P_1\ P_2\ P_3,\ldots P_M]^T$ and is a M×N matrix, representing a set of propagation vectors converting a set of N element signals to a set of Tx beam signals at M various directions;

Y is a N×1 matrix, a vector representing a set of N element signals;

[BWVs] is a N×M matrix, representing a Tx beam forming function converting a set of M beam signals to a set of N element signals;

A is a set of beam signals at M outputs of a DBFN.

According to Equation (16c) under the following condition, A' will become A,

[BWVs]*[P]=I   (23d)

where [P] is a M×N K-muxing matrix while [BWVs] becomes a N×M K-demuxing matrix.

However, when one of the 5 elements fails to function properly in the receiving array, the same 4 signals will still be captured by the remaining 4 elements. The array may be reconfigured to recover the 4 signals originated from the 4 satellites, when 4 of the 5 element signals are available. The re-optimization of the configured array from 5 elements to 4 elements will be discussed in FIG. 37. The new and re-optimized [BWVs] will be a 4×4 K-demuxing transform matrix.

Example 3

Figure 30:
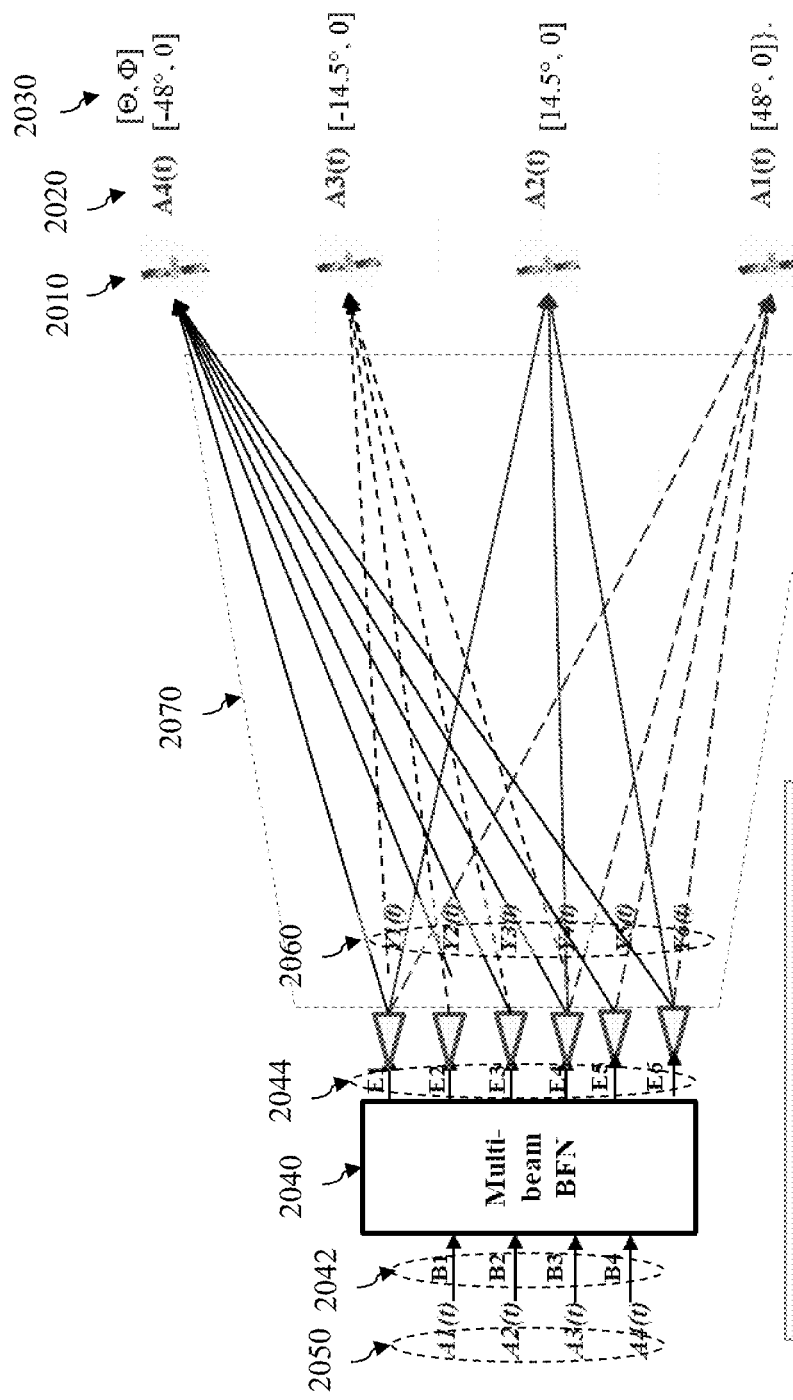
FIG. 30 is a diagram illustrating OB radiation patterns from 4 concurrent beams generated by a 6-element array according to one embodiment.

An example of OB radiation patterns from 4 concurrent beams generated by an array with 6 elements 2044 are depicted in FIG. 30. The peaks of the OB beam are at [u, v]={[−¾, 0], [−¼, 0], [¼, 0], [¾, 0]}, or at [Θ,Φ]={[−48°, 0], [−14.5°, 0], [14.5°, 0], [48°, 0]} 2020.

It depicts the same scenario of communicating to 4 satellites 2010 concurrently from a multibeam transmitting array antenna, which features 6 instead of 4 array elements as that in example 1 and a Tx multibeam beam-forming-network (BFN) 2040. The 6 elements 2044 are aligned in a linear format with contiguous elements equally spaced at 0.5 wavelengths. The Tx multibeam BFN 2040 features 4 input ports (or 4 beam ports 2042), B1, B2, B3, and B4, and 6 output ports 2044 (or 6 element ports), E1, E2, E3, E4, E5, and E6.

The 4 beam signals 2050 A1($t$), A2($t$), A3($t$), and A4($t$) are connected to the 4 beam ports 2042 of the multibeam beam-forming-network (BFN). The 6 output signals from the 6 element ports 2044 of the multibeam BFN are 6 element signals 2060; y1($t$), y2($t$), y3($t$), y4($t$), y5($t$), and y6($t$). The radiated element signals will propagate in free space, and spatially combined in a far field. As a result of the free-space propagations 902, the radiated 4 beam signals 2050 by the 6 elements will be "untangled" and delivered individually and independently to 4 specified directions 2020. The recovered signals 2020 at various directions 2030 shall be nearly identical to the beam signals 2050.

The beam-forming-network (BFN) 2040 can be configured and implemented as mechanisms for 4 Tx orthogonal beams. The target satellite directions are at u=±¼ and ±¾ (or Θ=±14.5° and ±48°) 2020.

A $1^{st}$ shaped beam can be optimized as a weighted sum of individual element radiation patterns in digital beam-forming-networks (BFN) 2040. The weighting parameters are Quantitatively, the Tx multibeam beam forming network 2040 featuring 4 input ports 2042 and 6 output ports 2044, transforms 4 beam signals 2050, (A1($t$), A2($t$), A3($t$), A4($t$)) at the inputs, to 6 element signals 2060, [y1($t$), y2($t$), y3($t$), y4($t$), y5($t$), y6($t$)] at the outputs. The 6 element signals 2060 are then connected to 6 radiating elements of the Tx array as shown in FIG. 30.

$$y1(t)=w11*A1(t)+w12*A2(t)+w13*A3(t)+w14*A4(t) \quad (24a)$$

$$y2(t)=w21*A1(t)+w22*A2(t)+w23*A3(t)+w24*A4(t) \quad (24b)$$

$$y3(t)=w31*A1(t)+w32*A2(t)+w33*A3(t)+w34*A4(t) \quad (24c)$$

$$y4(t)=w41*A1(t)+w42*A2(t)+w43*A3(t)+w44*A4(t) \quad (24d)$$

$$y5(t)=w51*A1(t)+w52*A2(t)+w53*A3(t)+w54*A4(t) \quad (24e)$$

$$y6(t)=w61*A1(t)+w62*A2(t)+w63*A3(t)+w64*A4(t) \quad (24f)$$

where A1($t$) is weighted by a first beam weight vector (BWV1) 2710, A2($t$) is weighted by a second beam weight vector (BWV2) 2720, A3($t$) is weighted by a third beam weight vector (BWV3) 2730, A4($t$) is weighted by a fourth beam weight vector (BWV4) 2740.

$$BWV1=[w11\,w21\,w31\,w41\,w51\,w61]^T \quad (25a)$$

$$BWV2=[w12\,w22\,w32\,w42\,w52\,w62]^T \quad (25b)$$

$$BWV3=[w13\,w23\,w33\,w43\,w53\,w63]^T \quad (25c)$$

$$BWV4=[w14\,w24\,w34\,w44\,w54\,w64]^T \quad (25d)$$

Figure 31:
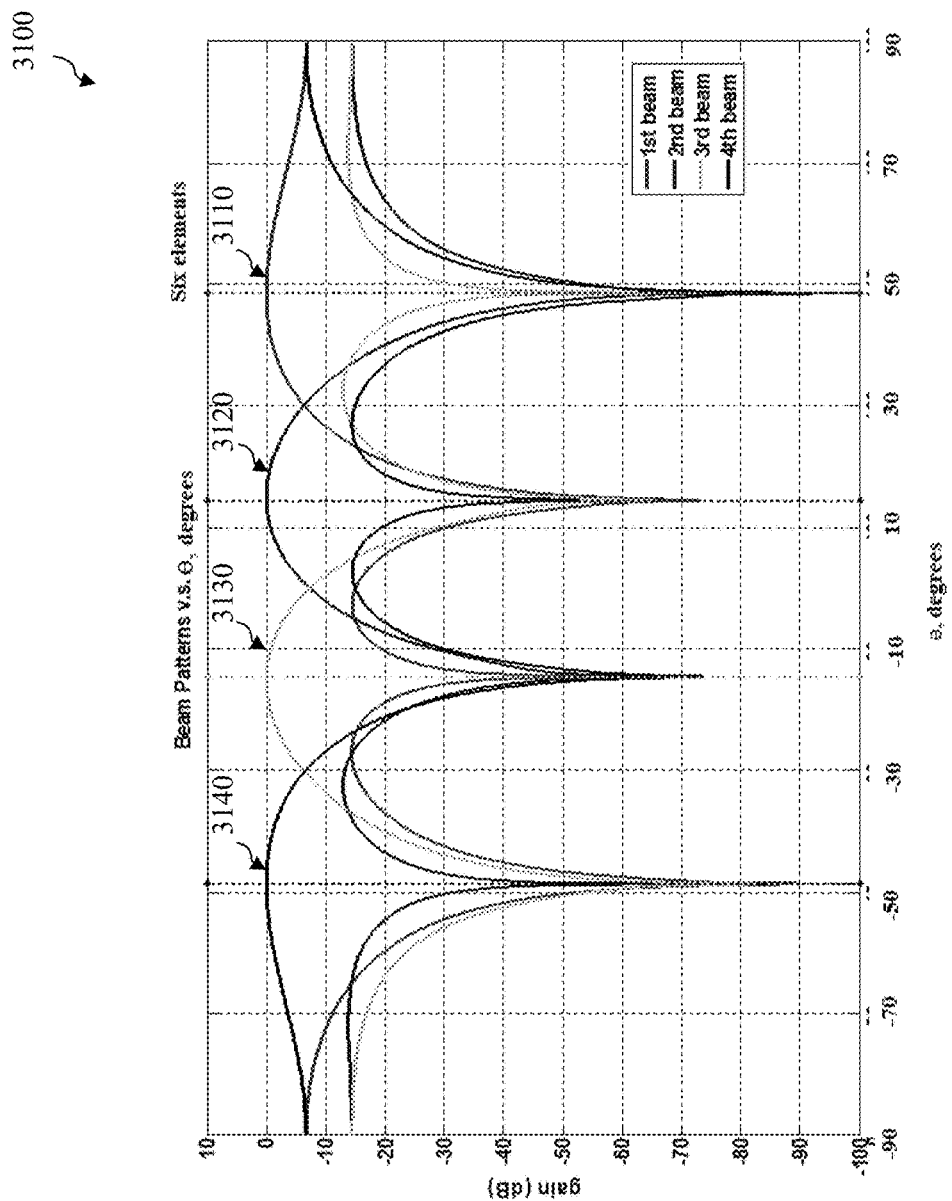
FIG. 31 is a diagram illustrating simulated radiation patterns using beam-shaping algorithms and performance constraints of the directions of 4 shaped beams according to one embodiment.
Figure 32:
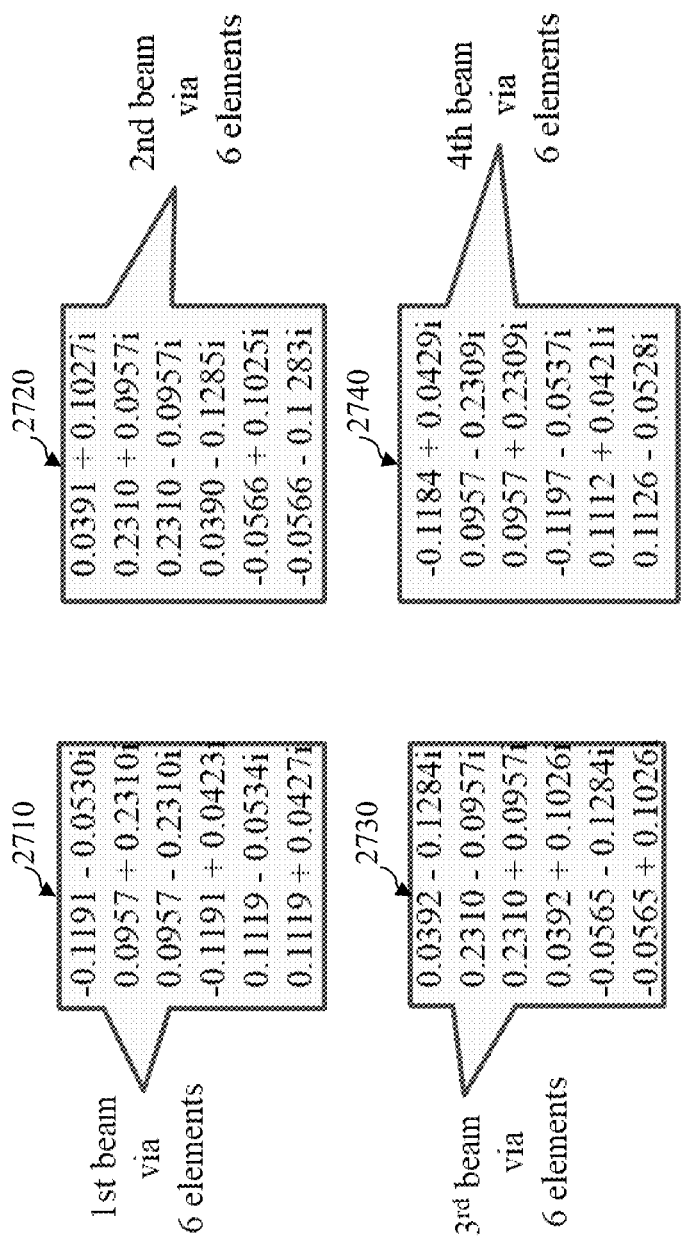
FIG. 32 is a diagram illustrating the BWVs for 4 OB beams from a 6-element array according to one embodiment.

The DBF matrix, [BWVs] 2310, generated via an optimization processing for a 6-element linear array is a 6×4 matrix with complex parameters. The optimized 4 BWVs and a corresponding 6×4 matrix under the OB performance constraints are depicted in FIG. 11B and FIG. 11C 1140. The matrix [BWVs] 2310 is repeated in the following:

$$BWVs = \begin{pmatrix} -0.1191-0.0530i & 0.0391+0.1027i & 0.0392-0.1284i & -0.1184+0.0429i \\ 0.0957+0.2310i & 0.2310+0.0957i & 0.2310-0.0957i & 0.0957-0.2309i \\ 0.0957-0.2310i & 0.2310-0.0957i & 0.2310+0.0957i & 0.0957+0.2309i \\ -0.1191+0.0423i & 0.0390-0.1285i & 0.0392+0.1026i & -0.1197-0.0537i \\ 0.1119-0.0534i & -0.0566+0.1025i & -0.0565-0.1284i & 0.1112+0.0421i \\ 0.1119+0.0427i & -0.0566-0.1283i & -0.0565+0.1026i & 0.1126-0.0528i \end{pmatrix} \quad (26)$$

optimized to meet the performance constraints for the shaped beam. The weighting parameters for the array with 6 elements are in a weighting vector, referred to as the beam weight vector (BWV) for the shaped beam. FIG. 31 shows simulated radiation patterns 1130 using beam-shaping algorithms and the performance constraints for the directions of 4 shaped beams at Θ=±14.5° and ±48° 928. The algorithms are to optimize 4 concurrent orthogonal beams 1132-1, 1132-2, 1132-3, 1132-4, minimizing mutual interference in far field. It is noticed that the vertical axis ranges from −100 to 10 dB depicting the radiation intensity variation over all coverage directions.

Normalized radiation patterns of 4 shaped beams shown in FIG. 31 for the 6-element linear DBF array are dictated by the corresponding BWVs. They are shaped under OB performance constraints. The normalized beam peaks at 0 dB are indeed located at Θ=±14.5° and ±48°, respectively. The peak of any one OB beam is located at a null of all other OB beams, and the peaks of all other OB beams are at nulls of the OB beam. The peak to null ratios shown are better than 80 dB.

And it can be rewritten as a row vector (a 1×4 matrix)

$$[BWVs]=[BWV1\,BWV2\,BWV3\,BWV4] \quad (27)$$

where each matrix element is a column vector (a 6×1 matrix):

$$BWV1 = \begin{pmatrix} -0.119-0.053i \\ 0.096-0.231i \\ 0.096-0.231i \\ -0.119-0.042i \\ -0.112-0.053i \\ 0.112-0.043i \end{pmatrix} = \begin{pmatrix} 0.13\exp(-j156.0°) \\ 0.25\exp(j67.5°) \\ 0.25\exp(-j67.5°) \\ 0.13\exp(j160.4°) \\ 0.12\exp(-j25.5°) \\ 0.12\exp(j20.9°) \end{pmatrix} \quad (28a)$$

-continued $$BWV2 = \begin{pmatrix} '0.039+0.103i \\ 0.230+0.067i \\ '0.231-0.096i \\ '-0.039-0.129i \\ -0.057+0.103i \\ -0.057-0.128i \end{pmatrix} = \begin{pmatrix} 0.11\exp(j69.2°) \\ 0.25\exp(j22.5°) \\ 0.25\exp(-j22.5°) \\ 0.13\exp(-j73.1°) \\ 0.12\exp(j118.9°) \\ 0.14\exp(-j113.8°) \end{pmatrix} \quad (28b)$$

$$BWV3 = \begin{pmatrix} 0.039-0.128i \\ 0.231-0.096i \\ 0.231+0.096i \\ 0.039+0.103i \\ -0.057-0.128i \\ -0.057+0.103i \end{pmatrix} = \begin{pmatrix} 0.13\exp(-j73.0°) \\ 0.25\exp(-j22.5°) \\ 0.25\exp(j22.5°) \\ 0.11\exp(j69.1°) \\ 0.14\exp(-j113.8°) \\ 0.12\exp(j118.8°) \end{pmatrix} \quad (28c)$$

$$BWV4 = \begin{pmatrix} -0.118+0.043i \\ 0.096-0.231i \\ 0.096+0.231i \\ -0.120-0.054i \\ 0.111+0.042i \\ 0.113-0.053i \end{pmatrix} = \begin{pmatrix} 0.13\exp(j160.1°) \\ 0.25\exp(-j67.5°) \\ 0.25\exp(j67.5°) \\ 0.13\exp(-j155.8°) \\ 0.12\exp(j20.7°) \\ 0.12\exp(-j25.1°) \end{pmatrix} \quad (28d)$$

BWV1 is a 6×1 matrix and features a set of complex numbers which represent a unique amplitude and phase distribution among the adjacent components. Similarly, BWV2, BWV3, and BWV4 show features of different amplitude and phase distributions in a 6-parameter space or a 6-dimensional space.

FIG. 34 shows that a K-muxing transform can be derived from the DBF matrix for a set of 4 orthogonal beams, while the corresponding K-demuxing transform can be derived from the propagation vectors from the 6 elements in a linear Tx array for 4 various directions. The first direction at $[\Theta,\Phi]=[48°, 0]$ is to recover $A1(t)$. Similarly, the directions at $[\Theta,\Phi]=[14.5°, 0]$, $[-14.5°, 0]$, and $[-48°, 0]$ are for $A2(t)$, $A3(t)$, and $A4(t)$, respectively. These constrained directions are identical to the 4 beam pointing directions in Example 1.

It is very clear that, when a first direction were not set at $[\Theta,\Phi]=[48°, 0]$, say at $[50°, 0]$, a recovered data or signal stream for $A1(t)$ would be contaminated by leakages from other 3 beams. As a result, the recovered data streams can be expressed as:

$$A1'(t)=A1(t)+\delta 2 A2(t)+\delta 3 A3(t)+\delta 4 A4(t) \quad (29)$$

Additional post processing in a receiver is needed to estimate $A1(t)$ from $A1'(t)$, when $A2(t)$, $A3(t)$ and $A4(t)$ become known to the receiver.

Example 3 is a special case for with N=6 and M=4; or 4 beams using an array with 6 elements as depicted in FIG. 30. The [BWVs] for this example features a [N×M] matrix and can be used for a K-muxing operation. The number of elements, N, is set to 6, the number of shaped beams, M, is also set to 4. Similarly, the [P] is a [N×M] matrix and can be used for a K-demuxing operation.

It is also interesting to view the 6-element array in a receiving mode. The 6 array elements 2044 capture all 4 different signals originated from 4 satellites 2010 at the same RF frequency concurrently. The propagation 2070 from all 4 directions 2030 to the 6 elements 2044 of the array in an Rx mode can be characterized as the [P] matrix. The captured signals 2060 are amplified and filtered properly before converted to digital format. A beam forming network 2040 will perform a transformation converting the 6 received element signals to 4 received beam signals 916. The transformation 2510 is an operation via [BWVs]. Thus, a similar set of equations to Equations (16a), (16b), (16c), and (16d) can be derived as follows:

$$Y=[P]*A' \quad (30a)$$

$$A=[BWVs]*Y \quad (30b)$$

$$A=[BWVs]*[P]*A' \quad (30c)$$

Where: A' 2020 is an M×1 matrix, representing a vector for a set of M beam signals originated by the 4 satellites 2010 at various directions 928.

$P_i$ is a 1×N matrix, a propagation vector from an ith direction in a far field to the N array elements by free space propagation 902.

$[P]=[P_1 \, P_2 \, P_3, \ldots PM]^T$ and is a M×N matrix, representing a set of propagation vectors converting a set of N element signals to a set of Tx beam signals at M various directions.

Y is an N×1 matrix, a vector representing a set of N element signals 918,

[BWVs] is a N×M matrix, representing an Rx beam forming function 2040 converting a set of N element signals 2060 to a set of M beam signals 916, A is a set of beam signals 2050 at M outputs of a DBFN 2040 at an Rx mode.

According to Equation (16c) under the following condition, A' will become A, $$[BWVs]*[P]=I \quad (30d)$$

where [P] is a M×N K-muxing matrix while [BWVs] becomes a N×M K-demuxing matrix.

However, when two of the 6 elements fail to function properly in the receiving array, the same 4 signals will still be captured by the remaining 4 elements. The array may be reconfigured to recover the 4 signals originated from the 4 satellites, when 4 of the 6 element signals are available. The re-optimization of the configured array from 6 elements to 4 elements will be discussed in FIG. 38. The new and re-optimized [BWVs] will be a 4×4 K-demuxing transform matrix.

According to Equations 16a, 16b, 16c, and 16d, Example 3 is another special case for with N=6 and M=4; or 4 beams using an array with 6 elements.

We may make the following observations:
1. The three examples illustrate, respectively, (1) 4 elements for forming 4 concurrent OB beams, (2) 5 elements for forming 4 concurrent OB beams, and (3) 6 elements for forming 4 concurrent OB beams.
2. In a beam shaping optimization under boundary conditions of an array geometry and far field performance constraints, an optimized beam weight vector (BWV) for customized shaped beam including a beam with OB patent is generated. The BWV characterizes the shaped beam.
3. Examples 1, 2, and 3 all feature 4 concurrent OB beams.
   Performance constraints in beam shaping process for the three examples are identical.
   OB beams are to assure propagation in free space in a desired or constraint direction will result in recovering a desired signal while rejecting the other 3 signals better than 50 dB; excellent isolation.
   Corresponding BWVs are different for various arrays.
4. However, they show, respectively, (a) no redundancy in array elements from the 4-element linear array, (b) a 5-for-4 redundancy in array elements from the 5-element linear array, and (3) a 6-for-4 redundancy in array elements from the 6-element linear array.

5. OB beam-forming can be used to generate K-muxing matrices; while the corresponding K-demuxing matrices are the formulations of free space propagation from array elements to various directions.

Figure 35:
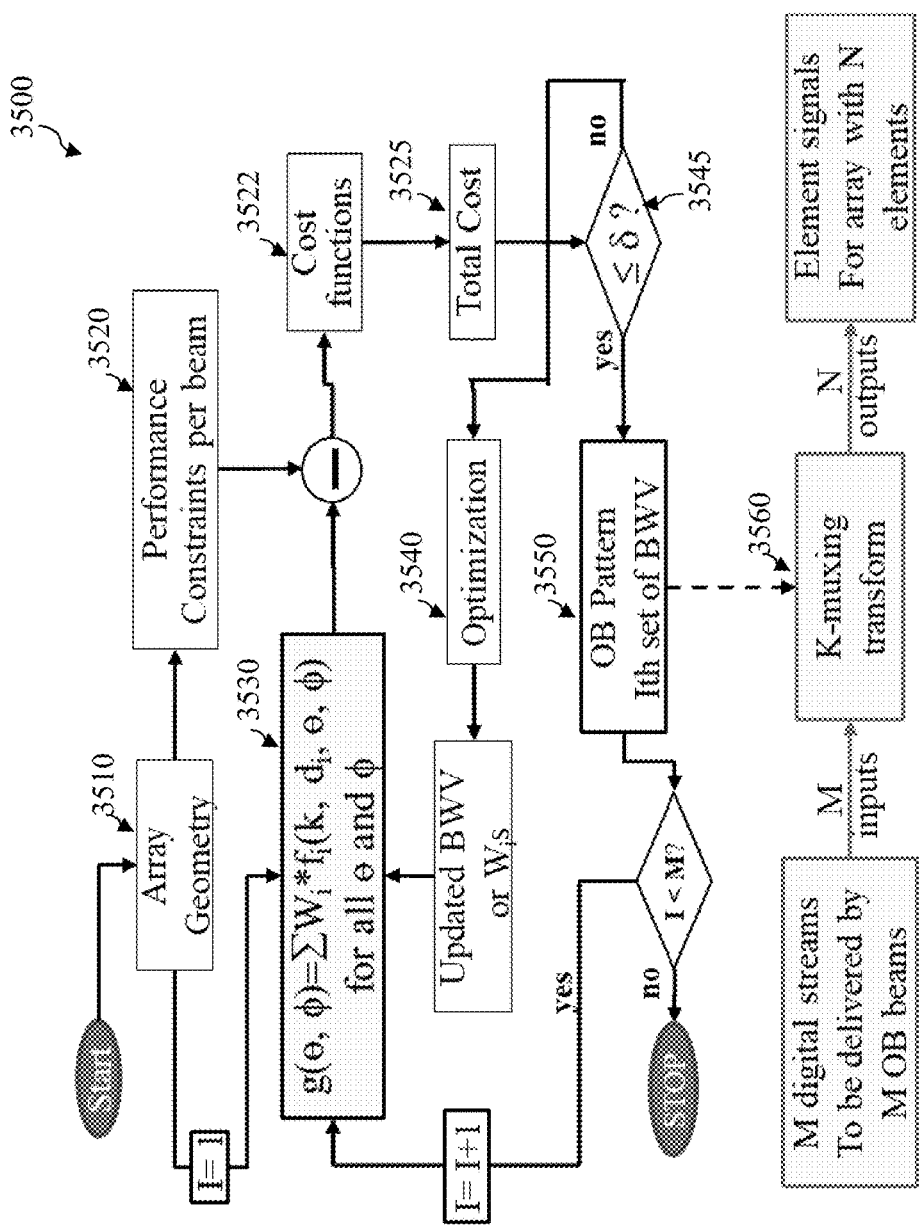
FIG. 35 is a flowchart illustrating a method to calculate the BWVs for an array with N elements generating concurrent M beams according to one embodiment.

FIG. 35 depicts a flow chart 3500 calculating the [BWVs] for an array with N elements generating concurrent M beam. The steps are as follows:
1. Define an array geometry 3510 with M OB beams, j=1, and an initial BWV
2. Designate peak and null positions as performance constraints 3520 for a jth beam with an OB radiation pattern
3. Iteration loop
   i. Far-field calculation 3530 on radiation pattern based on new BWV and the array geometry 3510;
   ii. Generations of observables based on differences between calculated array pattern at constrained directions and specified performance constraints 3520;
   iii. Converting observables to cost functions which are measurable with positive values,
   iv. Calculate current total cost by summing up all cost functions,
   v. If total cost less than a threshold ($\delta$) go to step 4; otherwise go to step 3 vi.
   vi. Derive and update weighting coefficients of the BWV via optimization 3540 schemes by a cost minimization algorithm and go to step 3i,
4. Plot the pattern (array factor only) of the OB beam and output the associated BWV,
5. If j=M stop; otherwise j=j+1 and go to step 2.

A BWV for a shaped beam is a set of amplitude and phase weights in a beam forming network (BFN) from an N-element array and shall feature an N×1 matrix. To form M concurrent beams, the BFN shall use M sets of BWVs individually. An output buffer 3550 shall output the matrix [BWVs] comprising M sets of BWVs, which transforms M beam port data streams to N port element data streams.

The same [BWVs] matrix can be used for an M (inputs)-to-N(outputs) K-muxing 3560 operation, transforming M data streams to N K-muxed data streams for private data storage and data transport with enhanced survivability.

Figure 36:
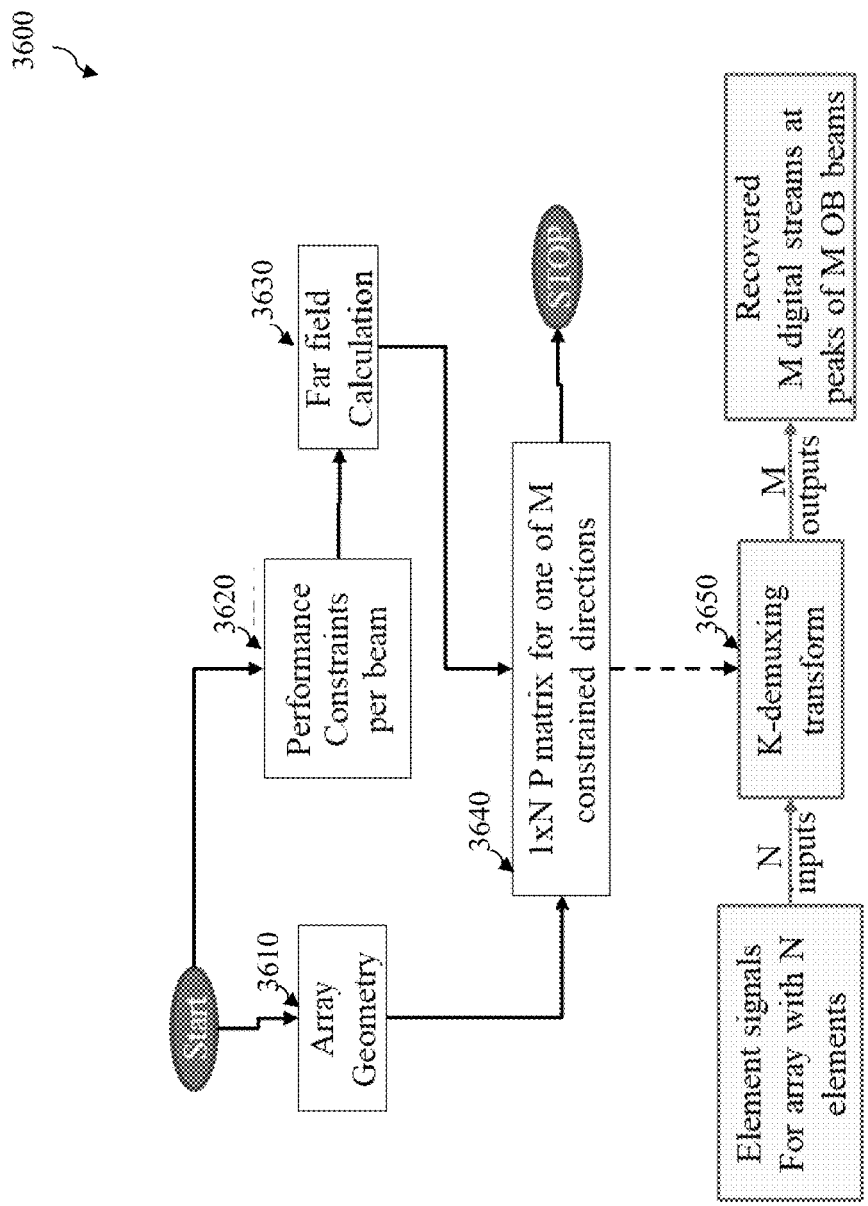
FIG. 36 is a flowchart illustrating a method to calculate various propagation vectors for different beams of an array with N elements according to one embodiment.

FIG. 36 depicts a flow chart 3600 calculating various propagation vectors for different beams of an array with N elements. Each propagation vector can be represented as a 1*N matrix. A matrix [P] includes components in M rows and N columns. The N×M matrix allows M concurrent beams to propagate to M specified directions delivering M independent data streams. The steps for the flow chart are as follows:
1. Define an array geometry 3610 with M OB beams, j=1, and a set of optimized BWV.
2. Designate peak and null positions as performance constraints 3620 for one individual beam with OB radiation pattern.
3. Calculate array pattern via far-field calculation 3630 based on the optimized BWVs or on performance constraints.
4. Calculate the P matrices at M constrained directions, and form the matrix [P] 3640.
5. Using [P] 3640 as a K-demuxing transform 3650.
6. Reconstituting data streams using the P matrix, [P] 3640,
   i. Define element signal streams for an N-element array.
   ii. Calculate recovered signals streams via the K-demuxing 3650 operation.

All the N elements are used in calculating the recovered signal streams. We have assumed that all the N element signals are available. There is no redundancy in the approach.

Figure 37:
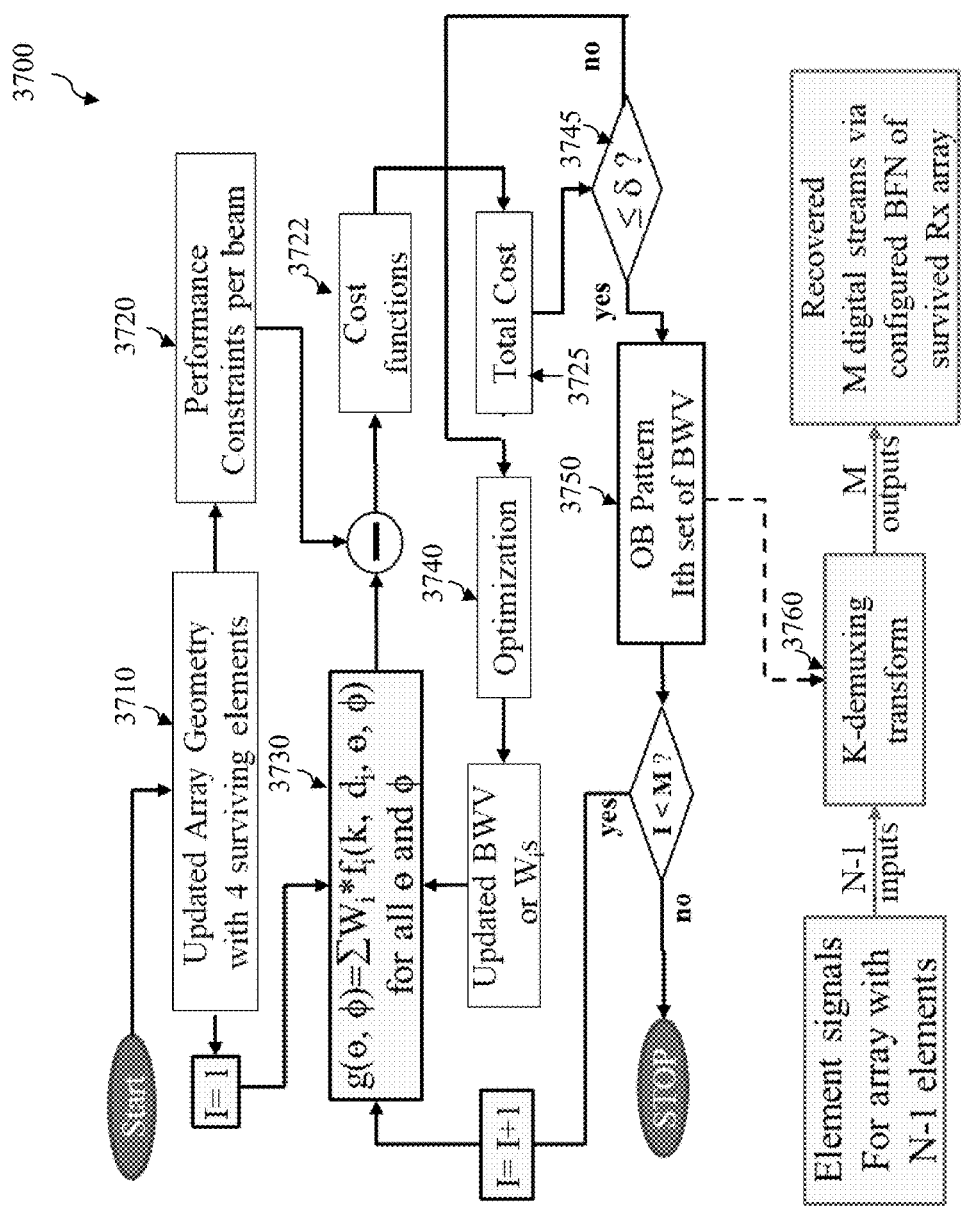
FIG. 37 is a flowchart illustrating an alternate method to reconstitute the M beam signals based on N element signals (N=5 and M=4) according to one embodiment.

FIG. 37 depicts the flow chart 3700 of an alternate approach in reconstituting the M beam signals based on N element signals, when N=5 and M=4. The array geometry 3710 indicates that there is one redundant element from the array with 5 array elements. The 5-element array can concurrently form 4 receiving beams with OB patterns. We use digital beam forming in Rx, instead of propagation matrices, to create K-demuxing 3760. The steps for the flow chart are as follows:
1. A 5-element array geometry with 4 survived elements and a BWV,
2. Designate the same peak and null positions as performance constraints 3720 for one beam with a similar OB radiation pattern,
3. Iteration loop:
   A. Array pattern calculation 3730 based on new BWV,
   B. Generations of observables from differences between calculated array pattern and its performance constraints,
   C. Converting observables to cost functions which are measurable with positive values.
   D. Calculate current total cost,
   E. If total cost less than a threshold ($\delta$) go to step 4; otherwise go to step 3F.
   F. Derive and update weighting coefficients of the BWV via optimization 3740 schemes by a cost minimization algorithm and go to 3A.
4. From an output buffer 3750, we plot the pattern (array factor only) of configured OB beam and output the BWV.

Figure 38:
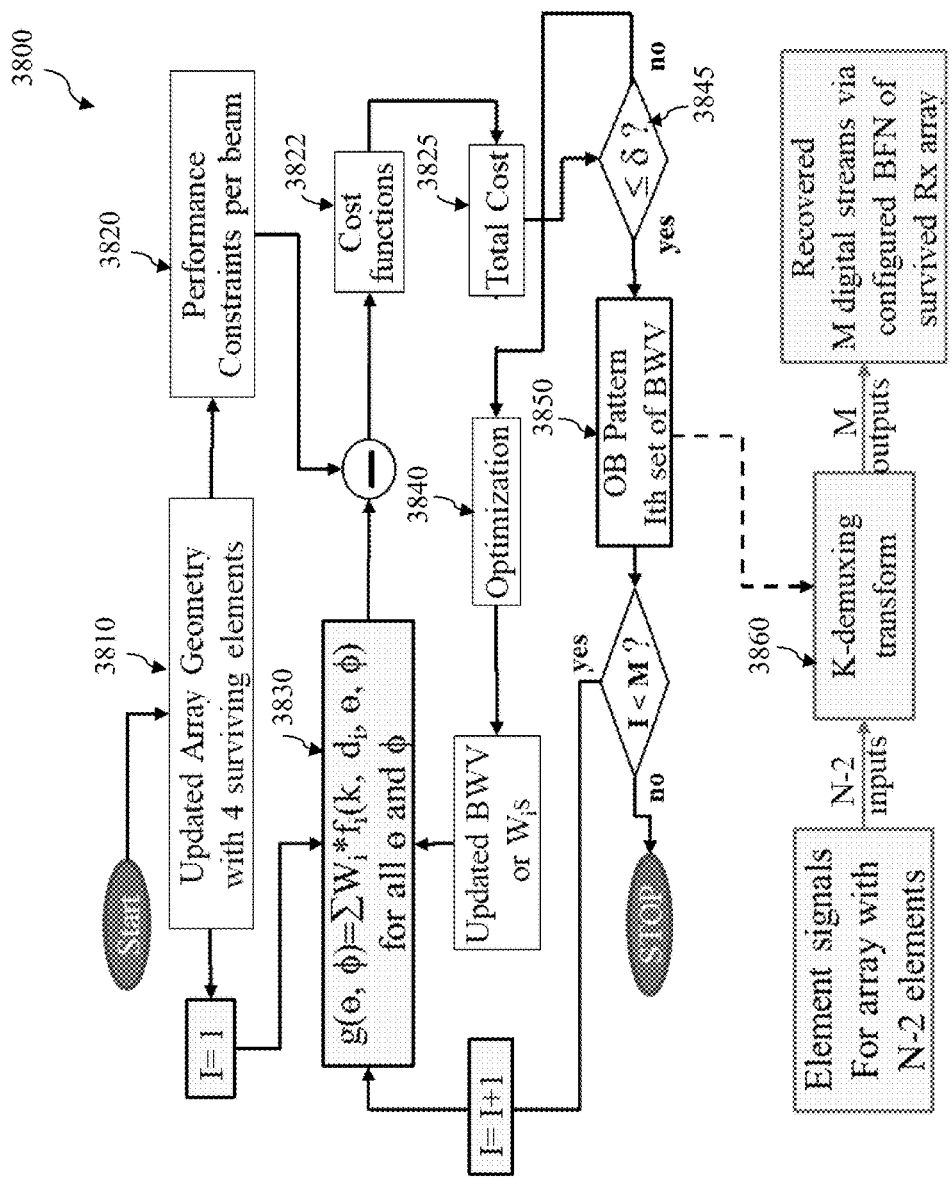
FIG. 38 is a flowchart illustrating an alternate method to reconstitute the M beam signals based on N element signals (N=6 and M=4) according to one embodiment.

FIG. 38 depicts a flow chart 3800 of an alternate approach in reconstituting the M beam signals based on N element signals, when N=6 and M=4. The array geometry 3810 indicates that there were two redundant elements from the array with 6 array elements. The 6-element array can concurrently form 4 receiving beams with OB patterns. We use digital beam forming 3830 in Rx, instead of propagation matrices, to create K-demuxing 3860. The steps for the flow chart are as follows:
1. A 6-element array geometry with 4 survived elements and a BWV,
2. Designate the same peak and null positions as performance constraints 3820 for one beam with a similar OB radiation pattern,
3. Iteration loop:
   i. Array pattern calculation 3830 based on new BWV,
   ii. Generations of observables from differences between calculated array pattern and its performance constraints,
   iii. Converting observables to cost functions which are measurable with positive values.
   iv. Calculate current total cost,
   v. If total cost less than a threshold ($\delta$) go to step 4; otherwise go to step 3 vi.
   vi. Derive and update weighting coefficients of the BWV via optimization 3840 schemes by a cost minimization algorithm and go to 3A.
4. From an output buffer 3850, we plot the pattern of configured OB beam and output the BWV.

Private and Redundant Data on Nonvolatile Memory Via K-Muxing Transform:

Nonvolatile memory is a general term for all forms of solid state (no moving parts) memory that do not need to have their memory contents periodically refreshed. This includes all forms of read-only memory (ROM) such as programmable read-only memory (PROM), erasable programmable read-only memory (EPROM), electrically erasable programmable read-only memory (EEPROM), and flash memory. It also includes random access memory (RAM) that is powered with a battery.

An SSD (solid-state drive or solid-state disk) is a non-volatile storage device that stores persistent data on solid-state flash memory. SSD devices embed silicon-based memory chips as the storage media for the writing and reading of persistent data. SSDs, also known as flash drives or flash cards, are inserted into slots in computer servers—referred to as server-side flash storage—or as part of an enterprise flash storage array system.

Sometimes the flash devices are called solid-state hard drives, although that term is misleading. Unlike a spindled hard disk drive (HDD), an SSD contains no mechanical parts. A traditional HDD consists of a spinning disk with a read/write head on a mechanical arm, known as an actuator. An SSD, on the other hand, has an array of semiconductor memory organized as a disk drive, using integrated circuits rather than magnetic or optical storage media.

Devices containing flash storage memory have varied use cases. Development and adoption of SSDs has been driven by use of applications that demand higher I/O performance. SSDs have lower random access and read access latency than HDDs, making them a fit for both heavy read and random workloads.

That lower latency is the direct result of the ability of a flash SSD to read data directly and immediately from a specific flash cell location. High-performance servers, laptops, desktops or applications that deliver information in real-time or near real-time could benefit from solid-state drive technology.

Those characteristics make enterprise SSDs suitable to offload reads from transaction-heavy databases, to alleviate boot storms with virtual desktop infrastructure, or inside a storage array to stage hot data locally for off-site storage in a hybrid cloud scenario.

The Solid State Storage Initiative has identified three major SSD form factors for the enterprise:
1. SSDs that come in traditional HDD form factors and fit into the same slots.
2. Solid-state cards that use standard card form factors, such as Peripheral Component Interconnect Express (PCIe), and reside on a printed circuit board.
3. Solid-state modules that reside in a Dual In-line Memory Module (DIMM) or small outline dual in-line memory module (SO-DIMM), and may use a standard HDD interface such as Serial Advanced Technology Attachment (SATA).

We may use the same or similar techniques depicted in FIG. 1 to FIG. 19 to perform K-muxing and K-demuxing transforms on data stored on solid state drives (SSD) for enhanced data privacy and survivability via redundancy.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM). Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus comprising:
a pre-processing device to perform a wavefront multiplexing (WFM) transform on M input streams corresponding to M orthogonal beams to generate N output streams using a weight matrix having M beam weight vectors (BWVs) associated with the M orthogonal beams; and
an antenna array having N elements to transmit the N output streams to a plurality of receivers,
wherein M and N are positive integers and $1 < M \leq N$,
wherein the M BWVs are calculated using an optimization procedure based on performance constraints, and
wherein the performance constraints for one of the M orthogonal beams with an orthogonal beam (OB) radiation pattern include designated peak and null positions.

2. The apparatus of claim 1, wherein the M orthogonal beams include a first beam having a peak at nulls of other beams of the M orthogonal beams and wherein peaks of the other beams are at nulls of the first beam.

3. The apparatus of claim 1, wherein the optimization procedure is an iterative process which is stopped when a cost function derived from the performance constraints is less than a pre-determined threshold.

4. The apparatus of claim 1, wherein a redundancy degree is N minus M.

5. The apparatus of claim 1, wherein the plurality of receivers are located on satellites.

6. The apparatus of claim 1, wherein each of the N BWV is an N×1 column vector representing amplitude and phase distributions among adjacent components.

7. An apparatus comprising:
a pre-processing device to perform a wavefront multiplexing (WFM) transform on M input streams corresponding to M orthogonal beams to generate N output streams using a weight matrix having M beam weight vectors (BWVs) associated with the M orthogonal beams; and
an antenna array having N elements to transmit the N output streams to a plurality of receivers,
wherein M and N are positive integers and $1 < M \leq N$,
wherein the M BWVs are calculated using an optimization procedure based on performance constraints, and
wherein a redundancy degree is N minus M.

8. The apparatus of claim 7, wherein the M orthogonal beams include a first beam having a peak at nulls of other beams of the M orthogonal beams and wherein peaks of the other beams are at nulls of the first beam.

9. The apparatus of claim 7, wherein the performance constraints for one of the M orthogonal beams with an orthogonal beam (OB) radiation pattern include designated peak and null positions.

10. The apparatus of claim 7, wherein the optimization procedure is an iterative process which is stopped when a cost function derived from the performance constraints is less than a pre-determined threshold.

11. The apparatus of claim 7, wherein the plurality of receivers are located on satellites.

12. The apparatus of claim 7, wherein each of the N BWV is an N×1 column vector representing amplitude and phase distributions among adjacent components.

13. An apparatus comprising:
a pre-processing device to perform a wavefront multiplexing (WFM) transform on M input streams corresponding to M orthogonal beams to generate N output streams using a weight matrix having M beam weight vectors (BWVs) associated with the M orthogonal beams; and
an antenna array having N elements to transmit the N output streams to a plurality of receivers,
wherein M and N are positive integers and $1 < M \leq N$,
wherein the M BWVs are calculated using an optimization procedure based on performance constraints, and
wherein each of the N BWV is an N×1 column vector representing amplitude and phase distributions among adjacent components.

14. The apparatus of claim 13, wherein the M orthogonal beams include a first beam having a peak at nulls of other beams of the M orthogonal beams and wherein peaks of the other beams are at nulls of the first beam.

15. The apparatus of claim 13, wherein the performance constraints for one of the M orthogonal beams with an orthogonal beam (OB) radiation pattern include designated peak and null positions.

16. The apparatus of claim 13, wherein the optimization procedure is an iterative process which is stopped when a cost function derived from the performance constraints is less than a pre-determined threshold.

17. The apparatus of claim 13, wherein a redundancy degree is N minus M.

18. The apparatus of claim 13, wherein the plurality of receivers are located on satellites.

* * * * *